US012490723B2

(12) United States Patent
Doran et al.

(10) Patent No.: US 12,490,723 B2
(45) Date of Patent: Dec. 9, 2025

(54) TRANSGENIC CHICKEN THAT EXPRESSES A FLUORESCENT PROTEIN AND SIAT1

(71) Applicant: Commonwealth Scientific and Industrial Research Organisation, Acton (AU)

(72) Inventors: Timothy James Doran, Ocean Grove (AU); Mark Leslie Tizard, Highton (AU); Andrew Bean, Ocean Grove (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 285 days.

(21) Appl. No.: 16/617,787

(22) PCT Filed: May 31, 2018

(86) PCT No.: PCT/AU2018/050535
§ 371 (c)(1),
(2) Date: Nov. 27, 2019

(87) PCT Pub. No.: WO2018/218299
PCT Pub. Date: Dec. 6, 2018

(65) Prior Publication Data
US 2020/0100480 A1    Apr. 2, 2020

(30) Foreign Application Priority Data

May 31, 2017 (AU) ................................ 2017902123

(51) Int. Cl.
| A01K 67/027 | (2024.01) |
| A01K 67/0275 | (2024.01) |
| A61K 39/145 | (2006.01) |
| C12N 7/00 | (2006.01) |

(52) U.S. Cl.
CPC ........ *A01K 67/0275* (2013.01); *A61K 39/145* (2013.01); *C12N 7/00* (2013.01); *A01K 2217/052* (2013.01); *A01K 2227/30* (2013.01); *A01K 2267/01* (2013.01); *C12N 2760/16151* (2013.01)

(58) Field of Classification Search
None
See application file for complete search history.

(56) References Cited

U.S. PATENT DOCUMENTS

| 5,162,215 A | 11/1992 | Bosselman et al. |
| 7,067,308 B1 | 6/2006 | Wang |
| 7,145,057 B2 | 12/2006 | Van de Lavoir et al. |
| 7,615,676 B2 | 11/2009 | Heinrich |
| 7,732,571 B2 | 6/2010 | Lee et al. |
| 8,263,821 B2 | 9/2012 | Brulet |
| 2004/0034879 A1 | 2/2004 | Rothstein et al. |
| 2006/0206952 A1 | 9/2006 | Van de Lavoir et al. |
| 2010/0138946 A1 | 6/2010 | Van De Lavoir et al. |
| 2012/0288856 A1 | 11/2012 | Suh et al. |
| 2020/0149063 A1* | 5/2020 | Offen ................. A01K 67/0275 |

FOREIGN PATENT DOCUMENTS

| CN | 104694576 | 6/2015 |
| WO | WO 1991000287 | 1/1991 |
| WO | WO 1996037223 | 5/1996 |
| WO | 2005113756 | 12/2005 |
| WO | WO 2007062000 | 5/2007 |
| WO | 2007064802 | 6/2007 |
| WO | 2008151364 | 12/2008 |
| WO | 2009036510 | 3/2009 |
| WO | WO 2010/068978 A1 | 6/2010 |
| WO | 2011005765 | 1/2011 |
| WO | WO 2013155572 | 10/2013 |
| WO | 2017024343 | 2/2017 |
| WO | 2017094015 | 6/2017 |

OTHER PUBLICATIONS

Tizard (Proceeding 2nd Intrnl Workshop on Regulation of Animal Biol, Sept. 1, 2014, p. 1-21).*
Tyack (Transgenic Comm., 2013, vol. 22, p. 1257-1264) (Year: 2013).*
Tizard (Proceeding 2nd Intrnl Workshop on Regulation of Animal Biol, Sep. 1, 2014, p. 1-21) (Year: 2014).*
Lambeth, L.S., et al., (2016) "Transgenic Chickens Overexpressing Aromatase Have high Estrogen Levels but Maintain a Predominantly Male Phenotype", Endocrinology, 157:83-90.
Balciunas et al., (2006) "Harnessing a High Cargo-Capacity Transposon for Genetic Applications in Vertebrates", PLoS Genetics, 2(11):1715-1724, e169.
Bannister et al., (2007) "Comparison of chicken 7SK and U6 RNA polymerase III promoters for short hairpin RNA expression", BMC Biotechnology, 7(79):1-9.
Bertolin et al., (2014) "Proceedings of the Second International Workshop for Regulation of Animal Biotechnology: Preparing Markets for New Animal Product Opportunities", 1-4.
Bird et al., (1988) "Single-Chain Antigen-Binding Proteins", Reports, 242:423-426.
Bosselman et al., (1989) "Germline Transmission of Exogenous Genes in the Chicken", Science, 243(4890):533-535.
Chudakov et al., (2010) "Fluorescent Proteins and Their Applications in Imaging Living Cells and Tissues", Physiol Rev, 90:1103-1163.

(Continued)

*Primary Examiner* — Michael C Wilson
(74) *Attorney, Agent, or Firm* — Gary J. Gershik

(57) ABSTRACT

The present invention relates to transgenic avians and the eggs produced therefrom wherein the eggs comprise a genetic modification that facilitates in ovo gender sorting and a genetic modification that increases a production trait in the eggs or the avians produced therefrom. The present invention also relates to methods of identifying the gender of eggs before hatching and methods of sorting the eggs based on gender before hatching.

12 Claims, 25 Drawing Sheets

Figure 1:
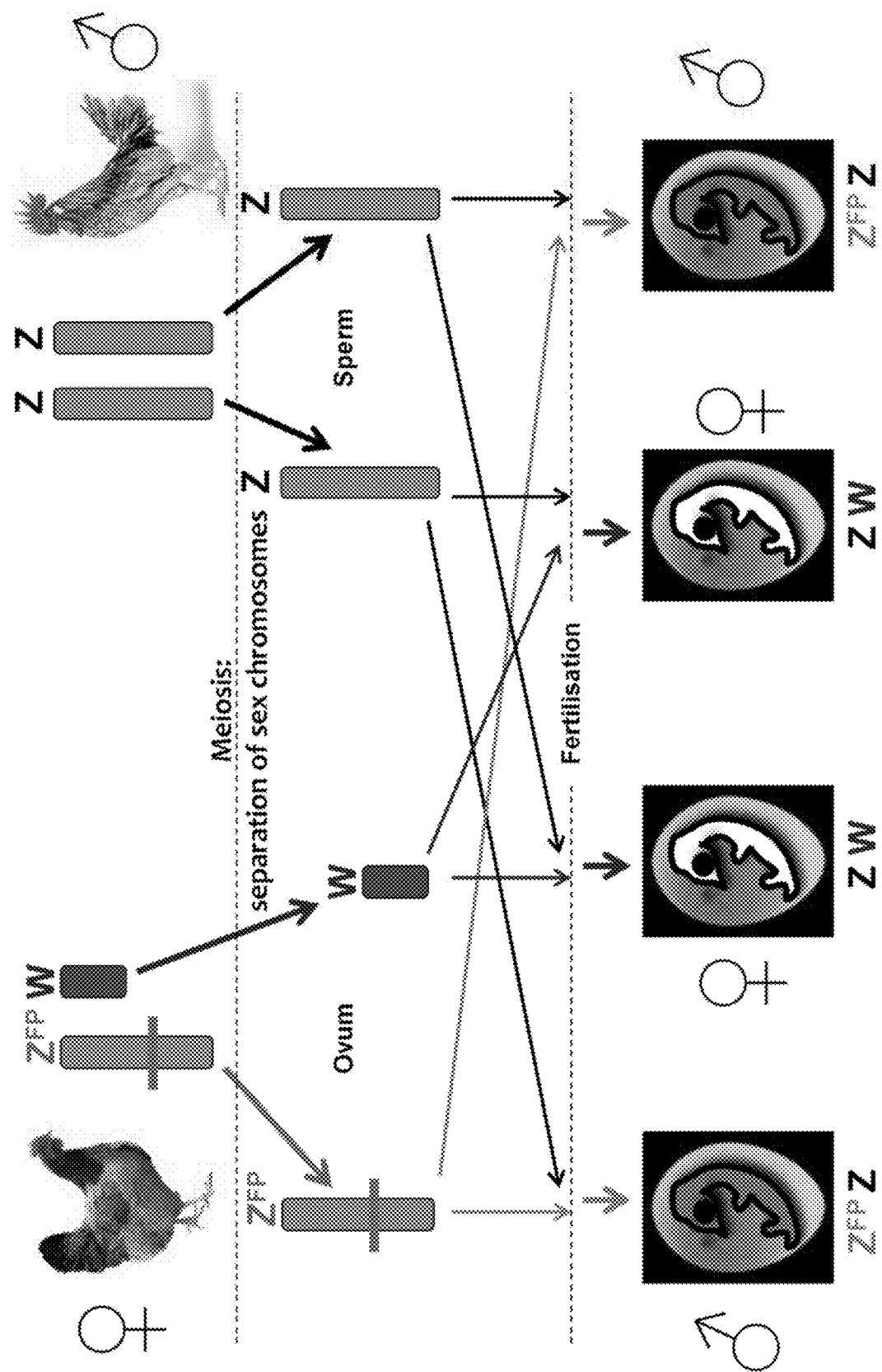

Specification includes a Sequence Listing.

(56) References Cited

OTHER PUBLICATIONS

Cong et al., (2013) "Multiplex Genome Engineering Using CRISPR/Cas Systems", Science, 339(6121):819-823.
Dhanapala et al., (2015) "Cracking the egg: An insight into egg hypersensitivity", Molecular Immunology, 66:375-383.
Doran et al., (2016) "Advances in genetic engineering of the avian genome: 'Realising the promise'", Transgenic Res, 1-13.
Doran, Tim (2011) "Sex selection in layer chickens", Poultry CRC, 1-15.
Extended European Search Report, PCT/AU2018/050535, dated Feb. 3, 2021, 1-7.
Grein et al., (2013) "Membrane Supported Virus Separation from Biological Solutions", Chemie Ingenieur Technik, 85(8):1183-1192.
Gribbin, Caitlyn (2012) "Marking male embryos could hold solution to chick culling 'ethical dilemma' in global egg industry", ABC News, 1-3.
Hoffmann et al., (2002) "Eight-plasmid system for rapid generation of influenza virus vaccines", Vaccine, 3165-3170.
Huston et al., (1988) "Protein engineering of antibody binding sites: Recovery of specific activity in an anti-digoxin single-chain Fv analogue produced in *Escherichia coli*", Natl. Acad. Sci. USA, 85:5879-5883.
International Preliminary Report, PCT/AU2018/050535, Dec. 3, 2019, 1-8.
International Search Report and Written Opinion, PCT/AU2018/050535, Jul. 3, 2018, 1-7.
Jones et al., (1986) "Replacing the complementarity-determining regions in a human antibody with those from a mouse", Nature, 321:522-525.
Josefsberg et al., (2012) "Vaccine Process Technology", Biotechnology and Bioengineering, 109:1443-1460.
Kalbfuss et al., (2006) "Harvesting and Concentration of Human Influenza A Virus Produced in Serum-Free Mammalian Cell Culture for the Production of Vaccines", Biotechnology and Bioengineering, 97(1):73-85.
Kawakami et al., (2000) "Identification of a functional transposase of the Tol2 element, an Ac-like element from the Japanese medaka fish, and its transposition in the zebrafish germ lineage", 97(21)11403-11408.
Koga et al., (1996) "Transposable element in fish", Nature Publishing Group, 383:30.
Lavitrano et al., (1989) "Sperm Cells as Vectors for Introducing Foreign DNA into Eggs: Genetic Transformation of Mice", 57:717-723.
Lodish et al., (2000) "Section 12.5 Recombination between Homologous DNA Sites", Molecular Cell Biology, 1-8.
Lowenthel et al., (1995) "Production of Interferon-7 by Chicken T Cells", Journal of Interferon and Cytokine Research, 15:933-938.
Makarova et al., (2015) "An updated evolutionary classification of CRISPR-Cas systems", Nat Rev Microbiol., 13(11):722-736.
Massin et al., (2005) "Cloning of the Chicken RNA Polymerase I Promoter and Use for Reverse Genetics of Influenza A Viruses in Avian Cells", Journal of Virology, 79(21):13811-13816.
McGrew et al., (2004) "Efficient production of germline transgenic chickens using lentiviral vectors", Scientific Report, 5(7):728-733.
Oh et al., (2008) "MDCK-SIAT1 Cells Show Improved Isolation Rates for Recent Human Influenza Viruses Compared to Conventional MDCK CellsV†", Journal of Clinical Microbiology, 46(7):2189-2194.
Ran et al., (2013) "Genome engineering using the CRISPR-Cas9 system", Nat Protoc., 8(11):2281-2308.
Reed and Muench, (1938) "A Simple Method of Estimating Fifty Per Cent Endpoints I, 2"., The American Journal of Hygiene, 27(3):493-497.
Schusser et al., (2013) "Immunoglobulin knockout chickens via efficient homologous recombination in primordial germ cells", PNAS, 110(50):20170-20175.
Smith et al., (2009) "The avian Z-linked gene DMRT1 is required for male sex determination in the chicken", Nature, 461:267-271.
Thoraval et al., (1995) "Germline transmission of exogenous genes in chickens using helper-free ecotropic avian leukosis virus-based vectors", Transgenic Research, (4)369-376.
Thorne et al., (2010) "Illuminating Insights into Firefly Luciferase and Other Bioluminescent Reporters Used in Chemical Biology", Chemistry and Biology, 646-657.
Tizard et al., (2014) "Precision genome engineering in the chicken: The gap between science and market place", CSIRO, 1-21.
Tyack et al., (2006) "Extreme diving of beaked whales", The Journal of Experimental Biology, 209:4238-4253.
Tyack et al., (2013) "A new method for producing transgenic birds via direct in vivo transfection of primordial germ cells", Transgenic Res., 1-8.
Urwin, Nigel, (2014) "Would you prefer to eat genetically modified eggs, or see day", The Guardian, 1-3.
Van De Lavoir et al., (2006) "Germline transmission of genetically modified primordial germ cells", Nature, 441:766-769.
Watanabe et al., (1994) "Liposome-Mediated DNA Transfer Into Chicken Primordial Germ Cells In Vivo", Molecular Reproduction and Development, 38:268-274.
Weaver et al., (2002) "The RecBCD Pathway for Homologous Recombination", Homologous Recombination, 710-712.
Weissmann et al., (2013) "Sexing domestic chicken before hatch: A new method for in ovo gender Identification", Theriogenology, 1-7.
Woelders, Henri, (2014) "Alternatives for killing day-old male chicks", Animal Breeding & Genomics Centre, 1-31.
Wolff and Reichl, (2008) "Downstream Processing: From Egg to Cell Culture-Derived Influenza Virus Particles", Chem. Eng. Technol, 31(6):846-857.
Wolff and Reichl, (2011) "Downstream processing of cell culture-derived virus particles", Expert Rev. Vaccines, 10(10):1451-1475.
Zetsche et al., (2015) "Cpf1 is a single RNA-guided endonuclease of a Class 2 CRISPR-Cas system", Cell, 163(3):759-771.
Zhang et al., (2011) "Programmable Sequence-Specific Transcriptional Regulation of Mammalian Genome Using Designer TAL Effectors", Nat Biotechnol., 29(2):149-153.
Turk et al., (2019) "Similar editing efficiency with 2-part and single guide RNA", 1-6.
Abdoli et al., (2016) "Comparison between MDCK and MDCK-SIAT1 cell lines as preferred host for cell culture- based influenza vaccine production", Biotechnol Lett, 38:941-948.
Yuan et al., (2008) "MDCK-SIAT1 Cells Show Improved Isolation Rates for Recent Human Influenza Viruses Compared to Conventional MDCK Cells", Journal of Clinical Microbiology, 46(7):2189-2194.
Matrosovich et al., (2003) "Overexpression of the α-2, 6-sialyltransferase in MDCK cells increases influenza virus sensitivity to neuraminidase inhibitors", Journal of Virology, 77(15)8418-8425.
Hatakeyama et al., (2005) "Enhanced Expression of an α2,6-Linked Sialic Acid on MDCK Cells Improves Isolation of Human Influenza Viruses and Evaluation of Their Sensitivity to a Neuraminidase Inhibitor", Journal of Clinical Microbiology, 43(8):4139-4146.
Feb. 2016 Poultry CRC Ltd. Final Report, Sub-Project Title Single sex selection for the egg laying industry to improve animal welfare.
Doran, T. J., et al. "Sex selection in layer chickens." *Animal Production Science* 58.3 (2017): 476-480.
Shafey, T. M., et al. "Effects of eggshell pigmentation and egg size on the spectral properties and characteristics of eggshell of meat and layer breeder eggs." *Asian-Australasian Journal of Animal Sciences* 15.2 (2002): 297-302.
Sander, Jeffry D., and J. Keith Joung. "CRISPR-Cas systems for genome editing, regulation and targeting." *Nature biotechnology* 32.4 (2014): 347.
Piatkevich, Kiryl D., and Vladislav V. Verkhusha. "Guide to red fluorescent proteins and biosensors for flow cytometry." *Methods in cell biology.* vol. 102. Academic Press, 2011. 431-461.
Bamelis, F. R., et al. "Detection of early embryonic development in chicken eggs using visible light transmission." *British poultry science* 43.2 (2002): 204-212.
Tsien, Roger Y. "The green fluorescent protein." *Annual review of biochemistry* 67.1 (1998): 509-544.
Remington, S. James. "Negotiating the speed bumps to fluorescence." *Nature biotechnology* 20.1 (2002): 28-29.

(56) References Cited

OTHER PUBLICATIONS

Chudakov, Dmitriy M., et al. "Fluorescent proteins and their applications in imaging living cells and tissues." *Physiological reviews* 90.3 (2010): 1103-1163.

Thorne, Natasha, James Inglese, and Douglas S. Auld. "Illuminating insights into firefly luciferase and other bioluminescent reporters used in chemical biology." *Chemistry & biology* 17.6 (2010): 646-657.

Yang, C. Q., et al. "Evaluation of three different promoters driving gene expression in developing chicken embryo by using in vivo electroporation." *Genet Mol Res* 13.1 (2014): 1270-1277.

Rios, Anne C., et al. "Neural crest regulates myogenesis through the transient activation of NOTCH." *Nature* 473.7348 (2011): 532-535.

Serralbo, Olivier, Cyril A. Picard, and Christophe Marcelle. "Long-term, inducible gene loss-of-function in the chicken embryo." *Genesis* 51.5 (2013): 372-380.

Serralbo, Olivier, and Christophe Marcelle. "Migrating cells mediate long-range WNT signaling." *Development* 141.10 (2014): 2057-2063.

Smith, Craig A., Matthijs J. Smith, and Andrew H. Sinclair. "Gene expression during gonadogenesis in the chicken embryo." *Gene* 234.2 (1999): 395-402.

Maurer, Golo, et al. "First light for avian embryos: eggshell thickness and pigmentation mediate variation in development and UV exposure in wild bird eggs." *Functional Ecology* 29.2 (2015): 209-218.

Gribbin, Caitlyn, "Marking male embryos could hold solution to chick culling 'ethical dilemma' in global egg industry", published Mar. 16, 2016, accessed Nov. 26, 2024 from https://www.abc.net.au/news/2016-03-12/marking-male-embroys-a-solution-to-egg-industry-dilemma/7236322.

Burgess, Elise, "Unscrambled: The hidden truth of hen welfare in the Australian egg industry", published May 2017 by Voiceless Limited.

Transcript of "Male Chickens: Unnatural Selection" broadcast Mar. 17, 2016, retrieved Nov. 27, 2024 from https://web.archive.org/web/20160410073815/http://www.abc.net.au:80/landline/content/2016/s4427149.htm.

Lambeth, Luke S., et al. "Development of retroviral vectors for tissue-restricted expression in chicken embryonic gonads." *PLoS One* 9.7 (2014): e101811.

Ayers, Katie L., et al. "RNA sequencing reveals sexually dimorphic gene expression before gonadal differentiation in chicken and allows comprehensive annotation of the W-chromosome." *Genome biology* 14 (2013): 1-17.

Doran, Tim "Sex selection in layer chickens", presentation, Animal Production 2016, Jul. 2016.

Communication pursuant to Article 94(3) EPC, issued Oct. 14, 2025 in connection with European Patent Application No. 18 810 311.3.

Tim Doran et al.: "Genome editing in poultry - opportunities and impacts", National Institutes of Bioscience Journal, vol. 1, No. 0, Mar. 15, 2017.

Matrosovich Mikhail et al.: "Sialic Acid Receptors of Viruses: Tools and Techniques to Identify and Capture Sialoglycans", vol. 367, Jan. 1, 2013.

Luke S. Lambeth et al.: "Transgenic Chickens Overexpressing Aromatase Have High Estrogen Levels but Maintain a Predominantly Male Phenotype", Endocrinology, vol. 157, No. 1, Jan. 1, 2016.

\* cited by examiner

A miniTol2 insertion site (n=77)

B

Chromosomal distribution of inserts
(n=65)

```
                      SEQUENCE LISTING

<160> NUMBER OF SEQ ID NOS: 169

<210> SEQ ID NO 1
<211> LENGTH: 21
<212> TYPE: RNA
<213> ORGANISM: Artificial Sequence
<220> FEATURE:
<223> OTHER INFORMATION: siRNA

<400> SEQUENCE: 1
gugcaagcau agaucuuaau u                                             21

<210> SEQ ID NO 2
<211> LENGTH: 21
<212> TYPE: RNA
<213> ORGANISM: Artificial Sequence
<220> FEATURE:
<223> OTHER INFORMATION: siRNA sequence

<400> SEQUENCE: 2
uuaagaucua ugcuugcacu u                                             21

<210> SEQ ID NO 3
<211> LENGTH: 21
<212> TYPE: RNA
<213> ORGANISM: Artificial Sequence
<220> FEATURE:
<223> OTHER INFORMATION: siRNA sequence

<400> SEQUENCE: 3
gggauugaag ucacaguuau u                                             21

<210> SEQ ID NO 4
<211> LENGTH: 21
<212> TYPE: RNA
<213> ORGANISM: Artificial Sequence
<220> FEATURE:
<223> OTHER INFORMATION: siRNA sequence

<400> SEQUENCE: 4
uaacugugac uucaaucccu u                                             21

<210> SEQ ID NO 5
<211> LENGTH: 21
<212> TYPE: RNA
<213> ORGANISM: Artificial Sequence
<220> FEATURE:
```

```
<223> OTHER INFORMATION: siRNA sequence

<400> SEQUENCE: 5
cguuaaauau ucugguugau u                                        21

<210> SEQ ID NO 6
<211> LENGTH: 21
<212> TYPE: RNA
<213> ORGANISM: Artificial Sequence
<220> FEATURE:
<223> OTHER INFORMATION: siRNA sequence

<400> SEQUENCE: 6
ucaaccagaa uauuuaacgu u                                        21

<210> SEQ ID NO 7
<211> LENGTH: 21
<212> TYPE: RNA
<213> ORGANISM: Artificial Sequence
<220> FEATURE:
<223> OTHER INFORMATION: siRNA sequence

<400> SEQUENCE: 7
ggguuaaaug gcauggaauu u                                        21

<210> SEQ ID NO 8
<211> LENGTH: 21
<212> TYPE: RNA
<213> ORGANISM: Artificial Sequence
<220> FEATURE:
<223> OTHER INFORMATION: siRNA sequence

<400> SEQUENCE: 8
auuccaugcc auuuaacccu u                                        21

<210> SEQ ID NO 9
<211> LENGTH: 21
<212> TYPE: RNA
<213> ORGANISM: Artificial Sequence
<220> FEATURE:
<223> OTHER INFORMATION: siRNA sequence

<400> SEQUENCE: 9
acgcauaauu cgggcucuau u                                        21

<210> SEQ ID NO 10
<211> LENGTH: 21
<212> TYPE: RNA
<213> ORGANISM: Artificial Sequence
<220> FEATURE:
<223> OTHER INFORMATION: siRNA sequence

<400> SEQUENCE: 10
uagagcccga auuaugcguu u                                        21

<210> SEQ ID NO 11
<211> LENGTH: 21
<212> TYPE: RNA
<213> ORGANISM: Artificial Sequence
<220> FEATURE:
<223> OTHER INFORMATION: siRNA sequence

<400> SEQUENCE: 11
ccacuagccu guuacauuau u                                        21
```

<210> SEQ ID NO 12
<211> LENGTH: 21
<212> TYPE: RNA
<213> ORGANISM: Artificial Sequence
<220> FEATURE:
<223> OTHER INFORMATION: siRNA sequence

<400> SEQUENCE: 12
uaauguaaca ggcuaguggu u                                              21

<210> SEQ ID NO 13
<211> LENGTH: 21
<212> TYPE: RNA
<213> ORGANISM: Artificial Sequence
<220> FEATURE:
<223> OTHER INFORMATION: siRNA sequence

<400> SEQUENCE: 13
agguuaaaga ugagcgauau u                                              21

<210> SEQ ID NO 14
<211> LENGTH: 21
<212> TYPE: RNA
<213> ORGANISM: Artificial Sequence
<220> FEATURE:
<223> OTHER INFORMATION: siRNA sequence

<400> SEQUENCE: 14
uaucgcucau cuuuaaccuu u                                              21

<210> SEQ ID NO 15
<211> LENGTH: 21
<212> TYPE: RNA
<213> ORGANISM: Artificial Sequence
<220> FEATURE:
<223> OTHER INFORMATION: siRNA sequence

<400> SEQUENCE: 15
guguggagcu gaguggauau u                                              21

<210> SEQ ID NO 16
<211> LENGTH: 21
<212> TYPE: RNA
<213> ORGANISM: Artificial Sequence
<220> FEATURE:
<223> OTHER INFORMATION: siRNA sequence

<400> SEQUENCE: 16
uauccacuca gcuccacacu u                                              21

<210> SEQ ID NO 17
<211> LENGTH: 21
<212> TYPE: RNA
<213> ORGANISM: Artificial Sequence
<220> FEATURE:
<223> OTHER INFORMATION: siRNA sequence

<400> SEQUENCE: 17
uccacaaugu agugaucaau u                                              21

<210> SEQ ID NO 18
<211> LENGTH: 21
<212> TYPE: RNA
<213> ORGANISM: Artificial Sequence
<220> FEATURE:
<223> OTHER INFORMATION: siRNA sequence

```
<400> SEQUENCE: 18
uugaucacua cauuguggau u                                              21

<210> SEQ ID NO 19
<211> LENGTH: 21
<212> TYPE: RNA
<213> ORGANISM: Artificial Sequence
<220> FEATURE:
<223> OTHER INFORMATION: siRNA sequence

<400> SEQUENCE: 19
cgaauuagua ucagaaacuu u                                              21

<210> SEQ ID NO 20
<211> LENGTH: 21
<212> TYPE: RNA
<213> ORGANISM: Artificial Sequence
<220> FEATURE:
<223> OTHER INFORMATION: siRNA sequence

<400> SEQUENCE: 20
aguuucugau acuaauucgu u                                              21

<210> SEQ ID NO 21
<211> LENGTH: 21
<212> TYPE: RNA
<213> ORGANISM: Artificial Sequence
<220> FEATURE:
<223> OTHER INFORMATION: siRNA sequence

<400> SEQUENCE: 21
cggaauuacu guagcauauu u                                              21

<210> SEQ ID NO 22
<211> LENGTH: 21
<212> TYPE: RNA
<213> ORGANISM: Artificial Sequence
<220> FEATURE:
<223> OTHER INFORMATION: siRNA sequence

<400> SEQUENCE: 22
auaugcuaca guaauuccgu u                                              21

<210> SEQ ID NO 23
<211> LENGTH: 21
<212> TYPE: RNA
<213> ORGANISM: Artificial Sequence
<220> FEATURE:
<223> OTHER INFORMATION: siRNA sequence

<400> SEQUENCE: 23
caauuaacac ggccugcaau u                                              21

<210> SEQ ID NO 24
<211> LENGTH: 21
<212> TYPE: RNA
<213> ORGANISM: Artificial Sequence
<220> FEATURE:
<223> OTHER INFORMATION: siRNA sequence

<400> SEQUENCE: 24
uugcaggccg uguuaauugu u                                              21

<210> SEQ ID NO 25
<211> LENGTH: 21
```

```
<212> TYPE: RNA
<213> ORGANISM: Artificial Sequence
<220> FEATURE:
<223> OTHER INFORMATION: siRNA sequence

<400> SEQUENCE: 25
ucugcgagug ggugaggaau u                                              21

<210> SEQ ID NO 26
<211> LENGTH: 21
<212> TYPE: RNA
<213> ORGANISM: Artificial Sequence
<220> FEATURE:
<223> OTHER INFORMATION: siRNA sequence

<400> SEQUENCE: 26
uuccucaccc acucgcagau u                                              21

<210> SEQ ID NO 27
<211> LENGTH: 21
<212> TYPE: RNA
<213> ORGANISM: Artificial Sequence
<220> FEATURE:
<223> OTHER INFORMATION: siRNA sequence

<400> SEQUENCE: 27
ccaggacgaa ggacaaauau u                                              21

<210> SEQ ID NO 28
<211> LENGTH: 21
<212> TYPE: RNA
<213> ORGANISM: Artificial Sequence
<220> FEATURE:
<223> OTHER INFORMATION: siRNA sequence

<400> SEQUENCE: 28
uauuuguccu ucguccuggu u                                              21

<210> SEQ ID NO 29
<211> LENGTH: 21
<212> TYPE: RNA
<213> ORGANISM: Artificial Sequence
<220> FEATURE:
<223> OTHER INFORMATION: siRNA sequence

<400> SEQUENCE: 29
ugagcuaccu ccuggacaau u                                              21

<210> SEQ ID NO 30
<211> LENGTH: 21
<212> TYPE: RNA
<213> ORGANISM: Artificial Sequence
<220> FEATURE:
<223> OTHER INFORMATION: siRNA sequence

<400> SEQUENCE: 30
uuguccagga gguagcucau u                                              21

<210> SEQ ID NO 31
<211> LENGTH: 21
<212> TYPE: RNA
<213> ORGANISM: Artificial Sequence
<220> FEATURE:
<223> OTHER INFORMATION: siRNA sequence

<400> SEQUENCE: 31
```

```
gcucgguagc aagucaaau u                                                21

<210> SEQ ID NO 32
<211> LENGTH: 21
<212> TYPE: RNA
<213> ORGANISM: Artificial Sequence
<220> FEATURE:
<223> OTHER INFORMATION: siRNA sequence

<400> SEQUENCE: 32
uuugacuugg cuaccgagcu u                                               21

<210> SEQ ID NO 33
<211> LENGTH: 21
<212> TYPE: RNA
<213> ORGANISM: Artificial Sequence
<220> FEATURE:
<223> OTHER INFORMATION: siRNA sequence

<400> SEQUENCE: 33
uuaacaaggu agagaacuau u                                               21

<210> SEQ ID NO 34
<211> LENGTH: 21
<212> TYPE: RNA
<213> ORGANISM: Artificial Sequence
<220> FEATURE:
<223> OTHER INFORMATION: siRNA sequence

<400> SEQUENCE: 34
uaguucucua ccuuguuaau u                                               21

<210> SEQ ID NO 35
<211> LENGTH: 21
<212> TYPE: RNA
<213> ORGANISM: Artificial Sequence
<220> FEATURE:
<223> OTHER INFORMATION: siRNA sequence

<400> SEQUENCE: 35
gaggcauggu aauaguuaau u                                               21

<210> SEQ ID NO 36
<211> LENGTH: 21
<212> TYPE: RNA
<213> ORGANISM: Artificial Sequence
<220> FEATURE:
<223> OTHER INFORMATION: siRNA sequence

<400> SEQUENCE: 36
uuaacuauua ccaugccucu u                                               21

<210> SEQ ID NO 37
<211> LENGTH: 21
<212> TYPE: RNA
<213> ORGANISM: Artificial Sequence
<220> FEATURE:
<223> OTHER INFORMATION: siRNA sequence

<400> SEQUENCE: 37
guaccugugu uuagcauauu u                                               21

<210> SEQ ID NO 38
<211> LENGTH: 21
<212> TYPE: RNA
<213> ORGANISM: Artificial Sequence
```

```
<220> FEATURE:
<223> OTHER INFORMATION: siRNA sequence

<400> SEQUENCE: 38
auaugcuaaa cacagguacu u                                              21

<210> SEQ ID NO 39
<211> LENGTH: 21
<212> TYPE: RNA
<213> ORGANISM: Artificial Sequence
<220> FEATURE:
<223> OTHER INFORMATION: siRNA sequence

<400> SEQUENCE: 39
ggaauaaagc caagcgauuu u                                              21

<210> SEQ ID NO 40
<211> LENGTH: 21
<212> TYPE: RNA
<213> ORGANISM: Artificial Sequence
<220> FEATURE:
<223> OTHER INFORMATION: siRNA sequence

<400> SEQUENCE: 40
aaucgcuugg cuuuauuccu u                                              21

<210> SEQ ID NO 41
<211> LENGTH: 21
<212> TYPE: RNA
<213> ORGANISM: Artificial Sequence
<220> FEATURE:
<223> OTHER INFORMATION: siRNA sequence

<400> SEQUENCE: 41
gcucaucggc cucaaggaau u                                              21

<210> SEQ ID NO 42
<211> LENGTH: 21
<212> TYPE: RNA
<213> ORGANISM: Artificial Sequence
<220> FEATURE:
<223> OTHER INFORMATION: siRNA sequence

<400> SEQUENCE: 42
uuccuugagg ccgaugagcu u                                              21

<210> SEQ ID NO 43
<211> LENGTH: 21
<212> TYPE: RNA
<213> ORGANISM: Artificial Sequence
<220> FEATURE:
<223> OTHER INFORMATION: siRNA sequence

<400> SEQUENCE: 43
cggaagauga gcauugacau u                                              21

<210> SEQ ID NO 44
<211> LENGTH: 21
<212> TYPE: RNA
<213> ORGANISM: Artificial Sequence
<220> FEATURE:
<223> OTHER INFORMATION: siRNA sequence

<400> SEQUENCE: 44
ugucaaugcu caucuuccgu u                                              21
```

```
<210> SEQ ID NO 45
<211> LENGTH: 21
<212> TYPE: RNA
<213> ORGANISM: Artificial Sequence
<220> FEATURE:
<223> OTHER INFORMATION: siRNA sequence

<400> SEQUENCE: 45
acgaaaguca gcuugauuuu u                                              21

<210> SEQ ID NO 46
<211> LENGTH: 21
<212> TYPE: RNA
<213> ORGANISM: Artificial Sequence
<220> FEATURE:
<223> OTHER INFORMATION: siRNA sequence

<400> SEQUENCE: 46
aaaucaagcu gacuuucguu u                                              21

<210> SEQ ID NO 47
<211> LENGTH: 21
<212> TYPE: RNA
<213> ORGANISM: Artificial Sequence
<220> FEATURE:
<223> OTHER INFORMATION: siRNA sequence

<400> SEQUENCE: 47
gggcacaguc agccgcaaau u                                              21

<210> SEQ ID NO 48
<211> LENGTH: 21
<212> TYPE: RNA
<213> ORGANISM: Artificial Sequence
<220> FEATURE:
<223> OTHER INFORMATION: siRNA sequence

<400> SEQUENCE: 48
uuugcggcug acugugcccu u                                              21

<210> SEQ ID NO 49
<211> LENGTH: 21
<212> TYPE: RNA
<213> ORGANISM: Artificial Sequence
<220> FEATURE:
<223> OTHER INFORMATION: siRNA sequence

<400> SEQUENCE: 49
cgacagaaag auaccguagu u                                              21

<210> SEQ ID NO 50
<211> LENGTH: 21
<212> TYPE: RNA
<213> ORGANISM: Artificial Sequence
<220> FEATURE:
<223> OTHER INFORMATION: siRNA sequence

<400> SEQUENCE: 50
cuacgguauc uuucugucgu u                                              21

<210> SEQ ID NO 51
<211> LENGTH: 21
<212> TYPE: RNA
<213> ORGANISM: Artificial Sequence
<220> FEATURE:
<223> OTHER INFORMATION: siRNA sequence
```

```
<400> SEQUENCE: 51
gauuauacca gcaagaaauu u                                              21

<210> SEQ ID NO 52
<211> LENGTH: 21
<212> TYPE: RNA
<213> ORGANISM: Artificial Sequence
<220> FEATURE:
<223> OTHER INFORMATION: siRNA sequence

<400> SEQUENCE: 52
auuucuugcu gguauaaucu u                                              21

<210> SEQ ID NO 53
<211> LENGTH: 21
<212> TYPE: RNA
<213> ORGANISM: Artificial Sequence
<220> FEATURE:
<223> OTHER INFORMATION: siRNA sequence

<400> SEQUENCE: 53
caguggagac cuagauaaau u                                              21

<210> SEQ ID NO 54
<211> LENGTH: 21
<212> TYPE: RNA
<213> ORGANISM: Artificial Sequence
<220> FEATURE:
<223> OTHER INFORMATION: siRNA sequence

<400> SEQUENCE: 54
uuuaucuagg ucuccacugu u                                              21

<210> SEQ ID NO 55
<211> LENGTH: 21
<212> TYPE: RNA
<213> ORGANISM: Artificial Sequence
<220> FEATURE:
<223> OTHER INFORMATION: siRNA sequence

<400> SEQUENCE: 55
agagaggauc cgacuguauu u                                              21

<210> SEQ ID NO 56
<211> LENGTH: 21
<212> TYPE: RNA
<213> ORGANISM: Artificial Sequence
<220> FEATURE:
<223> OTHER INFORMATION: siRNA sequence

<400> SEQUENCE: 56
auacagucgg auccucucuu u                                              21

<210> SEQ ID NO 57
<211> LENGTH: 21
<212> TYPE: RNA
<213> ORGANISM: Artificial Sequence
<220> FEATURE:
<223> OTHER INFORMATION: siRNA sequence

<400> SEQUENCE: 57
ugacgggacu ggugagcauu u                                              21

<210> SEQ ID NO 58
```

<211> LENGTH: 21
<212> TYPE: RNA
<213> ORGANISM: Artificial Sequence
<220> FEATURE:
<223> OTHER INFORMATION: siRNA sequence

<400> SEQUENCE: 58
augcucacca gucccgucau u                                              21

<210> SEQ ID NO 59
<211> LENGTH: 21
<212> TYPE: RNA
<213> ORGANISM: Artificial Sequence
<220> FEATURE:
<223> OTHER INFORMATION: siRNA sequence

<400> SEQUENCE: 59
ucgacaacuu ugacguguau u                                              21

<210> SEQ ID NO 60
<211> LENGTH: 21
<212> TYPE: RNA
<213> ORGANISM: Artificial Sequence
<220> FEATURE:
<223> OTHER INFORMATION: siRNA sequence

<400> SEQUENCE: 60
uacacgucaa aguugucgau u                                              21

<210> SEQ ID NO 61
<211> LENGTH: 21
<212> TYPE: RNA
<213> ORGANISM: Artificial Sequence
<220> FEATURE:
<223> OTHER INFORMATION: siRNA sequence

<400> SEQUENCE: 61
gcgucgaguu caugagcucu u                                              21

<210> SEQ ID NO 62
<211> LENGTH: 21
<212> TYPE: RNA
<213> ORGANISM: Artificial Sequence
<220> FEATURE:
<223> OTHER INFORMATION: siRNA sequence

<400> SEQUENCE: 62
gagcucauga acucgacgcu u                                              21

<210> SEQ ID NO 63
<211> LENGTH: 21
<212> TYPE: RNA
<213> ORGANISM: Artificial Sequence
<220> FEATURE:
<223> OTHER INFORMATION: siRNA sequence

<400> SEQUENCE: 63
gcgcagagcg guaccauaau u                                              21

<210> SEQ ID NO 64
<211> LENGTH: 21
<212> TYPE: RNA
<213> ORGANISM: Artificial Sequence
<220> FEATURE:
<223> OTHER INFORMATION: siRNA sequence

<400> SEQUENCE: 64
uuaugguacc gcucugcgcu u					21

<210> SEQ ID NO 65
<211> LENGTH: 21
<212> TYPE: RNA
<213> ORGANISM: Artificial Sequence
<220> FEATURE:
<223> OTHER INFORMATION: siRNA sequence

<400> SEQUENCE: 65
ccgcaaagcc uuagcagacu u					21

<210> SEQ ID NO 66
<211> LENGTH: 21
<212> TYPE: RNA
<213> ORGANISM: Artificial Sequence
<220> FEATURE:
<223> OTHER INFORMATION: siRNA sequence

<400> SEQUENCE: 66
gucugcuaag gcuuugcggu u					21

<210> SEQ ID NO 67
<211> LENGTH: 21
<212> TYPE: RNA
<213> ORGANISM: Artificial Sequence
<220> FEATURE:
<223> OTHER INFORMATION: siRNA sequence

<400> SEQUENCE: 67
gcaagaacua uacaaacuau u					21

<210> SEQ ID NO 68
<211> LENGTH: 21
<212> TYPE: RNA
<213> ORGANISM: Artificial Sequence
<220> FEATURE:
<223> OTHER INFORMATION: siRNA sequence

<400> SEQUENCE: 68
uaguuuguau aguucuugcu u					21

<210> SEQ ID NO 69
<211> LENGTH: 21
<212> TYPE: RNA
<213> ORGANISM: Artificial Sequence
<220> FEATURE:
<223> OTHER INFORMATION: siRNA sequence

<400> SEQUENCE: 69
cggguaagca ccaagaauau u					21

<210> SEQ ID NO 70
<211> LENGTH: 21
<212> TYPE: RNA
<213> ORGANISM: Artificial Sequence
<220> FEATURE:
<223> OTHER INFORMATION: siRNA sequence

<400> SEQUENCE: 70
uauucuuggu gcuuacccgu u					21

<210> SEQ ID NO 71
<211> LENGTH: 21
<212> TYPE: RNA

```
<213> ORGANISM: Artificial Sequence
<220> FEATURE:
<223> OTHER INFORMATION: siRNA sequence

<400> SEQUENCE: 71
acacgagcua ggagaugaau u                                              21

<210> SEQ ID NO 72
<211> LENGTH: 21
<212> TYPE: RNA
<213> ORGANISM: Artificial Sequence
<220> FEATURE:
<223> OTHER INFORMATION: siRNA sequence

<400> SEQUENCE: 72
uucaucuccu agcucguguu u                                              21

<210> SEQ ID NO 73
<211> LENGTH: 21
<212> TYPE: RNA
<213> ORGANISM: Artificial Sequence
<220> FEATURE:
<223> OTHER INFORMATION: siRNA sequence

<400> SEQUENCE: 73
ggaguuagca gauuugauau u                                              21

<210> SEQ ID NO 74
<211> LENGTH: 21
<212> TYPE: RNA
<213> ORGANISM: Artificial Sequence
<220> FEATURE:
<223> OTHER INFORMATION: siRNA sequence

<400> SEQUENCE: 74
uaucaaaucu gcuaacuccu u                                              21

<210> SEQ ID NO 75
<211> LENGTH: 21
<212> TYPE: RNA
<213> ORGANISM: Artificial Sequence
<220> FEATURE:
<223> OTHER INFORMATION: siRNA sequence

<400> SEQUENCE: 75
cgacagagga ccgagaauuu u                                              21

<210> SEQ ID NO 76
<211> LENGTH: 21
<212> TYPE: RNA
<213> ORGANISM: Artificial Sequence
<220> FEATURE:
<223> OTHER INFORMATION: siRNA sequence

<400> SEQUENCE: 76
aauucucggu ccucgucgu u                                               21

<210> SEQ ID NO 77
<211> LENGTH: 21
<212> TYPE: RNA
<213> ORGANISM: Artificial Sequence
<220> FEATURE:
<223> OTHER INFORMATION: siRNA sequence

<400> SEQUENCE: 77
ggucauuuca cucauacaau u                                              21
```

```
<210> SEQ ID NO 78
<211> LENGTH: 21
<212> TYPE: RNA
<213> ORGANISM: Artificial Sequence
<220> FEATURE:
<223> OTHER INFORMATION: siRNA sequence

<400> SEQUENCE: 78
uuguaugagu gaaaugaccu u                                              21

<210> SEQ ID NO 79
<211> LENGTH: 21
<212> TYPE: RNA
<213> ORGANISM: Artificial Sequence
<220> FEATURE:
<223> OTHER INFORMATION: siRNA sequence

<400> SEQUENCE: 79
uuguaaagaa ucaagacgau u                                              21

<210> SEQ ID NO 80
<211> LENGTH: 21
<212> TYPE: RNA
<213> ORGANISM: Artificial Sequence
<220> FEATURE:
<223> OTHER INFORMATION: siRNA sequence

<400> SEQUENCE: 80
ucgucuugau ucuuuacaau u                                              21

<210> SEQ ID NO 81
<211> LENGTH: 21
<212> TYPE: RNA
<213> ORGANISM: Artificial Sequence
<220> FEATURE:
<223> OTHER INFORMATION: siRNA sequence

<400> SEQUENCE: 81
cggaggaguu cgugaugguu u                                              21

<210> SEQ ID NO 82
<211> LENGTH: 21
<212> TYPE: RNA
<213> ORGANISM: Artificial Sequence
<220> FEATURE:
<223> OTHER INFORMATION: siRNA sequence

<400> SEQUENCE: 82
accaucacga acuccuccgu u                                              21

<210> SEQ ID NO 83
<211> LENGTH: 21
<212> TYPE: RNA
<213> ORGANISM: Artificial Sequence
<220> FEATURE:
<223> OTHER INFORMATION: siRNA sequence

<400> SEQUENCE: 83
ccgucgaggu gaagcugauu u                                              21

<210> SEQ ID NO 84
<211> LENGTH: 21
<212> TYPE: RNA
<213> ORGANISM: Artificial Sequence
<220> FEATURE:
```

<223> OTHER INFORMATION: siRNA sequence

<400> SEQUENCE: 84
aucagcuuca ccucgacggu u                                       21

<210> SEQ ID NO 85
<211> LENGTH: 21
<212> TYPE: RNA
<213> ORGANISM: Artificial Sequence
<220> FEATURE:
<223> OTHER INFORMATION: siRNA sequence

<400> SEQUENCE: 85
aagcagagcg acugggccuu u                                       21

<210> SEQ ID NO 86
<211> LENGTH: 21
<212> TYPE: RNA
<213> ORGANISM: Artificial Sequence
<220> FEATURE:
<223> OTHER INFORMATION: siRNA sequence

<400> SEQUENCE: 86
aggcccaguc gcucugcuuu u                                       21

<210> SEQ ID NO 87
<211> LENGTH: 21
<212> TYPE: RNA
<213> ORGANISM: Artificial Sequence
<220> FEATURE:
<223> OTHER INFORMATION: siRNA sequence

<400> SEQUENCE: 87
uggcagucag cgaccauuau u                                       21

<210> SEQ ID NO 88
<211> LENGTH: 21
<212> TYPE: RNA
<213> ORGANISM: Artificial Sequence
<220> FEATURE:
<223> OTHER INFORMATION: siRNA sequence

<400> SEQUENCE: 88
uaauggucgc ugacugccau u                                       21

<210> SEQ ID NO 89
<211> LENGTH: 21
<212> TYPE: RNA
<213> ORGANISM: Artificial Sequence
<220> FEATURE:
<223> OTHER INFORMATION: siRNA sequence

<400> SEQUENCE: 89
ugucaagacc agauguuaau u                                       21

<210> SEQ ID NO 90
<211> LENGTH: 21
<212> TYPE: RNA
<213> ORGANISM: Artificial Sequence
<220> FEATURE:
<223> OTHER INFORMATION: siRNA sequence

<400> SEQUENCE: 90
uuaacaucug gucuugacau u                                       21

```
<210> SEQ ID NO 91
<211> LENGTH: 21
<212> TYPE: RNA
<213> ORGANISM: Artificial Sequence
<220> FEATURE:
<223> OTHER INFORMATION: siRNA sequence

<400> SEQUENCE: 91
gugauaucca ugaggacuuu u                                              21

<210> SEQ ID NO 92
<211> LENGTH: 21
<212> TYPE: RNA
<213> ORGANISM: Artificial Sequence
<220> FEATURE:
<223> OTHER INFORMATION: siRNA sequence

<400> SEQUENCE: 92
aaguccucau ggauaucacu u                                              21

<210> SEQ ID NO 93
<211> LENGTH: 21
<212> TYPE: RNA
<213> ORGANISM: Artificial Sequence
<220> FEATURE:
<223> OTHER INFORMATION: siRNA sequence

<400> SEQUENCE: 93
acaagggcga ugagacuaau u                                              21

<210> SEQ ID NO 94
<211> LENGTH: 21
<212> TYPE: RNA
<213> ORGANISM: Artificial Sequence
<220> FEATURE:
<223> OTHER INFORMATION: siRNA sequence

<400> SEQUENCE: 94
uuagucucau cgcccuuguu u                                              21

<210> SEQ ID NO 95
<211> LENGTH: 21
<212> TYPE: RNA
<213> ORGANISM: Artificial Sequence
<220> FEATURE:
<223> OTHER INFORMATION: siRNA sequence

<400> SEQUENCE: 95
ccauuggcac agucagaaau u                                              21

<210> SEQ ID NO 96
<211> LENGTH: 21
<212> TYPE: RNA
<213> ORGANISM: Artificial Sequence
<220> FEATURE:
<223> OTHER INFORMATION: siRNA sequence

<400> SEQUENCE: 96
uuucugacug ugccaauggu u                                              21

<210> SEQ ID NO 97
<211> LENGTH: 21
<212> TYPE: RNA
<213> ORGANISM: Artificial Sequence
<220> FEATURE:
<223> OTHER INFORMATION: siRNA sequence
```

```
<400> SEQUENCE: 97
ugggaaagga ucauacuauu u                                              21

<210> SEQ ID NO 98
<211> LENGTH: 21
<212> TYPE: RNA
<213> ORGANISM: Artificial Sequence
<220> FEATURE:
<223> OTHER INFORMATION: siRNA sequence

<400> SEQUENCE: 98
auaguaugau ccuuucccau u                                              21

<210> SEQ ID NO 99
<211> LENGTH: 21
<212> TYPE: RNA
<213> ORGANISM: Artificial Sequence
<220> FEATURE:
<223> OTHER INFORMATION: siRNA sequence

<400> SEQUENCE: 99
cgguuagacc aaagggccau u                                              21

<210> SEQ ID NO 100
<211> LENGTH: 21
<212> TYPE: RNA
<213> ORGANISM: Artificial Sequence
<220> FEATURE:
<223> OTHER INFORMATION: siRNA sequence

<400> SEQUENCE: 100
uggcccuuug gucuaaccgu u                                              21

<210> SEQ ID NO 101
<211> LENGTH: 21
<212> TYPE: RNA
<213> ORGANISM: Artificial Sequence
<220> FEATURE:
<223> OTHER INFORMATION: siRNA sequence

<400> SEQUENCE: 101
cgaguaaccg ugggaacuau u                                              21

<210> SEQ ID NO 102
<211> LENGTH: 21
<212> TYPE: RNA
<213> ORGANISM: Artificial Sequence
<220> FEATURE:
<223> OTHER INFORMATION: siRNA sequence

<400> SEQUENCE: 102
uaguucccac gguuacucgu u                                              21

<210> SEQ ID NO 103
<211> LENGTH: 21
<212> TYPE: RNA
<213> ORGANISM: Artificial Sequence
<220> FEATURE:
<223> OTHER INFORMATION: siRNA sequence

<400> SEQUENCE: 103
gcaugagacc aacccacuau u                                              21

<210> SEQ ID NO 104
<211> LENGTH: 21
```

```
<212> TYPE: RNA
<213> ORGANISM: Artificial Sequence
<220> FEATURE:
<223> OTHER INFORMATION: siRNA sequence

<400> SEQUENCE: 104
uaguggguug gucucaugcu u                                              21

<210> SEQ ID NO 105
<211> LENGTH: 21
<212> TYPE: RNA
<213> ORGANISM: Artificial Sequence
<220> FEATURE:
<223> OTHER INFORMATION: siRNA sequence

<400> SEQUENCE: 105
ucaaguaacg gguguauuuu u                                              21

<210> SEQ ID NO 106
<211> LENGTH: 21
<212> TYPE: RNA
<213> ORGANISM: Artificial Sequence
<220> FEATURE:
<223> OTHER INFORMATION: siRNA sequence

<400> SEQUENCE: 106
aaauacaccc guuacuugau u                                              21

<210> SEQ ID NO 107
<211> LENGTH: 21
<212> TYPE: RNA
<213> ORGANISM: Artificial Sequence
<220> FEATURE:
<223> OTHER INFORMATION: siRNA sequence

<400> SEQUENCE: 107
gacacaagcg ggaguagaau u                                              21

<210> SEQ ID NO 108
<211> LENGTH: 21
<212> TYPE: RNA
<213> ORGANISM: Artificial Sequence
<220> FEATURE:
<223> OTHER INFORMATION: siRNA sequence

<400> SEQUENCE: 108
uucuacuccc gcuugugucu u                                              21

<210> SEQ ID NO 109
<211> LENGTH: 21
<212> TYPE: RNA
<213> ORGANISM: Artificial Sequence
<220> FEATURE:
<223> OTHER INFORMATION: siRNA sequence

<400> SEQUENCE: 109
cgauuugugu acuguaauuu u                                              21

<210> SEQ ID NO 110
<211> LENGTH: 21
<212> TYPE: RNA
<213> ORGANISM: Artificial Sequence
<220> FEATURE:
<223> OTHER INFORMATION: siRNA sequence

<400> SEQUENCE: 110
```

```
aauuacagua cacaaaucgu u                                    21

<210> SEQ ID NO 111
<211> LENGTH: 21
<212> TYPE: RNA
<213> ORGANISM: Artificial Sequence
<220> FEATURE:
<223> OTHER INFORMATION: siRNA sequence

<400> SEQUENCE: 111
guggaugacu guauuauuuu u                                    21

<210> SEQ ID NO 112
<211> LENGTH: 21
<212> TYPE: RNA
<213> ORGANISM: Artificial Sequence
<220> FEATURE:
<223> OTHER INFORMATION: siRNA sequence

<400> SEQUENCE: 112
aaauaauaca gucauccacu u                                    21

<210> SEQ ID NO 113
<211> LENGTH: 21
<212> TYPE: RNA
<213> ORGANISM: Artificial Sequence
<220> FEATURE:
<223> OTHER INFORMATION: siRNA sequence

<400> SEQUENCE: 113
gggugucaac caugagaaau u                                    21

<210> SEQ ID NO 114
<211> LENGTH: 21
<212> TYPE: RNA
<213> ORGANISM: Artificial Sequence
<220> FEATURE:
<223> OTHER INFORMATION: siRNA sequence

<400> SEQUENCE: 114
uuucucaugg uugacacccu u                                    21

<210> SEQ ID NO 115
<211> LENGTH: 21
<212> TYPE: RNA
<213> ORGANISM: Artificial Sequence
<220> FEATURE:
<223> OTHER INFORMATION: siRNA sequence

<400> SEQUENCE: 115
guaccaccuu acaucaauau u                                    21

<210> SEQ ID NO 116
<211> LENGTH: 21
<212> TYPE: RNA
<213> ORGANISM: Artificial Sequence
<220> FEATURE:
<223> OTHER INFORMATION: siRNA sequence

<400> SEQUENCE: 116
uauugaugua aggugguacu u                                    21

<210> SEQ ID NO 117
<211> LENGTH: 21
<212> TYPE: RNA
<213> ORGANISM: Artificial Sequence
```

```
<220> FEATURE:
<223> OTHER INFORMATION: siRNA sequence

<400> SEQUENCE: 117
acgggaaacu ugugaucaau u                                              21

<210> SEQ ID NO 118
<211> LENGTH: 21
<212> TYPE: RNA
<213> ORGANISM: Artificial Sequence
<220> FEATURE:
<223> OTHER INFORMATION: siRNA sequence

<400> SEQUENCE: 118
uugaucacaa guuucccguu u                                              21

<210> SEQ ID NO 119
<211> LENGTH: 21
<212> TYPE: RNA
<213> ORGANISM: Artificial Sequence
<220> FEATURE:
<223> OTHER INFORMATION: siRNA sequence

<400> SEQUENCE: 119
agucggaguc aacggauuuu u                                              21

<210> SEQ ID NO 120
<211> LENGTH: 21
<212> TYPE: RNA
<213> ORGANISM: Artificial Sequence
<220> FEATURE:
<223> OTHER INFORMATION: siRNA sequence

<400> SEQUENCE: 120
aaauccguug acuccgacuu u                                              21

<210> SEQ ID NO 121
<211> LENGTH: 21
<212> TYPE: RNA
<213> ORGANISM: Artificial Sequence
<220> FEATURE:
<223> OTHER INFORMATION: siRNA sequence

<400> SEQUENCE: 121
gguaucagga ugugagaacu u                                              21

<210> SEQ ID NO 122
<211> LENGTH: 21
<212> TYPE: RNA
<213> ORGANISM: Artificial Sequence
<220> FEATURE:
<223> OTHER INFORMATION: siRNA sequence

<400> SEQUENCE: 122
guucucacau ccugauaccu u                                              21

<210> SEQ ID NO 123
<211> LENGTH: 21
<212> TYPE: RNA
<213> ORGANISM: Artificial Sequence
<220> FEATURE:
<223> OTHER INFORMATION: siRNA sequence

<400> SEQUENCE: 123
guggcuaauu ucuguguuuu u                                              21
```

<210> SEQ ID NO 124
<211> LENGTH: 21
<212> TYPE: RNA
<213> ORGANISM: Artificial Sequence
<220> FEATURE:
<223> OTHER INFORMATION: siRNA sequence

<400> SEQUENCE: 124
aaacacagaa auuagccacu u                                              21

<210> SEQ ID NO 125
<211> LENGTH: 21
<212> TYPE: RNA
<213> ORGANISM: Artificial Sequence
<220> FEATURE:
<223> OTHER INFORMATION: siRNA sequence

<400> SEQUENCE: 125
agaaguagau ccuccgguau u                                              21

<210> SEQ ID NO 126
<211> LENGTH: 21
<212> TYPE: RNA
<213> ORGANISM: Artificial Sequence
<220> FEATURE:
<223> OTHER INFORMATION: siRNA sequence

<400> SEQUENCE: 126
uaccggagga ucuacuucuu u                                              21

<210> SEQ ID NO 127
<211> LENGTH: 21
<212> TYPE: RNA
<213> ORGANISM: Artificial Sequence
<220> FEATURE:
<223> OTHER INFORMATION: siRNA sequence

<400> SEQUENCE: 127
gaguaggauc acagaagaau u                                              21

<210> SEQ ID NO 128
<211> LENGTH: 21
<212> TYPE: RNA
<213> ORGANISM: Artificial Sequence
<220> FEATURE:
<223> OTHER INFORMATION: siRNA sequence

<400> SEQUENCE: 128
uucuucugug auccuacucu u                                              21

<210> SEQ ID NO 129
<211> LENGTH: 21
<212> TYPE: RNA
<213> ORGANISM: Artificial Sequence
<220> FEATURE:
<223> OTHER INFORMATION: siRNA sequence

<400> SEQUENCE: 129
ugacgugugu gauuccaaau u                                              21

<210> SEQ ID NO 130
<211> LENGTH: 21
<212> TYPE: RNA
<213> ORGANISM: Artificial Sequence
<220> FEATURE:
<223> OTHER INFORMATION: siRNA sequence

```
<400> SEQUENCE: 130
uuuggaauca cacacgucau u                                               21

<210> SEQ ID NO 131
<211> LENGTH: 21
<212> TYPE: RNA
<213> ORGANISM: Artificial Sequence
<220> FEATURE:
<223> OTHER INFORMATION: siRNA sequence

<400> SEQUENCE: 131
ccagugugca ugcaguuaau u                                               21

<210> SEQ ID NO 132
<211> LENGTH: 21
<212> TYPE: RNA
<213> ORGANISM: Artificial Sequence
<220> FEATURE:
<223> OTHER INFORMATION: siRNA sequence

<400> SEQUENCE: 132
uuaacugcau gcacacuggu u                                               21

<210> SEQ ID NO 133
<211> LENGTH: 21
<212> TYPE: RNA
<213> ORGANISM: Artificial Sequence
<220> FEATURE:
<223> OTHER INFORMATION: siRNA sequence

<400> SEQUENCE: 133
auuccgggcu caagugaaau u                                               21

<210> SEQ ID NO 134
<211> LENGTH: 21
<212> TYPE: RNA
<213> ORGANISM: Artificial Sequence
<220> FEATURE:
<223> OTHER INFORMATION: siRNA sequence

<400> SEQUENCE: 134
uuucacuuga gcccggaauu u                                               21

<210> SEQ ID NO 135
<211> LENGTH: 21
<212> TYPE: RNA
<213> ORGANISM: Artificial Sequence
<220> FEATURE:
<223> OTHER INFORMATION: siRNA sequence

<400> SEQUENCE: 135
aaaucacagu ucaaggaauu u                                               21

<210> SEQ ID NO 136
<211> LENGTH: 21
<212> TYPE: RNA
<213> ORGANISM: Artificial Sequence
<220> FEATURE:
<223> OTHER INFORMATION: siRNA sequence

<400> SEQUENCE: 136
auuccuugaa cugugauuuu u                                               21

<210> SEQ ID NO 137
```

```
<211> LENGTH: 21
<212> TYPE: RNA
<213> ORGANISM: Artificial Sequence
<220> FEATURE:
<223> OTHER INFORMATION: siRNA sequence

<400> SEQUENCE: 137
cgaaaggagu uuaauccauu u                                              21

<210> SEQ ID NO 138
<211> LENGTH: 21
<212> TYPE: RNA
<213> ORGANISM: Artificial Sequence
<220> FEATURE:
<223> OTHER INFORMATION: siRNA sequence

<400> SEQUENCE: 138
auggauuaaa cuccuuucgu u                                              21

<210> SEQ ID NO 139
<211> LENGTH: 21
<212> TYPE: RNA
<213> ORGANISM: Artificial Sequence
<220> FEATURE:
<223> OTHER INFORMATION: siRNA sequence

<400> SEQUENCE: 139
cguuagugga acagcauuuu u                                              21

<210> SEQ ID NO 140
<211> LENGTH: 21
<212> TYPE: RNA
<213> ORGANISM: Artificial Sequence
<220> FEATURE:
<223> OTHER INFORMATION: siRNA sequence

<400> SEQUENCE: 140
aaaugcuguu ccacuaacgu u                                              21

<210> SEQ ID NO 141
<211> LENGTH: 21
<212> TYPE: RNA
<213> ORGANISM: Artificial Sequence
<220> FEATURE:
<223> OTHER INFORMATION: siRNA sequence

<400> SEQUENCE: 141
ggggaaauau gauaauuuau u                                              21

<210> SEQ ID NO 142
<211> LENGTH: 21
<212> TYPE: RNA
<213> ORGANISM: Artificial Sequence
<220> FEATURE:
<223> OTHER INFORMATION: siRNA sequence

<400> SEQUENCE: 142
uaaaccauca uauuuccccu u                                              21

<210> SEQ ID NO 143
<211> LENGTH: 21
<212> TYPE: RNA
<213> ORGANISM: Artificial Sequence
<220> FEATURE:
<223> OTHER INFORMATION: siRNA sequence

<400> SEQUENCE: 143
```

```
gcagaugacu uaaguggaau u                                              21

<210> SEQ ID NO 144
<211> LENGTH: 21
<212> TYPE: RNA
<213> ORGANISM: Artificial Sequence
<220> FEATURE:
<223> OTHER INFORMATION: siRNA sequence

<400> SEQUENCE: 144
uuccacuuaa gucaucugcu u                                              21

<210> SEQ ID NO 145
<211> LENGTH: 21
<212> TYPE: RNA
<213> ORGANISM: Artificial Sequence
<220> FEATURE:
<223> OTHER INFORMATION: siRNA sequence

<400> SEQUENCE: 145
cggcagaugg ugauaaaucu u                                              21

<210> SEQ ID NO 146
<211> LENGTH: 21
<212> TYPE: RNA
<213> ORGANISM: Artificial Sequence
<220> FEATURE:
<223> OTHER INFORMATION: siRNA sequence

<400> SEQUENCE: 146
gauuuaucac caucugccgu u                                              21

<210> SEQ ID NO 147
<211> LENGTH: 21
<212> TYPE: RNA
<213> ORGANISM: Artificial Sequence
<220> FEATURE:
<223> OTHER INFORMATION: siRNA sequence

<400> SEQUENCE: 147
cgugagggcc guucgcuauu u                                              21

<210> SEQ ID NO 148
<211> LENGTH: 21
<212> TYPE: RNA
<213> ORGANISM: Artificial Sequence
<220> FEATURE:
<223> OTHER INFORMATION: siRNA sequence

<400> SEQUENCE: 148
auagcgaacg gcccucacgu u                                              21

<210> SEQ ID NO 149
<211> LENGTH: 21
<212> TYPE: RNA
<213> ORGANISM: Artificial Sequence
<220> FEATURE:
<223> OTHER INFORMATION: siRNA sequence

<400> SEQUENCE: 149
acgagaugug caagaaguuu u                                              21

<210> SEQ ID NO 150
<211> LENGTH: 21
<212> TYPE: RNA
```

```
<213> ORGANISM: Artificial Sequence
<220> FEATURE:
<223> OTHER INFORMATION: siRNA sequence

<400> SEQUENCE: 150
aacuucuugc acaucucguu u                                              21

<210> SEQ ID NO 151
<211> LENGTH: 21
<212> TYPE: RNA
<213> ORGANISM: Artificial Sequence
<220> FEATURE:
<223> OTHER INFORMATION: siRNA sequence

<400> SEQUENCE: 151
auucaagaga cuuucgauau u                                              21

<210> SEQ ID NO 152
<211> LENGTH: 21
<212> TYPE: RNA
<213> ORGANISM: Artificial Sequence
<220> FEATURE:
<223> OTHER INFORMATION: siRNA sequence

<400> SEQUENCE: 152
uaucgaaagu cucuugaauu u                                              21

<210> SEQ ID NO 153
<211> LENGTH: 21
<212> TYPE: RNA
<213> ORGANISM: Artificial Sequence
<220> FEATURE:
<223> OTHER INFORMATION: siRNA sequence

<400> SEQUENCE: 153
acacaugccg uaugguauau u                                              21

<210> SEQ ID NO 154
<211> LENGTH: 21
<212> TYPE: RNA
<213> ORGANISM: Artificial Sequence
<220> FEATURE:
<223> OTHER INFORMATION: siRNA sequence

<400> SEQUENCE: 154
uauaccauac ggcauguguu u                                              21

<210> SEQ ID NO 155
<211> LENGTH: 21
<212> TYPE: RNA
<213> ORGANISM: Artificial Sequence
<220> FEATURE:
<223> OTHER INFORMATION: siRNA sequence

<400> SEQUENCE: 155
gcuuauuggu caucuaauuu u                                              21

<210> SEQ ID NO 156
<211> LENGTH: 21
<212> TYPE: RNA
<213> ORGANISM: Artificial Sequence
<220> FEATURE:
<223> OTHER INFORMATION: siRNA sequence

<400> SEQUENCE: 156
aauuagauga ccaauaagcu u                                              21
```

<210> SEQ ID NO 157
<211> LENGTH: 21
<212> TYPE: RNA
<213> ORGANISM: Artificial Sequence
<220> FEATURE:
<223> OTHER INFORMATION: siRNA sequence

<400> SEQUENCE: 157
cguaucaagu gguguguauu u                                              21

<210> SEQ ID NO 158
<211> LENGTH: 21
<212> TYPE: RNA
<213> ORGANISM: Artificial Sequence
<220> FEATURE:
<223> OTHER INFORMATION: siRNA sequence

<400> SEQUENCE: 158
auacacacca cuugauacgu u                                              21

<210> SEQ ID NO 159
<211> LENGTH: 21
<212> TYPE: RNA
<213> ORGANISM: Artificial Sequence
<220> FEATURE:
<223> OTHER INFORMATION: siRNA sequence

<400> SEQUENCE: 159
gguaguaaca ugccgauaau u                                              21

<210> SEQ ID NO 160
<211> LENGTH: 21
<212> TYPE: RNA
<213> ORGANISM: Artificial Sequence
<220> FEATURE:
<223> OTHER INFORMATION: siRNA seqeunce

<400> SEQUENCE: 160
uuaucggcau guuacuaccu u                                              21

<210> SEQ ID NO 161
<211> LENGTH: 23
<212> TYPE: DNA
<213> ORGANISM: Gallus gallus

<400> SEQUENCE: 161
ctgctttggt accaggccac cct                                            23

<210> SEQ ID NO 162
<211> LENGTH: 23
<212> TYPE: DNA
<213> ORGANISM: Gallus gallus

<400> SEQUENCE: 162
ctgcaaaatc tcaccgggga tca                                            23

<210> SEQ ID NO 163
<211> LENGTH: 23
<212> TYPE: DNA
<213> ORGANISM: Gallus gallus

<400> SEQUENCE: 163
tggacttgat gattcctgtg cag                                            23

```
<210> SEQ ID NO 164
<211> LENGTH: 23
<212> TYPE: DNA
<213> ORGANISM: Gallus gallus

<400> SEQUENCE: 164
ctggcatagt tttccactaa acg                                              23

<210> SEQ ID NO 165
<211> LENGTH: 23
<212> TYPE: DNA
<213> ORGANISM: Gallus gallus

<400> SEQUENCE: 165
cccaggtacc tggctgtcag cag                                              23

<210> SEQ ID NO 166
<211> LENGTH: 23
<212> TYPE: DNA
<213> ORGANISM: Gallus gallus

<400> SEQUENCE: 166
ctgaccataa gaattaatgt tta                                              23

<210> SEQ ID NO 167
<211> LENGTH: 23
<212> TYPE: DNA
<213> ORGANISM: Gallus gallus

<400> SEQUENCE: 167
ctgctacata tgacctctcg gtg                                              23

<210> SEQ ID NO 168
<211> LENGTH: 23
<212> TYPE: DNA
<213> ORGANISM: Gallus gallus

<400> SEQUENCE: 168
tgggatggca cacatagggg cag                                              23

<210> SEQ ID NO 169
<211> LENGTH: 23
<212> TYPE: DNA
<213> ORGANISM: Gallus gallus

<400> SEQUENCE: 169
ctgcatagag ctaagagtca cag                                              23
```

TRANSGENIC CHICKEN THAT EXPRESSES A FLUORESCENT PROTEIN AND SIAT1

FIELD OF THE INVENTION

The present invention relates to transgenic avians and the eggs produced therefrom wherein the eggs comprise a genetic modification that facilitates in ovo gender sorting and a genetic modification that increases a production trait in the eggs or the avians produced therefrom. The present invention also relates to methods of identifying the gender of eggs before hatching and methods of sorting the eggs based on gender before hatching.

BACKGROUND OF THE INVENTION

Genetics has played a major role in the domestication of poultry and has contributed to the high performance of the two major types of commercial birds; broilers and layers, used to generate meat and eggs respectively. The dramatic difference in the metabolism of these two lines means that male birds generated in the layer industry are not commercially viable to grow out for meat, in most commercial settings. As a result males are identified following hatch, by manual sexing or feather colour identification, and immediately euthanized, with a low value recovery of nutrient from their carcasses. This practice presents a major and growing ethical issue that impacts the egg layer industry and incurs costs and production value losses to farmers. It is also noted that the United Egg Producers in the USA have recently announced their goal to remove the practice of male culling by 2020. It is likely that other countries will follow this lead.

The ability to detect and remove male chicks pre-hatch would be a big step forward to the egg laying and related industries. The current practice of culling male chicks post-hatch creates a major ethical dilemma for many countries. Hatching out and growing male layer chicks is not a sustainable option for farmers. Identification of male eggs before hatching would allow them to be separated from female eggs and used in a different production process such as vaccine production which can use eggs as bioreactors for producing virus required for vaccine production thus reducing waste in the system.

Several methods are being developed for in ovo sexing and are based on hormone measurement (Weissmann et al., 2013), DNA analysis (Porat et al., 2011) and more recently Raman spectroscopy (Galli et al., 2016). DNA and hormone testing require sampling and processing which is both time consuming and expensive and not ideal for industry uptake. Raman spectroscopy is a major advance however it involves creating a large hole in the egg shell for contactless analysis which then requires sealing with adhesive tape. With all of these methods it is not possible to screen eggs at point of lay and prior to incubation. An in ovo sexing method that could do this would be more desirable to industry and more readily integrated into existing industry practices. It is against this background that the present inventors have developed a genetic approach to screen embryos at point of lay, to allow removal of male eggs prior to hatching for use in alternate production processes.

SUMMARY OF THE INVENTION

In an aspect, the present invention provides a transgenic avian egg comprising:
i) a first genetic modification on a Z chromosome which encodes a marker detectable in the egg; and
ii) a second genetic modification which modifies a production trait in the egg, and/or avian produced by the egg, when compared to an isogenic egg or avian lacking the second genetic modification.

In a preferred embodiment, the second genetic modification is on the same Z chromosome as the first genetic modification.

In an embodiment, the genetic modifications are maternally inherited.

In an embodiment, the egg is male. In an alternate embodiment, the egg is female.

In an embodiment, the first genetic modification and the second genetic modification are the same genetic modification. For instance, the first genetic modification can be a transgene that is inserted into an endogenous gene, resulting in the gene no longer encoding a functional protein such as the interferon I and II genes on the Z chromosome. In this example, the disrupted endogenous gene is the second genetic modification.

In an embodiment, the marker is detectable without disrupting the integrity of the shell of the egg.

In an embodiment, the marker is detectable within one day, or two days, of the point of lay without disrupting the integrity of the shell of the egg.

In an embodiment, the marker is a fluorescent protein, a luminescent protein, an audible (vibrating protein), a sonic protein, a metabolic marker or a selective chelating protein.

In an embodiment, the marker is a fluorescent protein. In an embodiment, the fluorescent protein is selected from, but not limited to, Green fluorescent protein (GFP), Enhanced green fluorescent protein (EGFP), Emerald, Superfolder GFP, Azami Green, mWasabi, TagGFP, TurboGFP, mNeonGreen, mUKG, AcGFP, ZsGreen, Cloverm Sapphire, T-Sapphire, Enhanced blue fluorescent protein (EBFP), EBFP2, Azurite, TagBFP, mTagBFP, mKalama1, Cyan fluorescent protein (CFP), mCFP, Enhanced cyan fluorescent protein (ECFP), mECFP, Cerulean, SCFP3A, mTurquoise, mTurquoise2, CyPet, AmCyan1, Midori-Ishi Cyan, TagCFP, mTFP1 (Teal), Yellow fluorescent protein (YFP), Enhanced yellow fluorescent protein (EYFP), Super yellow fluorescent protein (SYFP), Topaz, Venus, Citrine, mCitrine, YPet, TagYFP, TurboYFP, PhiYFP, ZsYellow1, mBanana, Kusabira Orange, Kusabira Orange2, mOrange, mOrange2, dTomato, dTomato-Tandem, Red fluorescent protein (RFP), TurboRFP, TurboFP602, TurboFP635, Tag ref fluorescent protein (RFP), TagRFP-T, DsRed, DsRed2, DsRed-Express (T1), DsRed-Monomer, mTangerine, mKeima-Red, mRuby, mRuby2, mApple, mStrawberry, AsRed2, mRFP1, JRed, mCherry, mKate2, mKate (TagFP635), HcRed1, mRaspberry, dKeima-Tandem, HcRed-Tandem, mPlum, mNeptune, NirFP, Sirius, TagRFP657, AQ143, Kaede, KikGR1, PX-CFP2, mEos2, IrisFP, mEOS3.2, PSmOrange, PAGFP, Dronpa, Allophycocyanin, GFPuv, R-phycoerythrin (RPE), Peridinin Chlorophyll (PerCP), P3, Katusha, B-phycoerythrin (BPE), mKO, and J-Red. In an embodiment, the fluorescent protein is RFP. In an embodiment, the fluorescent protein is GFP.

In an embodiment, the marker is a luminescent protein. In an embodiment, the luminescent protein is selected from aequorin or luciferase.

In an embodiment, the first and/or second genetic modifications are the result of an insertion, substitution or deletion. In an embodiment, the insertion is the insertion of a transgene.

In an embodiment, the first and/or second genetic modifications are transgenes.

In an embodiment, the first and/or second genetic modifications are in a single exogenous genetic construct.

In an embodiment, the first and/or second genetic modifications are introduced with a programmable nuclease.

In an embodiment, the production trait is selected from, but not limited to, virus production, recombinant protein production, muscle mass, nutritional content and fertility.

In an embodiment, the production trait is virus production and the second genetic modification reduces the expression of an antiviral gene and/or protein in the egg when compared to an isogenic egg lacking the second genetic modification wherein the egg is capable of producing more virus than the isogenic egg.

In an embodiment, the antiviral gene and/or protein is selected from, but not limited to, IFNAR1, CNOT4, MDA5, IFNα, IFNβ, IFNγ, IFNλ, IFNAR2, UBE1DC1, GNAZ, CDX2, LOC100859339, IL28RA, ZFPM2, TRIM50, DNASEIL2, PHF21A, GAPDH, BACE2, HSBP1, PCGF5, IL-1RA, DDI2, CAPN13, UBA5, NPR2, IFIH1, LAMP1, EFR3A, ARRDC3, ABI1, SCAF4, GADL1, ZKSCAN7, PLVAP, RPUSD1, CYYR1, UPF3A, ASAP1, NXF1, TOP1MT, RALGAPB, SUCLA2, GORASP2, NSUN6, CELF1, ANGPTL7, SLC26A6, WBSCR27, SIL1, HTT, MYOC, TM9SF2, CEP250, FAM188A, BCAR3, GOLPH3L, HN1, ADCY7, AKAP10, ALX1, CBLN4, CRK, CXORF56, DDX10, EIF2S3, ESF1, GBF1, GCOM1, GTPBP4, HOXB9, IFT43, IMP4, ISY1, KIAA0586, KPNA3, LRRIQ1, LUC7L, MECR, MRPL12, POLR3E, PWP2, RPL7A, SERPINH1, SLC47A2, SMYD2, STAB1, TTK, WNT3, IFNGR1, IFNGR2, IL-10R2, IFNκ, IFNΩ, IL-1RB and XPO1.

In an embodiment, the antiviral gene and/or protein is selected from, but not limited to, IFNAR1, IL-6, CNOT4, MDA5, IFNα, IFNβ, IFNγ, IFNλ, BACE2, UBA5, ZFPM2, TRIM50, DDI2, NPR2, CAPN13, DNASE1L2, PHF21A, PCGF5, IFNLR1, IFIH1, LAMP1, EFR3A, ABI1, GADL1, PLVAP, CYYR1, ASAP1, NXF1, NSUN6, ANGPTL7, SIL1, BCAR3, GOLPH3L, HN1, ADCY7, CBLN4, CXORF56, DDX10, EIF2S3, ESF1, GCOM1, GTPBP4, IFT43, KPNA3, LRRIQ1, LUC7L, MRPL12, POLR3E, PWP2, RPL7A, SMYD2, XPO1 and ZKSCAN7.

In an embodiment, the antiviral gene and/or protein is selected from IFNAR1, IL-6, CNOT4, MDA5, IFNα, IFNβ, IFNγ and IFNλ.

In an embodiment, the antiviral gene and/or protein is IFNAR1. In an embodiment, the antiviral gene and/or protein is IL-6. In an embodiment, the antiviral gene and/or protein is MDA5. In an embodiment, the antiviral gene and/or protein is CNOT4. In another embodiment, the antiviral gene and/or protein is IFNα. In another embodiment, the antiviral gene and/or protein is IFNβ. In another embodiment, the antiviral gene and/or protein is IFNγ. In another embodiment, the antiviral gene and/or protein is IFNλ.

In an embodiment, the second genetic modification is a deletion, substitution or an insertion into the antiviral gene or a regulatory region thereof.

In an embodiment, the production trait is virus production and the second genetic modification modifies glycosylation in the avian egg wherein the virus produced by the egg has increased immunogenicity compared to virus produced by the isogenic egg.

In an embodiment, the production trait is virus production and the second genetic modification modifies sialylation in the avian egg, wherein the virus produced by the egg has increased immunogenicity compared to virus produced by the isogenic egg.

In an embodiment, the production trait is virus production and the second genetic modification increases α-2,6-linked sialic acid (α-2,6-sialylation) in the avian egg wherein the virus produced by the egg has increased immunogenicity compared to virus produced by the isogenic egg.

In an embodiment, the production trait is virus production and the second genetic modification increases expression of the SIAT1 gene and/or protein in the egg when compared to an isogenic egg lacking the second genetic modification and wherein the virus produced by the egg has increased immunogenicity compared to virus produced by the isogenic egg.

In an embodiment, the production trait is virus production and the second genetic modification increases the amount of α-2,6-linked sialic acid and decreases the amount of α-2,3-linked sialic acid in the egg when compared to an isogenic egg lacking the second genetic modification, and wherein the virus produced by the egg has increased immunogenicity compared to virus produced by the isogenic egg.

In an embodiment, the production trait is virus production and the second genetic modification increases expression of an antimicrobial protein in the egg when compared to an isogenic egg lacking the second genetic modification and wherein the egg is capable of producing more virus than the isogenic egg. In an embodiment, the antimicrobial protein is ovotransferrin. In an embodiment, the antimicrobial protein is a microbial beta-defensin.

In an embodiment, the production trait is recombinant protein production and the second genetic modification results in expression of a recombinant protein in the egg. In an embodiment, the recombinant protein is a therapeutic protein.

In an embodiment, the genetic modification is the insertion of a transgene encoding a fluorescent protein in the Z chromosome of the avian, wherein the insertion modifies the expression of a gene and/or protein which modifies a production trait in an egg and/or avian produced by the avian.

In an embodiment, the avian is a chicken.

In another aspect, the present invention provides a transgenic avian comprising:

i) a first genetic modification on a Z chromosome which encodes a marker detectable in an egg produced by the avian; and ii) a second genetic modification which modifies a production trait in the egg, and/or avian produced by the egg, when compared to an isogenic egg or avian lacking the second genetic modification.

In a preferred embodiment, the second genetic modification is on the same Z chromosome as the first genetic modification.

In an embodiment, the avian is female.

In an embodiment, the avian is male.

In an embodiment, the transgenic male avian is heterozygous for the genetic modifications. Such avians can be crossed with a transgenic female avian which has the same genetic modifications on the Z chromosome as the male to produce a grandparent male for use in a breeding process of the invention (see FIG. 2).

In another embodiment, the transgenic male avian is homozygous for the genetic modifications. Such avians can be crossed with a non-transgenic female avian to produce a parent female for use in a breeding process of the invention (see FIG. 2).

As the skilled person would be aware, a transgenic female avian of the invention may have any of the features outlined above defined for a transgenic male avian of the invention.

In a further aspect, the present invention provides for an avian egg or progeny produced by the transgenic avian as described herein.

In an embodiment, the avian egg is a male egg having increased virus production when compared to an isogenic egg lacking the second genetic modification.

In an alternate embodiment, the avian egg is a male egg which is modified to produce a less egg adapted virus compared to an isogenic egg lacking the second genetic modification. In an embodiment, the second genetic modification results in increased expression of the SIAT gene and/or protein in the male egg. In an embodiment, the second genetic modification results in increased α-2,6 sialic acid in the male egg. In an embodiment, the second genetic modification results in decreased α-2,3 sialic acid in the male egg.

In a further embodiment, the egg produces a recombinant therapeutic protein.

In yet another aspect, the present invention provides for a method for detecting a male avian egg, the method comprising:
  i) obtaining an avian egg produced by crossing a transgenic female avian of the invention with a male avian lacking the first genetic modification, and
  ii) screening the egg for the marker,
wherein the egg is male if it has the marker.

In an embodiment, the male in step i) is not transgenic.

In an embodiment, the marker is a fluorescent protein or audible protein.

In an embodiment, the maker is a fluorescent protein and the marker is screened for by exposing the egg to a first wavelength of light and assessing for fluorescence at a second wavelength of light.

In an embodiment, the method is used for high volume gender sorting of avian eggs. In an embodiment, the male eggs are selected and used for virus production or production of therapeutic proteins. In an embodiment, the female eggs are selected for egg production (for food) and/or meat production. In an embodiment, the female eggs are not transgenic.

In an embodiment, the method is automated.

In another aspect, the present invention provides a method for gender sorting avian eggs, the method comprising:
  i) obtaining an avian egg produced by crossing a female avian as described herein with a male avian,
  ii) screening the egg for the marker, and
  iii) separating the male eggs from the female eggs,
wherein the egg is male if it has the marker and the egg is female if it lacks the marker.

In a further aspect, the present invention provides a method of producing an avian egg, the method comprising crossing a female avian as described herein with a male avian. In an embodiment, the male avian does not comprise the first genetic modification and the second genetic modification as described herein. In an embodiment, the female eggs produced by the crossing do not comprise the first genetic modification and the second genetic modification as described herein.

In an aspect, the present invention provides a method of producing food, the method comprising:
  (i) obtaining an avian by crossing a female avian with a male avian, wherein at least one of the avians is an avian of the invention, and
  (ii) harvesting meat and/or eggs from the avian.

In an embodiment, the female is an avian of the invention.

In another aspect, the present invention provides a method of replicating a virus, the method comprising;
  1) obtaining an avian egg as described herein,
  2) inoculating the egg with the virus, and
  3) incubating the egg for a predetermined period of time to replicate the virus.

In an embodiment, the second genetic modification reduces the expression of an antiviral gene in the egg when compared to an isogenic egg lacking the second genetic modification In an embodiment, the method as described herein further comprises harvesting the replicated virus or particles thereof from the egg.

In an embodiment, the harvesting comprises obtaining the allantoic fluid from the egg.

Also provided is a virus produced using the avian egg as described herein, and/or using the method as described herein.

In an aspect, the present invention provides a method of producing a vaccine composition, the method comprising;
  1) replicating a virus using the method as described herein,
  2) harvesting the replicated virus or particles thereof from the egg, and
  3) preparing a vaccine composition from the harvested virus.

In an embodiment, step 2) or step 3) comprises inactivating the virus.

In an embodiment, the virus is an animal virus. In an embodiment, the animal is a human, chicken, pig, fish, sheep or cow. In an embodiment, the animal is a human.

In an embodiment, the virus is in a family selected from, but not limited to, Orthomyxoviridae, Herpesviridae, Paramyxoviridae, Flaviviridae and Coronaviridae.

In an embodiment, the virus in selected from, but not limited to, Influenza virus, Canine distemper virus, Measles virus, Reovirus, Eastern equine encephalitis virus, Canine parainfluenza virus, Rabies virus, Fowlpox virus, Western equine encephalitis virus, Mups virus, Equine encephalomyelitis, Rubella virus, Egg drop syndrome virus, Avian oncolytic viruses, Newcastle disease virus, Bovine parainfluenza virus, Smallpox virus, Infectious bursal disease, Bovine Ibaraki virus, Recombinant poxvirus, Avian adenovirus type I, II or III, Swine Japanese encephalitis virus, Yellow fever virus, Herpos virus, Sindbis virus, Infections bronchitis virus, Semliki forest virus, Encephalomyelitis virus, Venezuelan EEV virus, Chicken anemia virus, Marek's disease virus, Parvovirus, Foot and mouth disease virus, Porcine reproductive and respiratory syndrome virus, Classical swine fever virus, Bluetongue virus, Kabane virus, Infectious salmon anemia virus, Infectious hematopoietic necrosis virus, Viral haemorrhagic septicaemia virus and Infectious pancreatic necrosis virus. In an embodiment, the virus is the Influenza virus.

In an aspect, the present invention provides a vaccine composition produced using the method as described herein.

In an aspect, the present invention provides a method of producing a transgenic avian egg, or an avian produced by the egg, the egg or avian comprising i) a first genetic modification on a Z chromosome which encodes a marker detectable in an avian egg, and
ii) a second genetic modification on the same Z chromosome which modifies a production trait in the egg, and/or avian produced by the egg, when compared to an isogenic egg or avian lacking the second genetic modification, the method comprising crossing a male avian which is heterozygous for the genetic modifications with a female avian comprising the genetic modifications on the Z chromosome to produce a male egg or avian therefrom which is homozygous for the genetic modifications.

In an aspect, the present invention provides a method of producing a transgenic avian egg, or avian produced by the egg, the egg or avian comprising
i) a first genetic modification on a Z chromosome which encodes a marker detectable in an avian egg, and
ii) a second genetic modification on the same Z chromosome which modifies a production trait in the egg, and/or avian produced by the egg, when compared to an isogenic egg or avian lacking the second genetic modification, the method comprising crossing a male avian which is homozygous for the genetic modifications with a female avian lacking the genetic modifications to produce a female egg or avian therefrom comprising the genetic modifications on the Z chromosome.

In an aspect, the present invention provides a method of producing a transgenic avian egg, or avian produced by the egg, the egg or avian comprising
i) a first genetic modification on a Z chromosome which encodes a marker detectable in an avian egg, and
ii) a second genetic modification on the same Z chromosome which modifies a production trait in the egg, and/or avian produced by the egg, when compared to an isogenic egg or avian lacking the second genetic modification, the method comprising crossing a female avian comprising the genetic modifications on the Z chromosome with a male avian lacking the genetic modifications to produce a male egg or avian therefrom which is heterozygous for the genetic modifications, wherein a female egg or avian therefrom produced from the cross lacks the genetic modifications.

In an aspect, the present invention provides a method of producing a transgenic avian egg, or avian produced by the egg, the egg or avian comprising
i) a first genetic modification on a Z chromosome which encodes a marker detectable in an avian egg, and
ii) a second genetic modification on the same Z chromosome which modifies a production trait in the egg, and/or avian produced by the egg, when compared to an isogenic egg or avian lacking the second genetic modification,
1) crossing a male avian which is heterozygous for the genetic modifications with a female avian comprising the genetic modifications on the Z chromosome to produce a male avian which is heterozygous for the genetic modifications,
2) crossing the male avian produced by step 1) with a female avian lacking the genetic modifications to produce a female avian comprising the genetic modifications on the Z chromosome, and
3) crossing the female avian produced by step 2) with a male avian lacking the genetic modifications to produce a male egg or avian therefrom which is heterozygous for the genetic modifications, wherein a female egg or avian therefrom produced from the cross lacks the genetic modifications.

In an embodiment, the method of the methods as described herein, the female avians produced by the method are used for the egg industry and the male eggs produced by the method are used in the vaccine industry.

The steps, features, integers, compositions and/or compounds disclosed herein or indicated in the specification of this application individually or collectively, and any and all combinations of two or more of said steps or features.

Any embodiment herein shall be taken to apply mutatis mutandis to any other embodiment unless specifically stated otherwise. For instance, as the skilled person would understand examples of antiviral genes outlined above for the transgenic avian egg of the invention equally apply to the methods of the invention.

The present invention is not to be limited in scope by the specific embodiments described herein, which are intended for the purpose of exemplification only. Functionally-equivalent products, compositions and methods are clearly within the scope of the invention, as described herein.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

The invention is hereinafter described by way of the following non-limiting Examples and with reference to the accompanying figures.

BRIEF DESCRIPTION OF THE
ACCOMPANYING DRAWINGS

FIG. 1. Overview: selectively hatching female chicks. Sex determination in chickens is defined by the presence of two sex chromosomes, Z and W. The males carry two copies of the Z chromosome (ZZ) and the females carry one Z and one W chromosome (ZW). The single copy of the Z chromosome carried by the female bird is always passed on to the male offspring only and is passed on to ALL of the male offspring. The female offspring can only derive their Z chromosome from a non-modified breeding rooster. A marker on the z chromosome, such as a fluorescent protein like GFP or RFP, is used to remove all males from the egg-layer production system at the earliest stage i.e. prior to incubation and before hatching. Therefore all offspring that go into the production system will be female and completely free of the marked Z chromosome. Male eggs can be diverted for alternate uses such as virus production.

Figure 2:
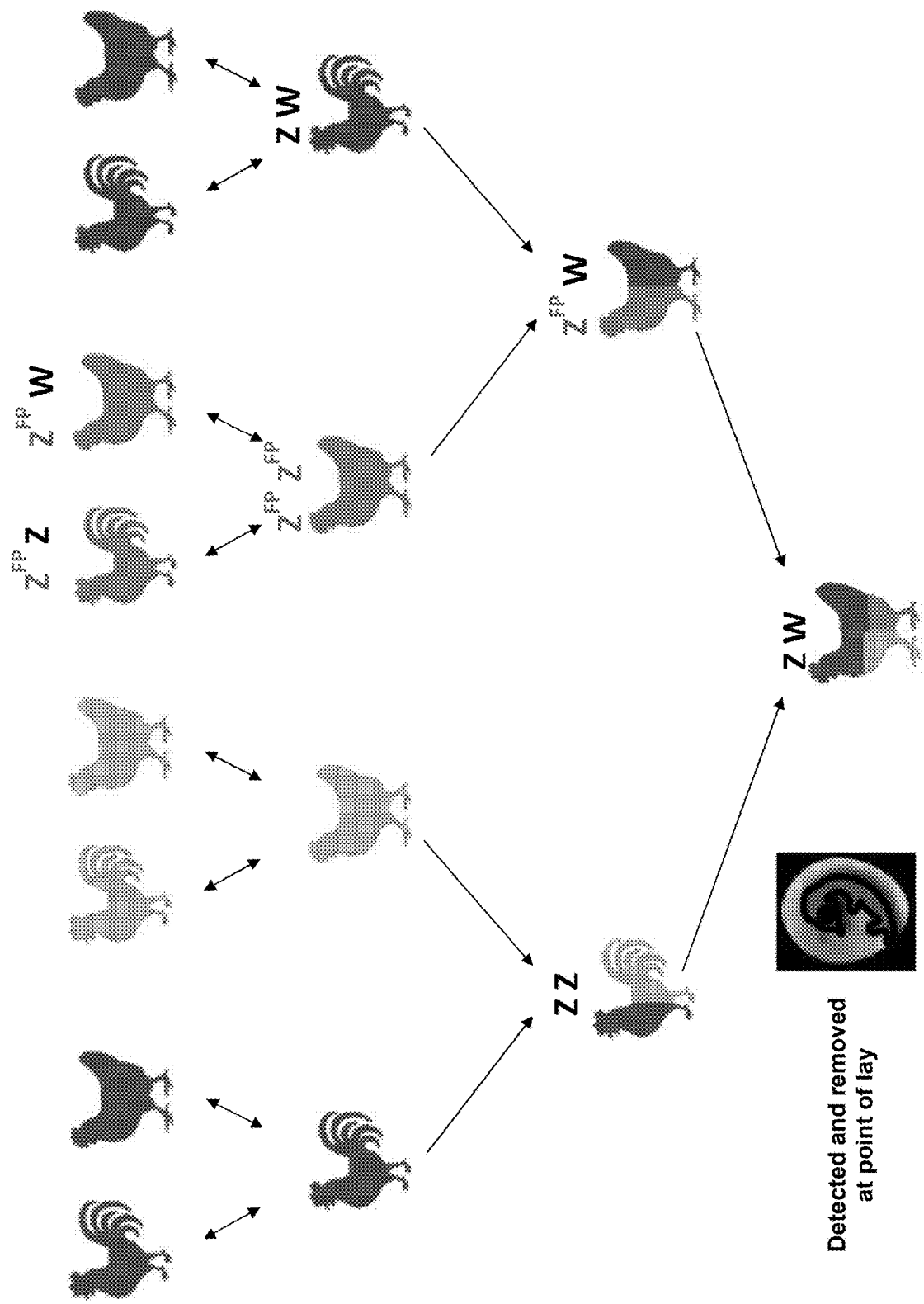

FIG. 2: Shows the layer industry breeding structure and how the modifications of the present invention can be incorporated into the breeding lines for broilers a layers. The top line of chickens represent the great grandparent pedigree lines. The second top line of chickens represent the grandparent lines. The third top line of chickens represent the parent lines. The bottom line represents the commercial layers and male eggs produced during the production of commercial layers from the parental lines. It can be seen that in the commercial industry a genetic modification in the z chromosome, such as a modification which results in the expression of a fluorescent protein (FP) and/or a modification that effects a production trait, present in the great grandparents ($Z^{FP}Z$ and $Z^{FP}W$) can be passed to the male grandparent line ($Z^{FP}Z^{FP}$) which can be passed to females in the parent lines ($Z^{FP}W$) where it is passed to male egg produced by the crossing of the modified female parent ($Z^{FP}W$) with an unmodified male whereas females produced by this crossing will lack the modification.

Figure 3:
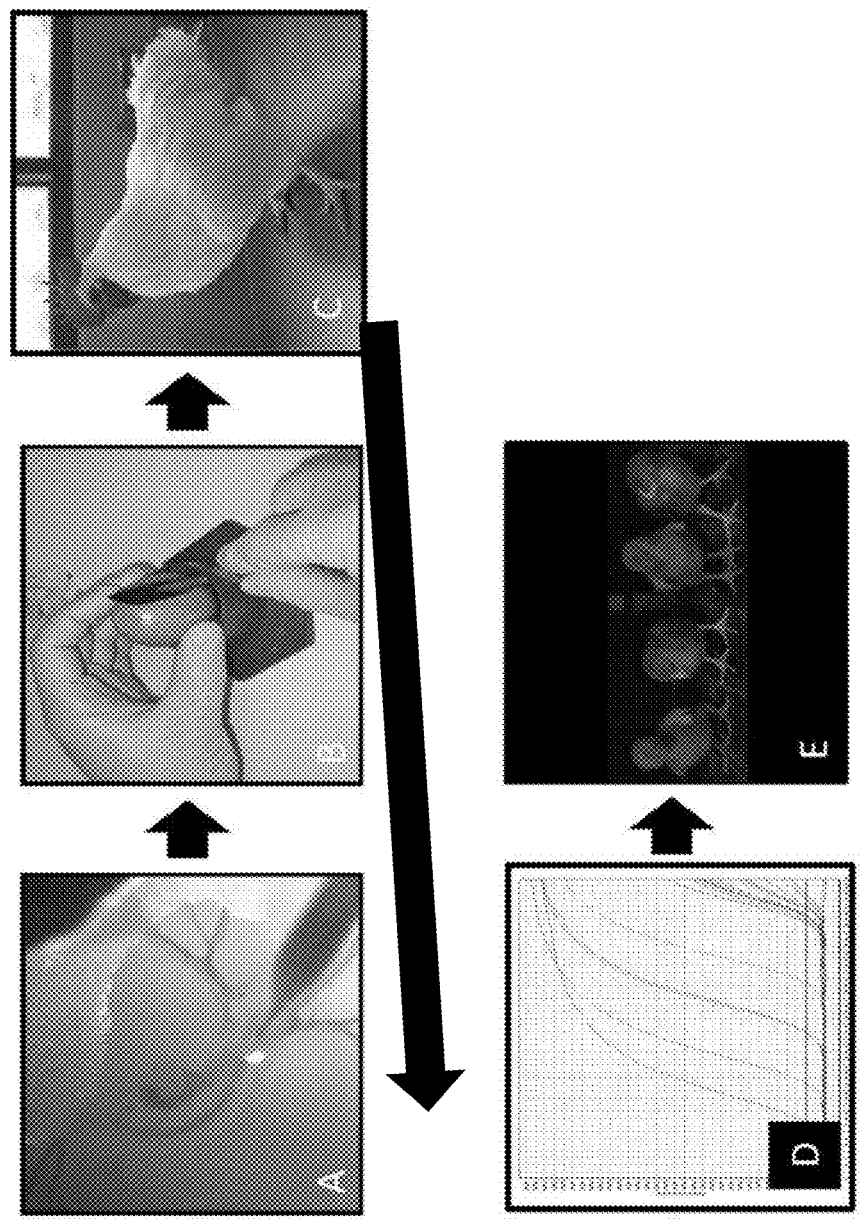

FIG. 3. Production of transgenic chickens via direct in vivo transfection of primordial germ cells (PGCs). A. Direct injection of lipofectamine and DNA constructs (which can include a marker gene such as GFP) into the circulatory system of day 2 embryos (stage 14 HH) to target PGCs as they migrate to the developing gonads. B. Reseal eggs and incubate. C. Embryos are incubated till hatch and males are kept until they reach sexual maturity. D. Semen is collected and screened for presence of the transgene through qPCR. E. Males with high levels of transgenic sperm are breed to hens and offspring are screened visually for presence of the maker gene.

Figure 4:
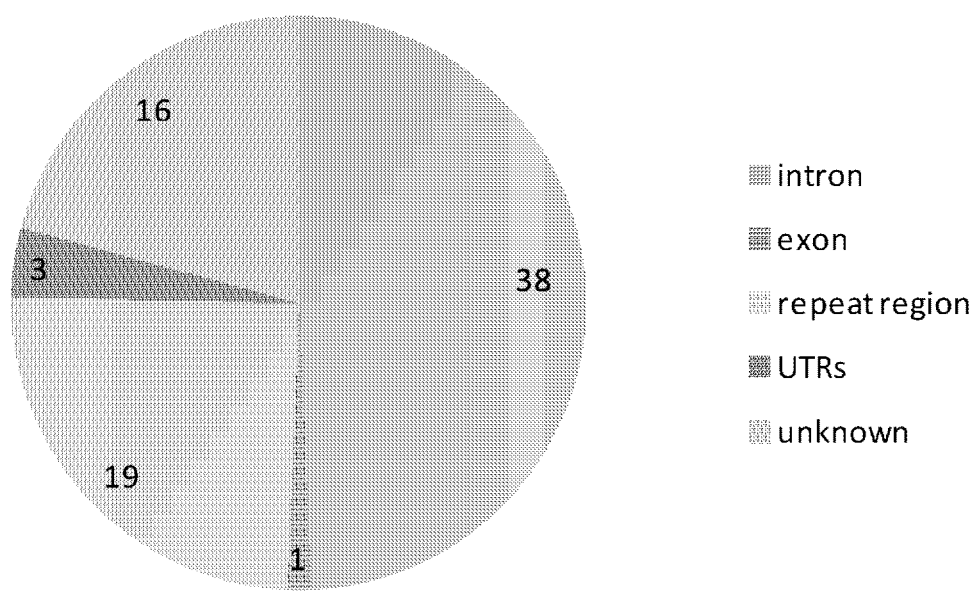
Figure 4:
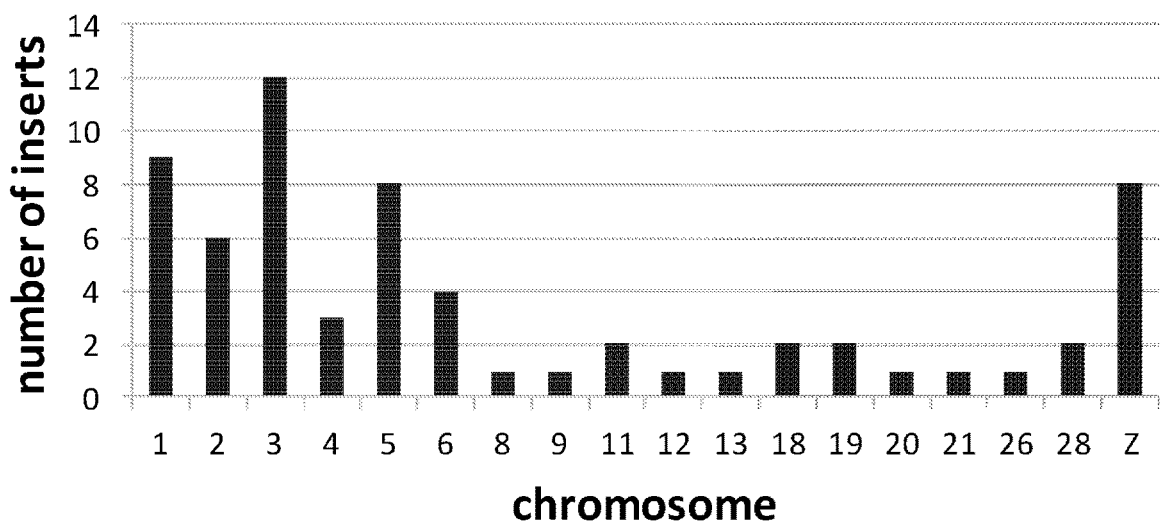

FIG. 4. Analysis of Tol2 insertion sites in germline transgenic chickens. A. Characterisation of the region of the genome that the insertions have occurred. B. Chromosomal distribution of the insertion sites.

Figure 5:
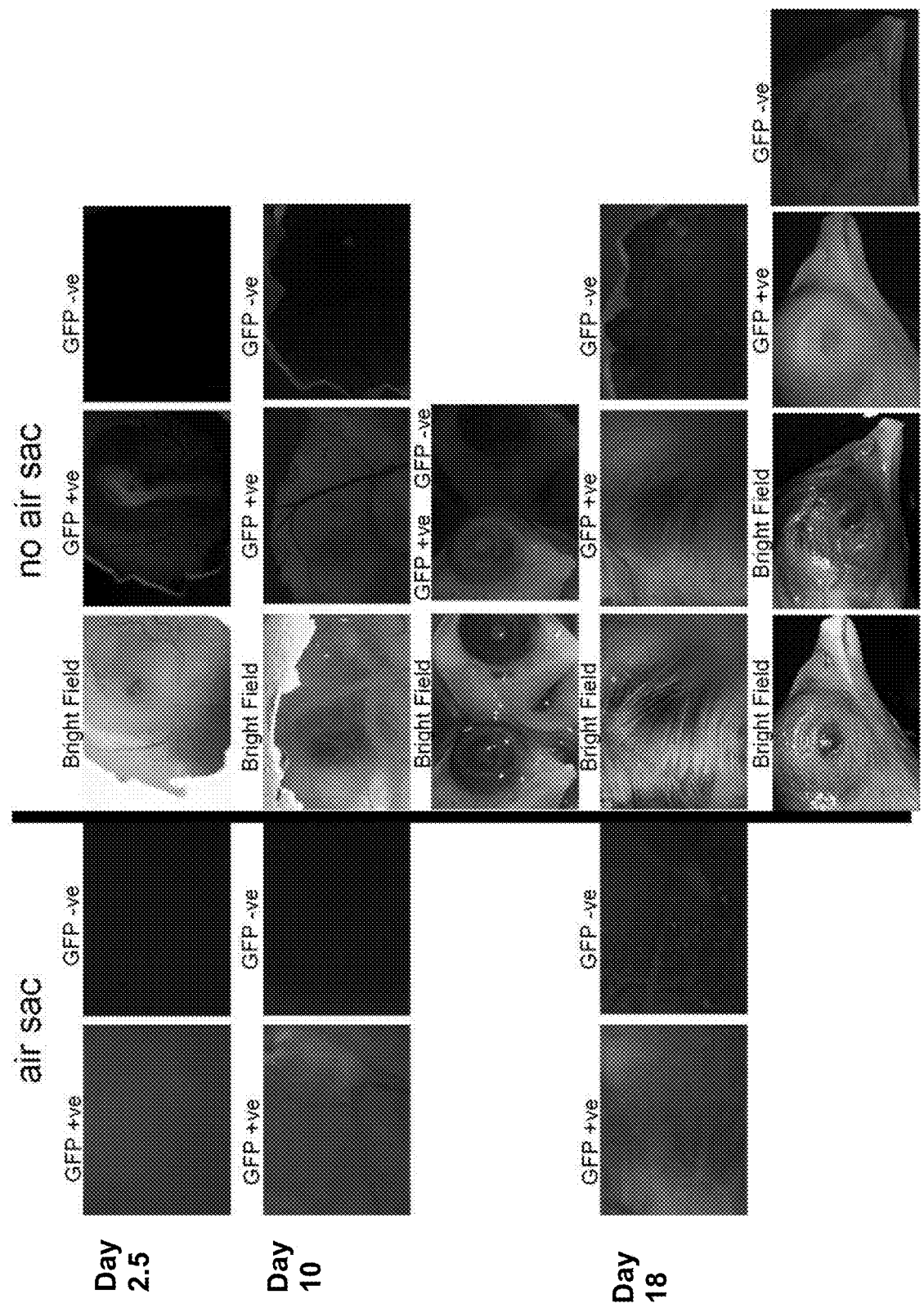

FIG. 5. Detection of GFP fluorescence at various stages of embryo development. Detection of fluorescence at day 2.5, 10 and 18 of embryogenesis using a GFP detection light source with a filter to detect fluorescence.

Figure 6:
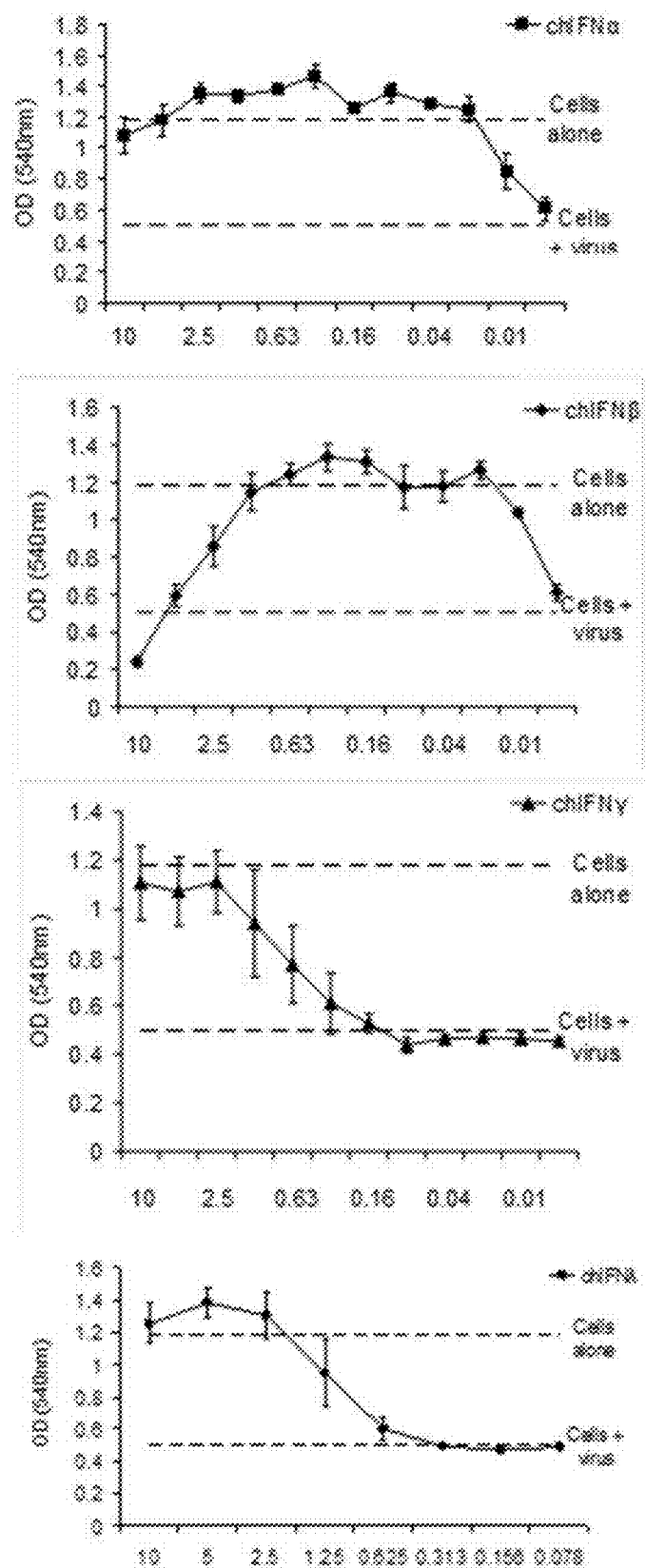

FIG. 6. Antiviral activity of recombinant chicken (rch) IFNα, IFNβ, IFNγ and IFNλ in a virus neutralization assay. An increase in cell viability equates to an increase in the OD. Absorbance values are the means±SE, duplicates from two independent experiments. Cells alone and cells+virus controls are shown as the means from 24 wells.

Figure 7:
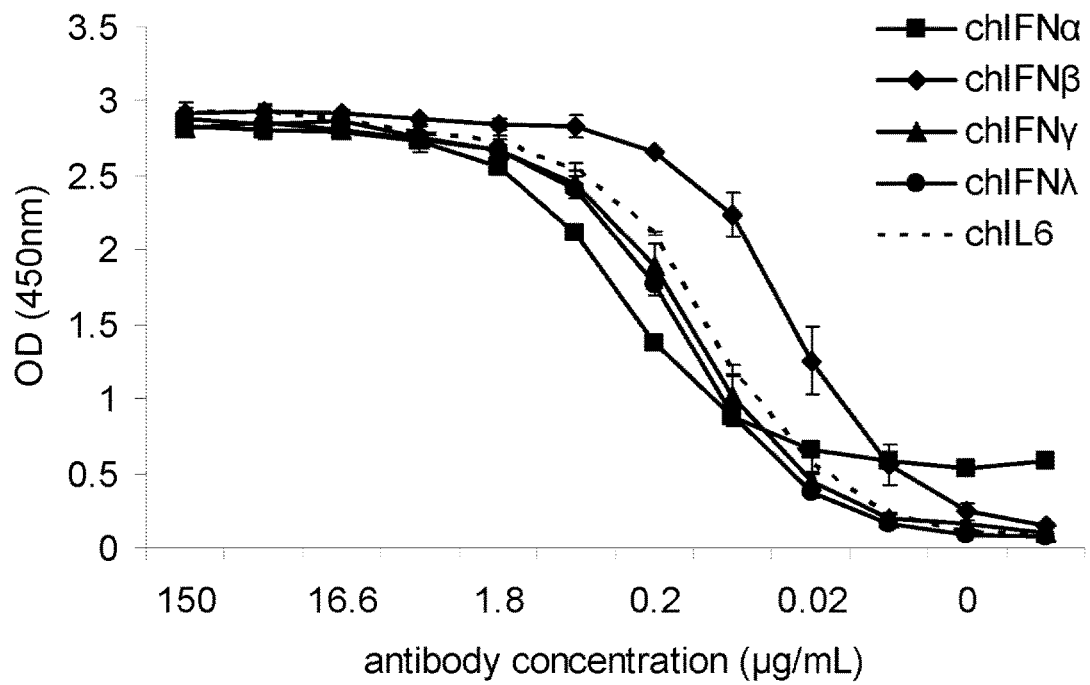
Figure 7:
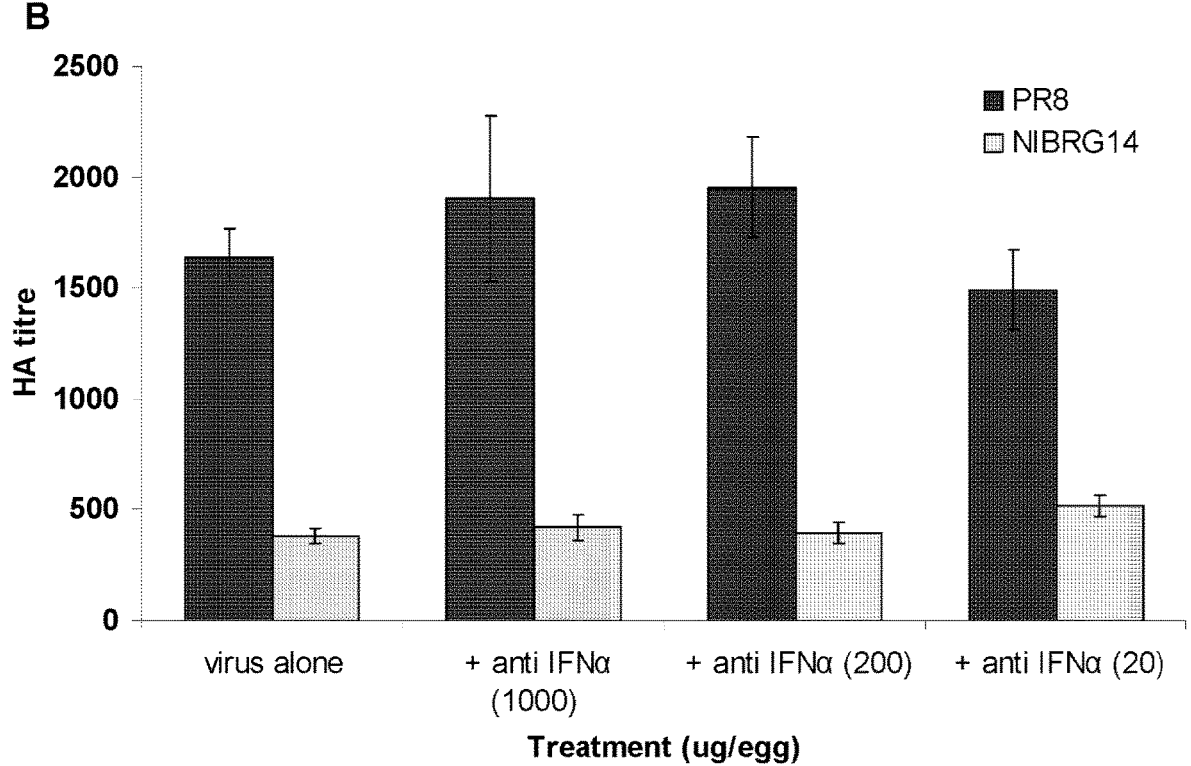
Figure 7:
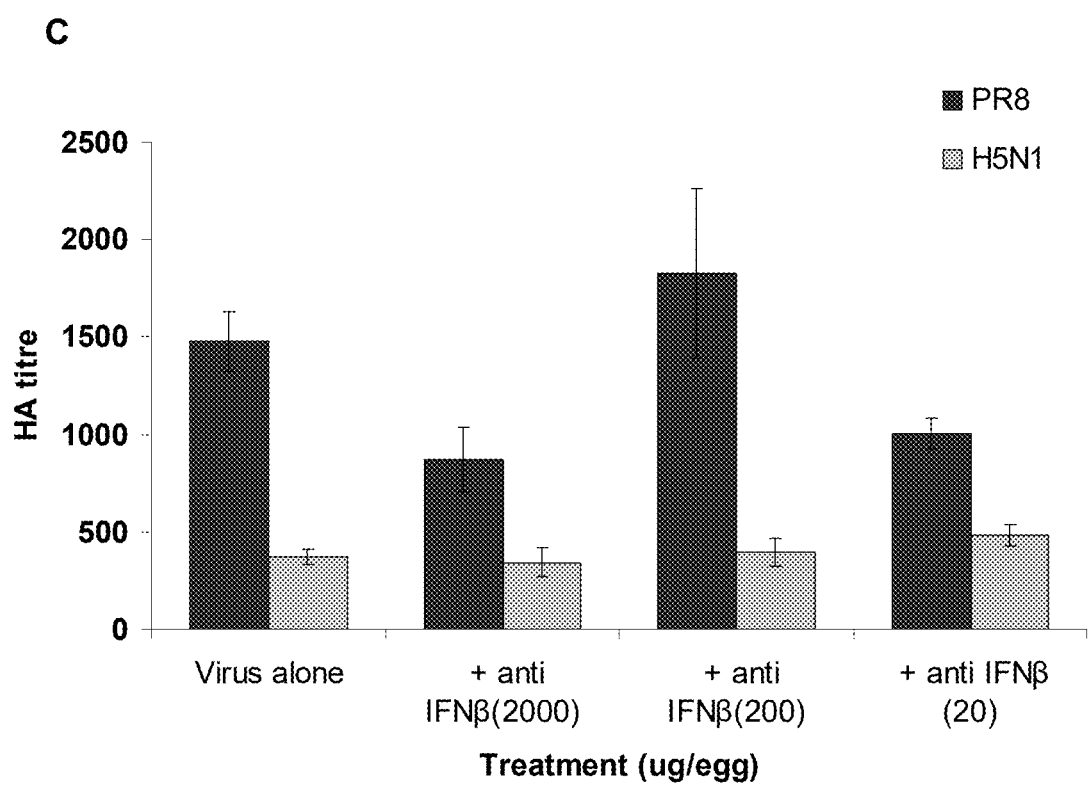

FIG. 7. A. Indirect ELISA analysis reveals that purified anti-IFNs (IFNα, IFNβ, IFNγ and IFNλ) sera recognise homologous protein. The graph shows that ammonium sulphate precipitated polyclonal anti-chIFN antisera detects homologous proteins in ELISA. The OD is a measure of antibody levels. Absorbance values shown are the means±SE, duplicates from two independent experiments. B. Anti-chIFN-α antibodies do not appear to increase virus titre in ovo. Anti-chIFN-α antibodies co-inoculated with influenza vaccine virus (PR8 or NIBRG14) in ovo do not augment the haemagglutination (HA) titre measured by haemagglutination (HA) assay. The bar graph represents the mean of four experiments±SE. C. Anti-chIFN-β antibodies do not appear to increase virus titre in ovo. The co-administration of purified anti-chIFN-β antibodies and influenza vaccine virus (PR8 or NIBRG14) does not affect the virus HA titres in ovo determined by HA assay. The bar graph represents the mean of up to three experiments±SE.

Figure 8:
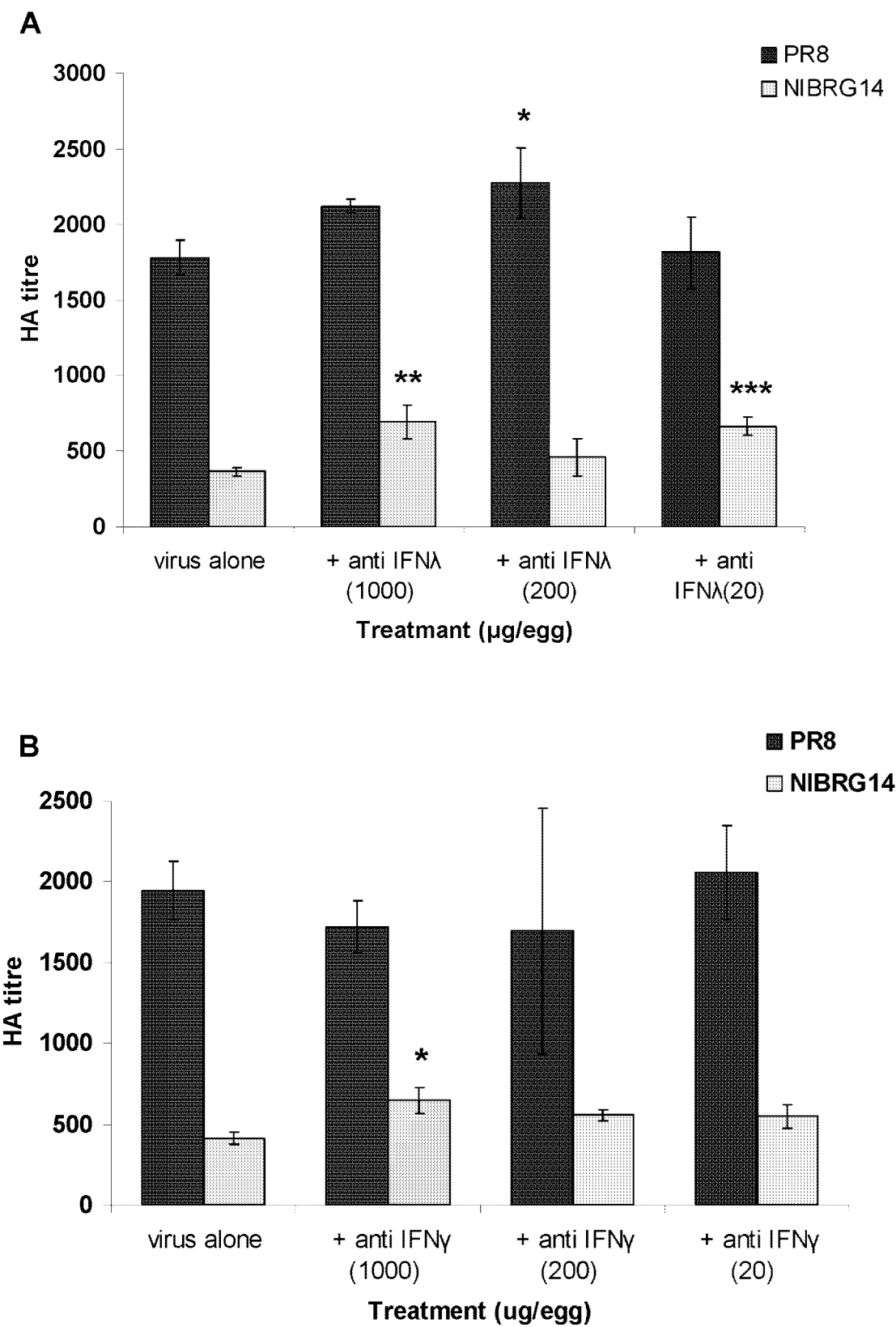
Figure 8:
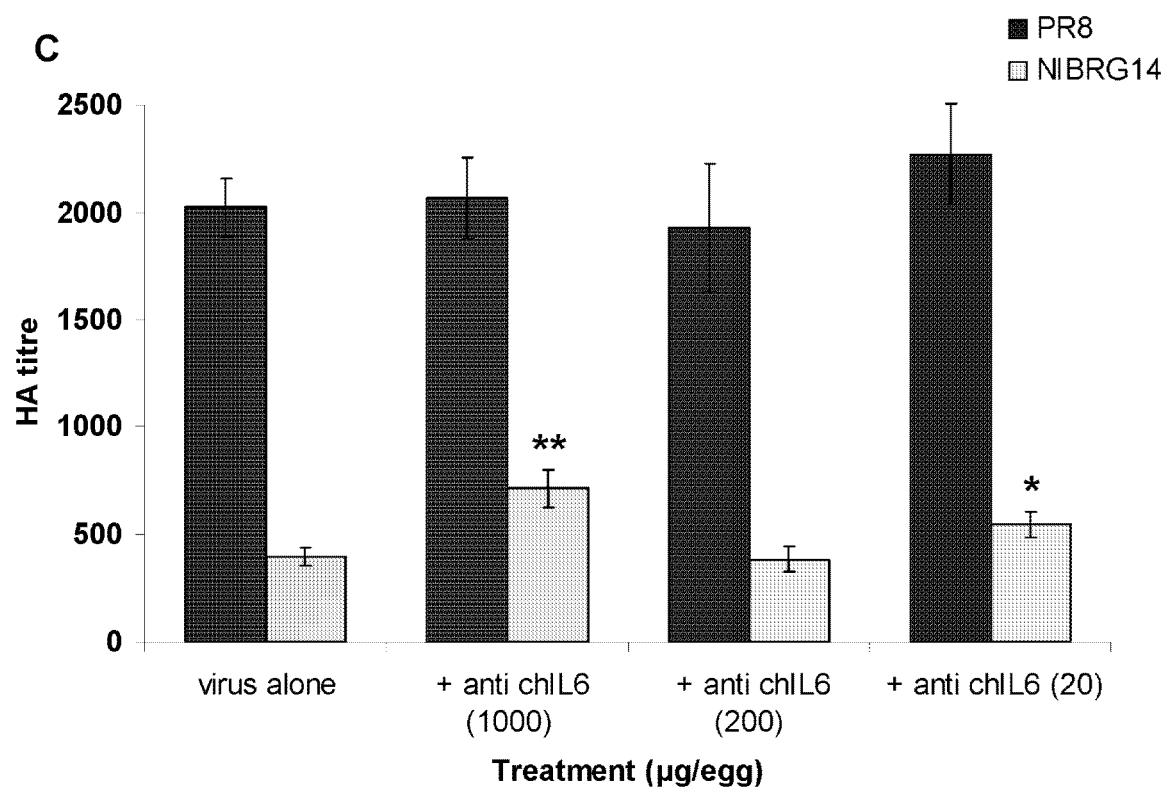

FIG. 8. A. Anti-chIFN-λ antibodies increase virus titre in ovo. The inoculation of purified anti-chIFN-λ antibodies and influenza vaccine virus (PR8 or NIBRG14) results in an increased HA titre in ovo measured by HA assay. The bar graph represents the means of up to seven experiments±SE. The statistical significance is represented as one asterisk (*) p<0.05, two asterisks () p<0.005 and three asterisks (*) represents p=0.0001. B. Anti-chIFN-γ antibodies increase virus titre in ovo. The co-administration of anti-chIFN-γ antibodies and influenza vaccine virus (PR8 or NIBRG14) results in an increase on the virus HA titre in ovo measured by HA assay. The bar graph represents the means of 2 experiments±SE. The statistical significance is represented as one asterisk (*) p<0.05. C. Anti-chIL-6 antibodies increase virus titre in ovo. The effect of injecting both purified anti-chIL-6 antibodies and influenza vaccine virus (PR8 or NIBRG14) in ovo results in an increase in the HA virus titre measured by HA assay. The bar graph represents the mean of up to five experiments±SE. The statistical significance is represented as one asterisk (*) p<0.05, two asterisks (**) p<0.005.

Figure 9:
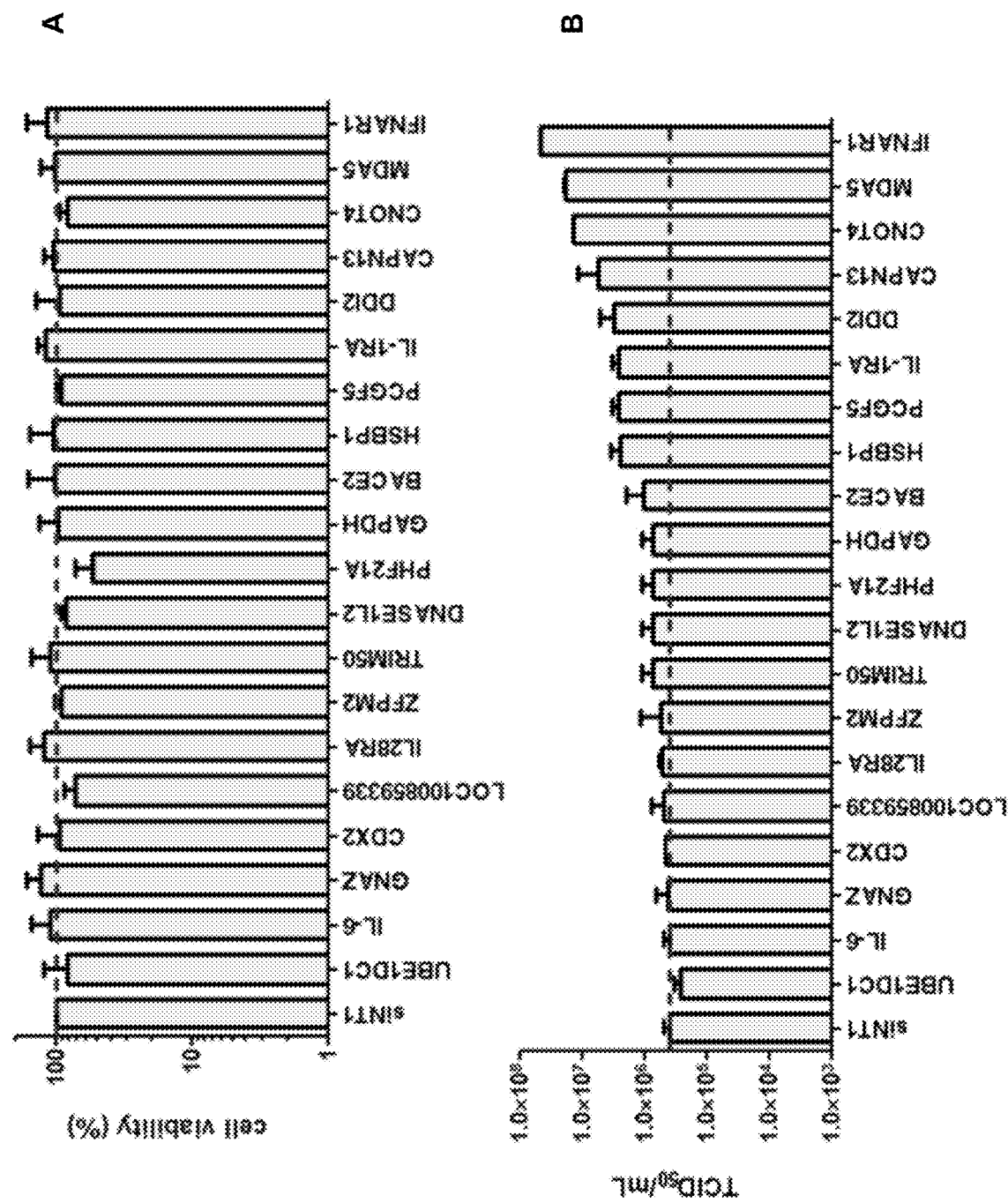
Figure 9:
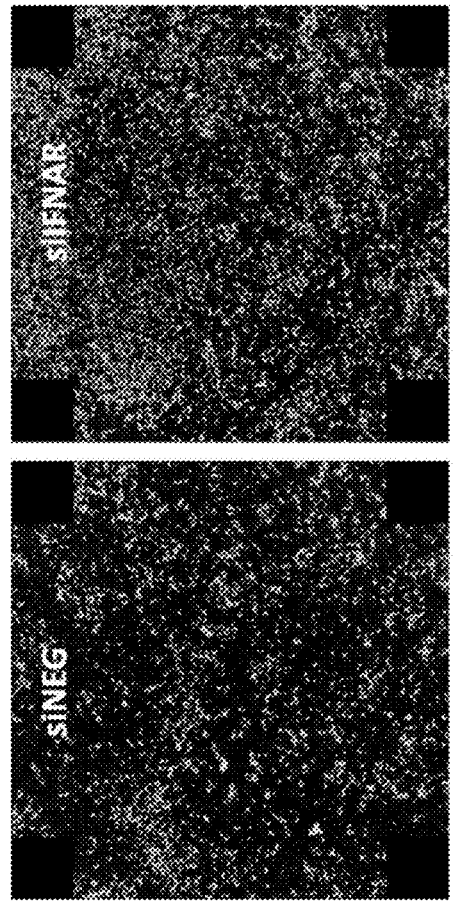

FIG. 9. Screening and identification of antiviral genes for vaccine production of avian influenza. A. Viability of DF-1 cells transfected with a negative control siRNA (siNT1), or with siRNAs targeting the 21 candidate host genes. Viability was measured 72 h post transfection, at the time of virus infection. B. Titres of influenza A/WSN grown in the immortalized chicken fibroblast cell line, DF-1, in control cells (siNT1), or in cells transfected with siRNAs to silence expression of 21 host genes. A significant increase in viral titres measured as $TCDI_{50}$ after knock down (KD) using siRNA was observed, with IFNRA1 shows the highest increase in viral titre. C. Immune staining of viral particles on DF1 cells show a significant increase in virus growth after inhibition of IFNAR1 expression by siRNA.

Figure 10:
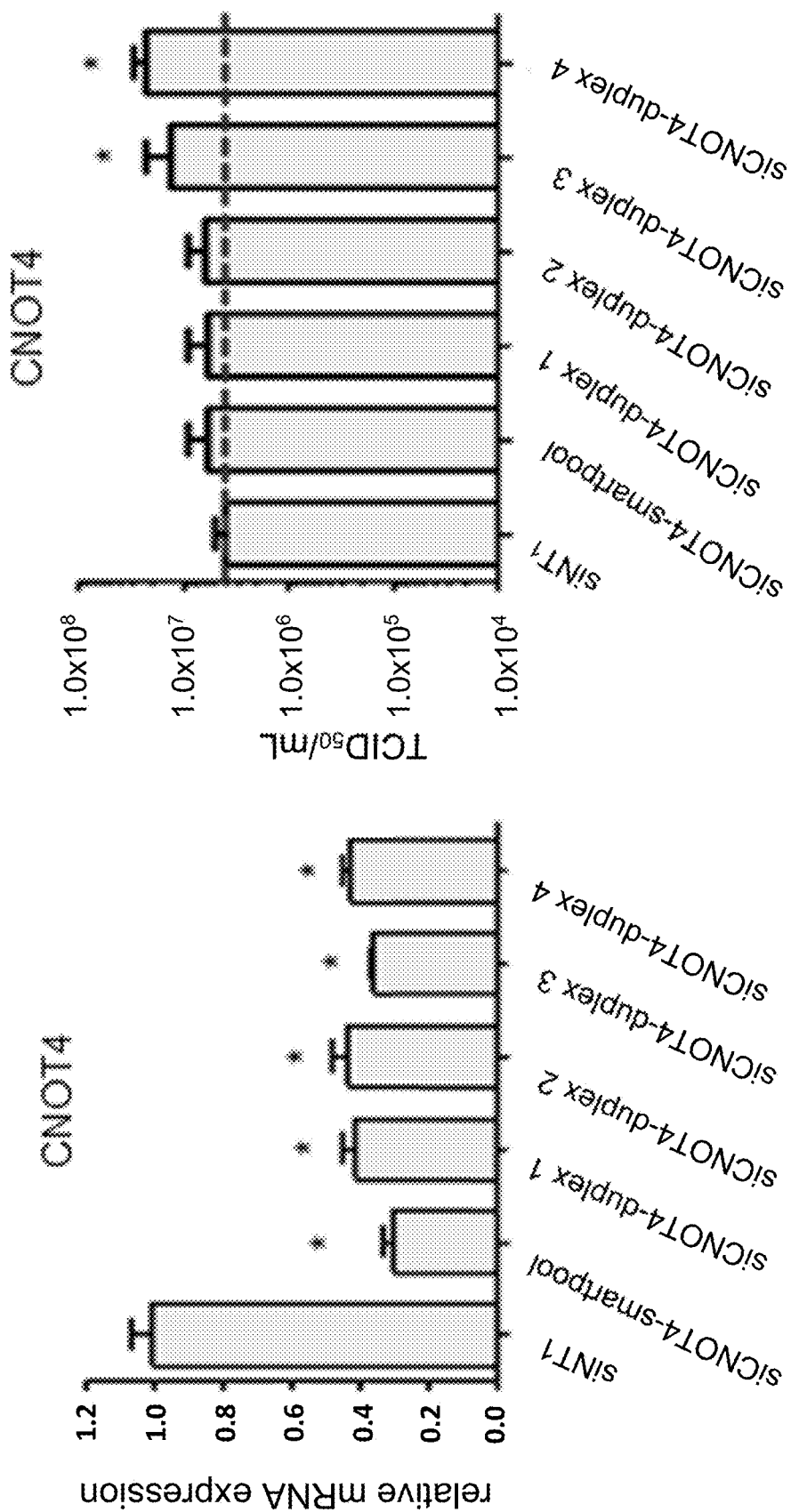
Figure 10:
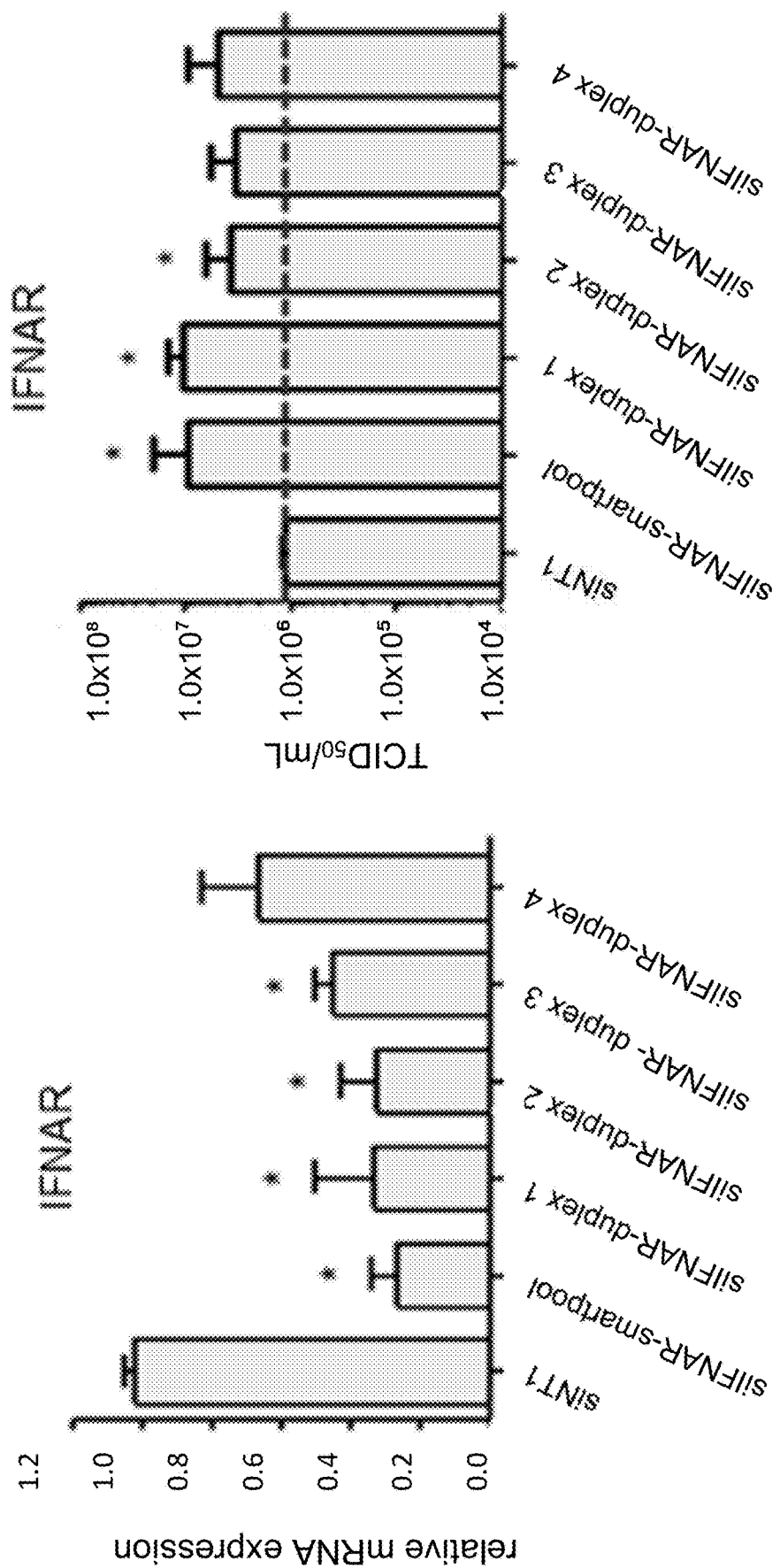
Figure 10:
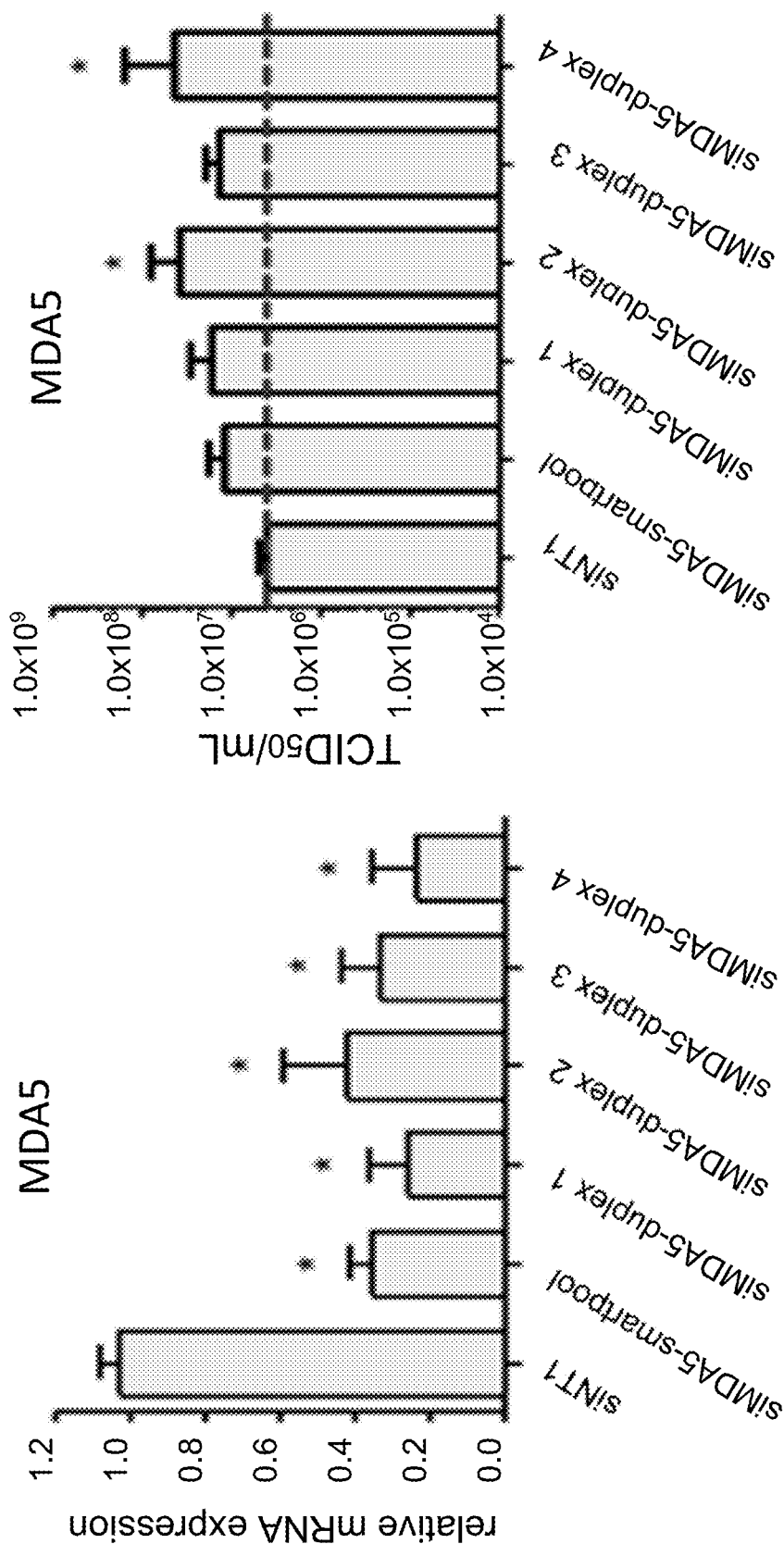
Figure 10:
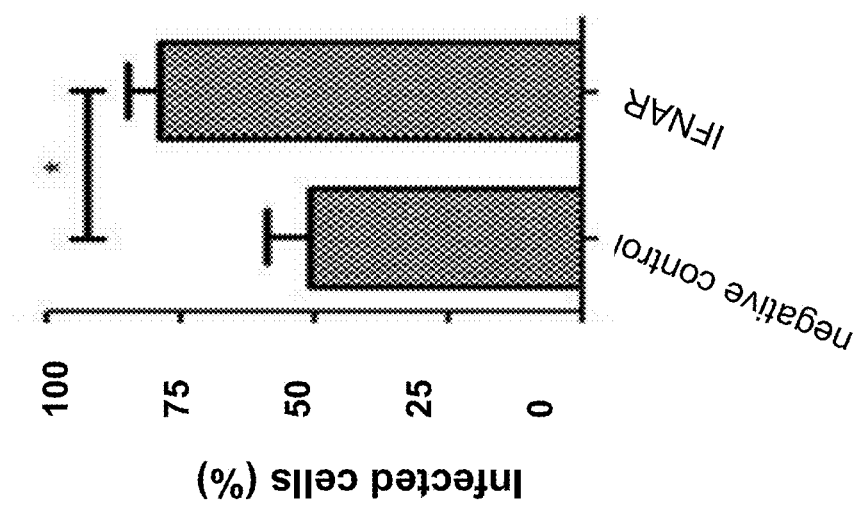
Figure 10:
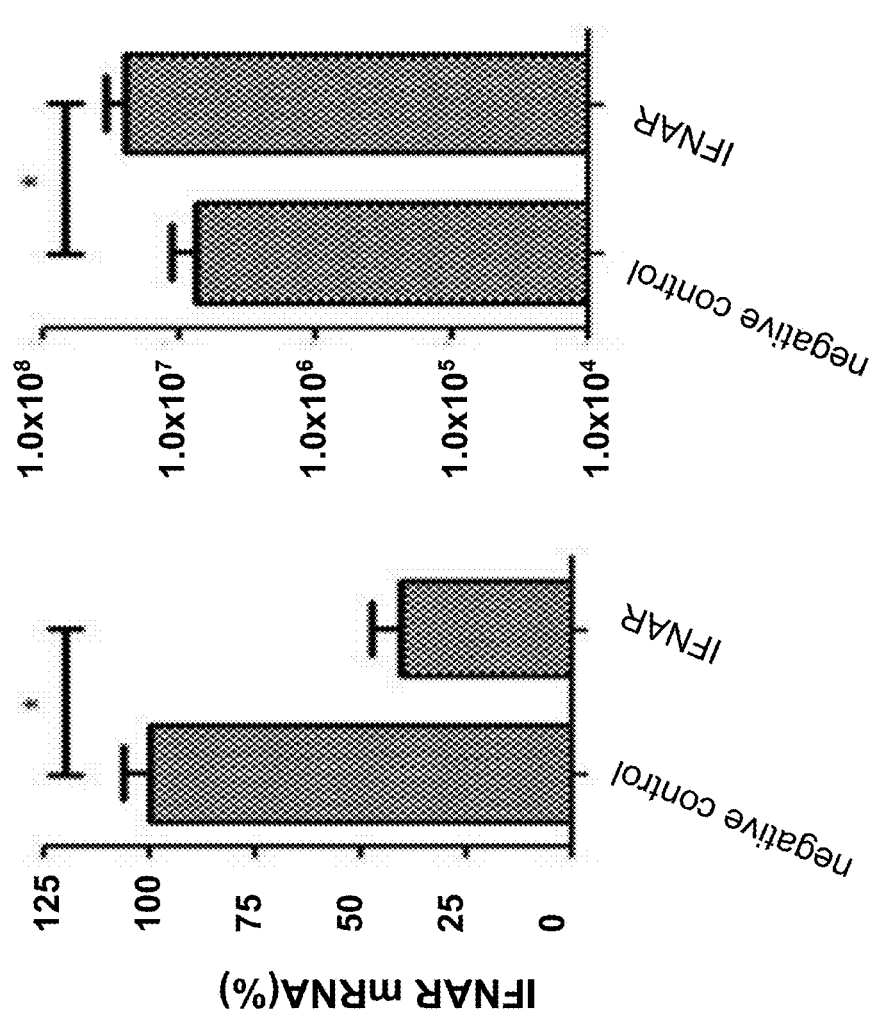

FIG. 10. siRNA down regulation of gene expression of the host increases viral growth in vitro. DF-1 cells were transfected with a negative control siRNA (siNT1), or siRNAs targeting CNOT4, IFNAR or MDA5, either as 4 siRNA duplexes pooled (smartpool), or as individual siRNA duplexes. *p<0.05 compared to mRNA levels in cells transfected with siNT1. mRNA levels were quantitated using Taqman probes 72 h post-transfection by quantitative real-time PCR. Each of the siRNA complexes were evaluated individually on its ability to KD the target gene (shown on the left) and increase viral titres (show on the right). Cells were infected with influenza A/WSN virus (MOI 0.1) for 48 h. Virus levels in the cell supernatant were quantitated by $TCID_{50}$ assays. *p<0.05 compared to virus levels in cells transfected with siNT1.

Figure 11:
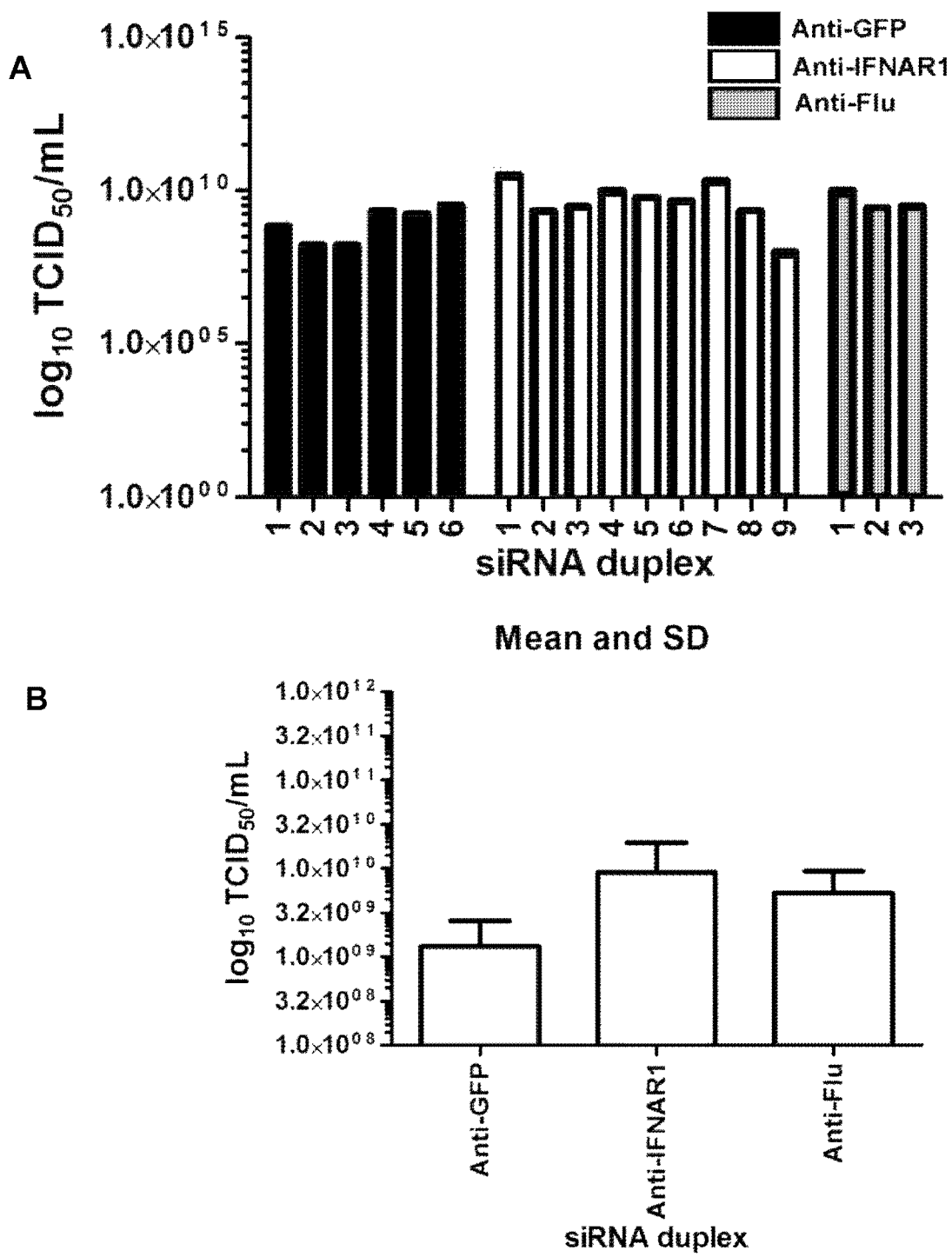

FIG. 11. $TCID_{50}$ WSN from eggs. A. $TCID_{50}$ WSN from eggs after down regulation by siRNA delivered using ABA-21/117Q values are given as a single replicates. B. $TCID_{50}$ WSN from eggs after down regulation by siRNA delivered using ABA-21/117Q. Values are given as Mean+2 SD.

Figure 12:
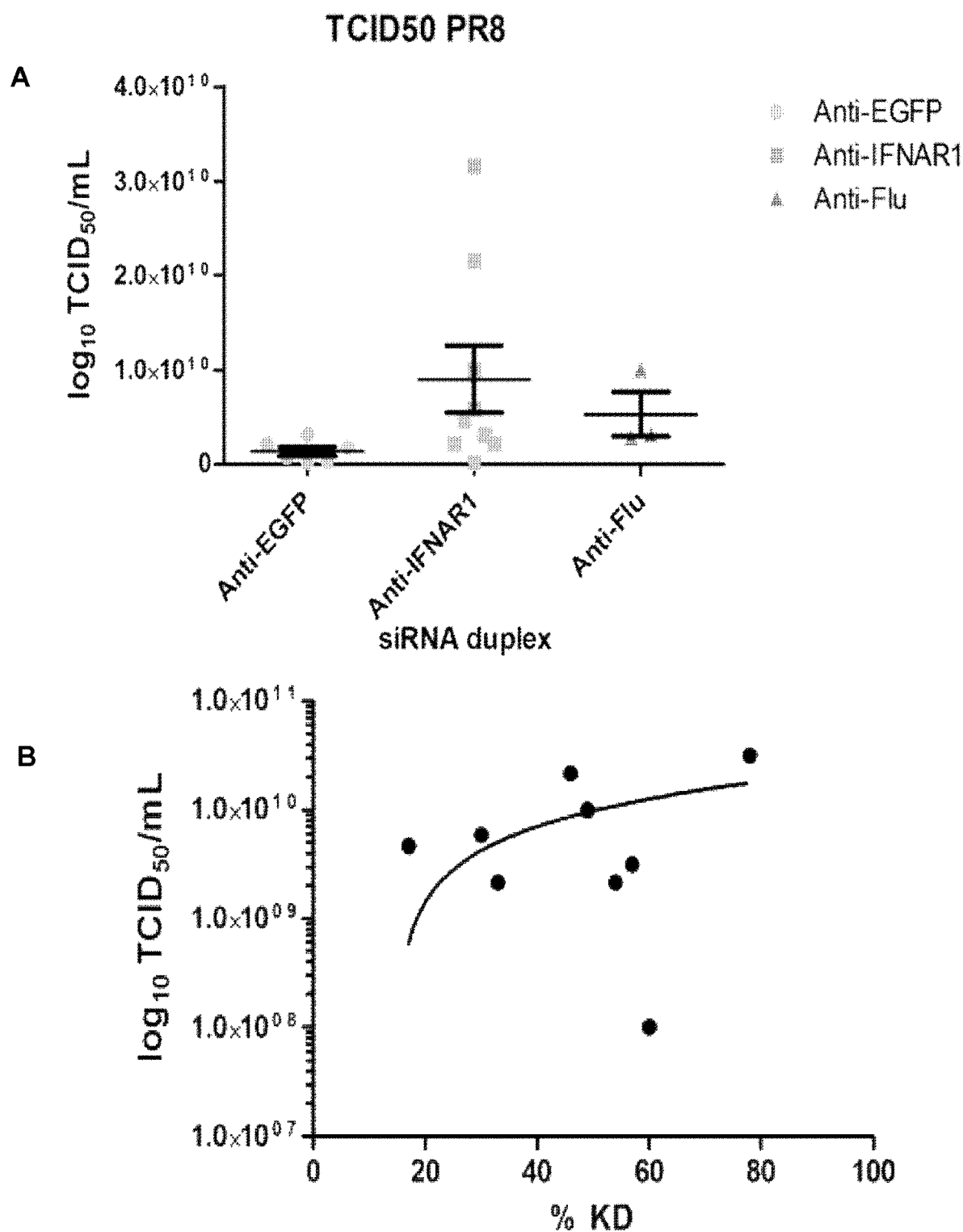
Figure 12:
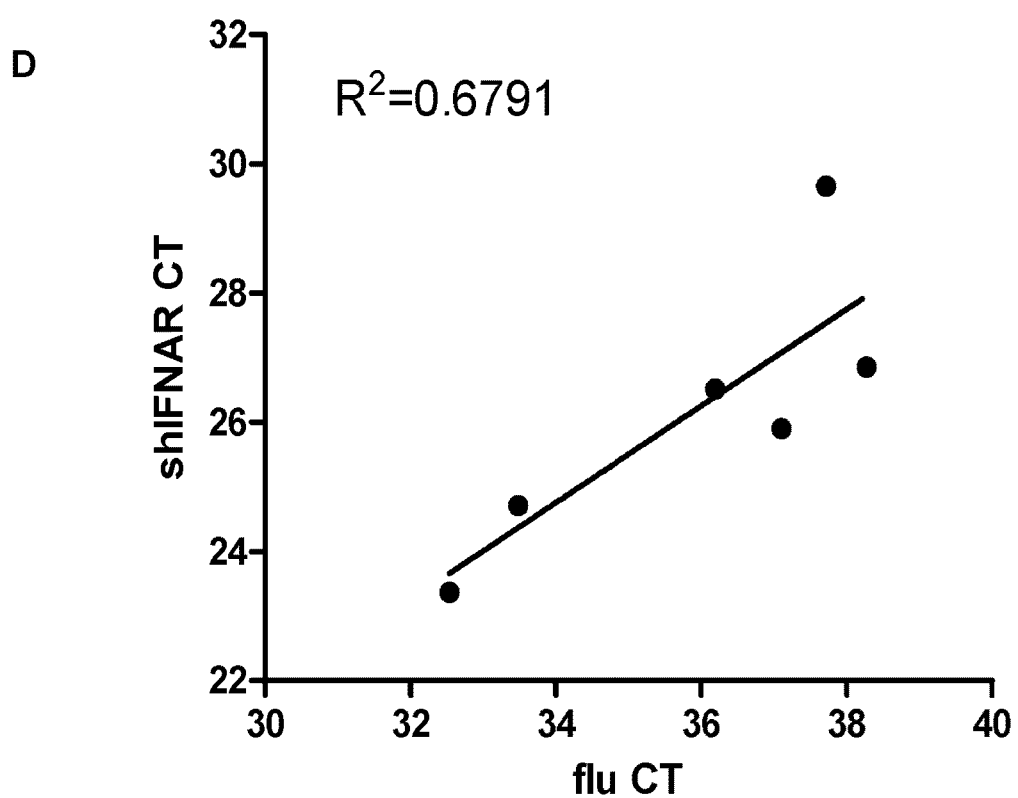

FIG. 12. $TCID_{50}$ WSN from eggs. A. $TCID_{50}$ PR8 vaccine strain from eggs after down regulation by siRNA delivered using ABA-21/117Q. Values are given as Mean+2SD. B. Correlation between $TCID_{50}$ titre and knockdown of IFNAR1. C. HA and $TCID_{50}$ maximum values obtained by down regulation by siRNA delivered using ABA-21/117Q it correspond to a 3 log increase compared with control. shIFNAR1 increases influenza growth in eggs. D. Expression of shIFNAR1 and levels of influenza RNA were measured in the heart of day 12 embryos following injection of RCAS-shIFNA1 at day 0 and infection with influenza (PR8 strain) at day 10 of embryogenesis. The raw CT values from the real-time PCR shows a correlation between the expression of shIFNAR1 and influenza RNA levels. The higher the expression of shIFNAR1 and influenza RNA is indicated by a lower CT value (N=6).

Figure 13:
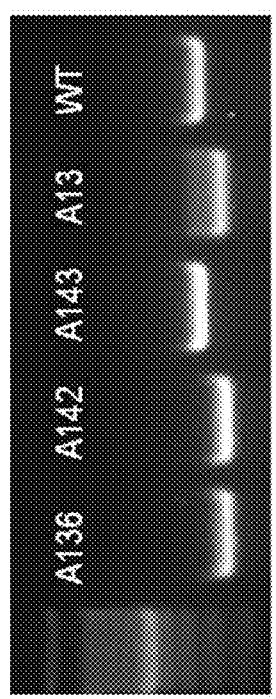
Figure 13:
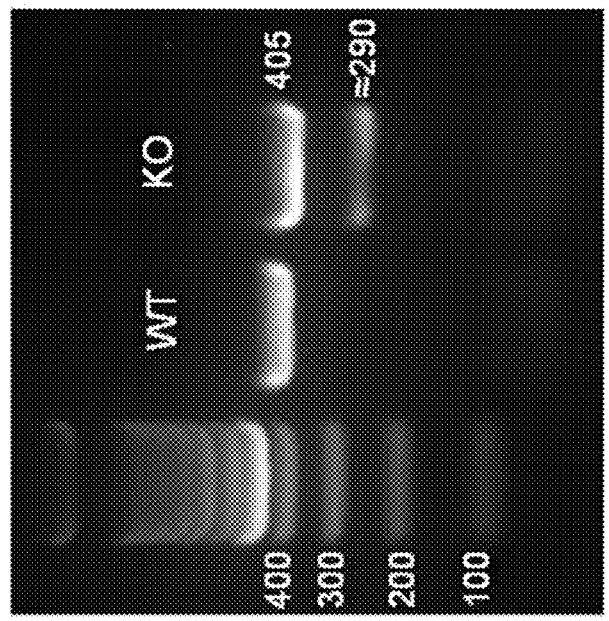
Figure 13:
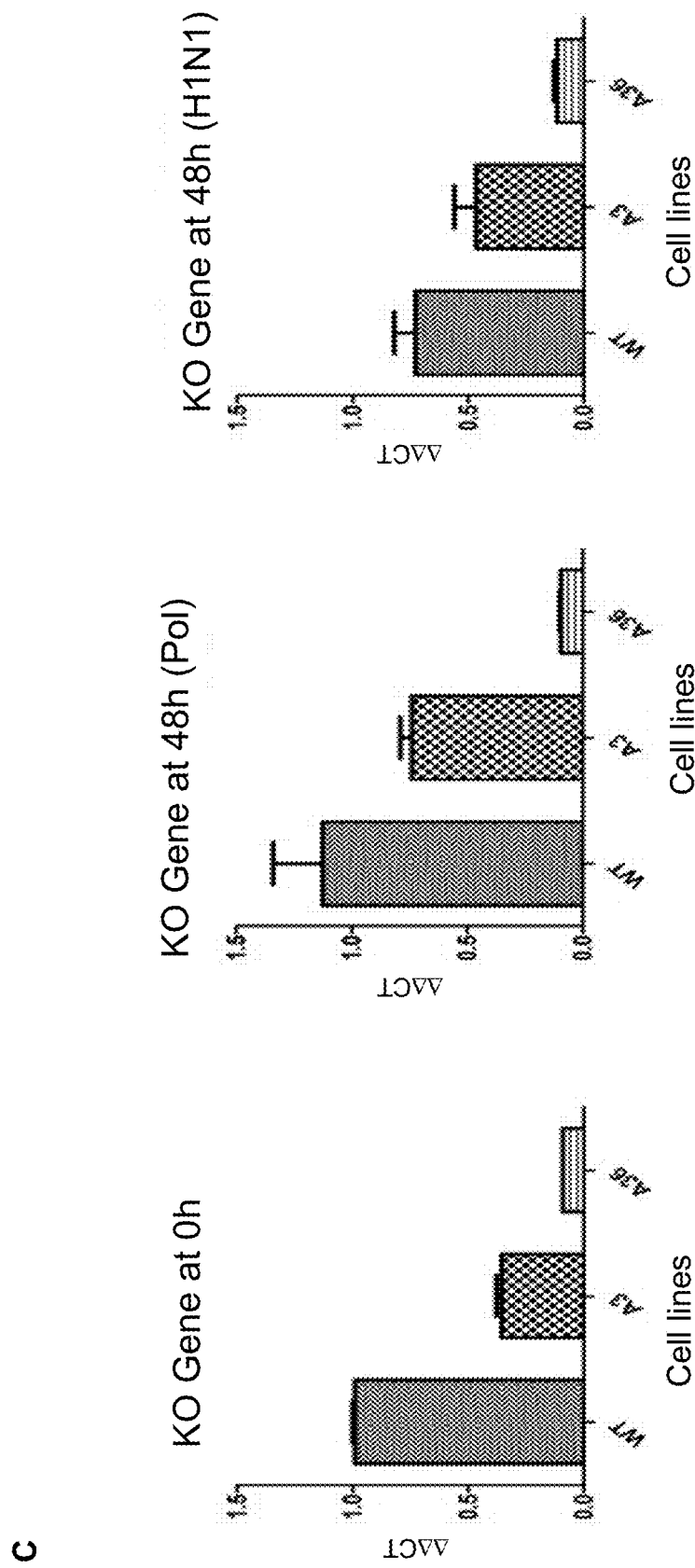
Figure 13:
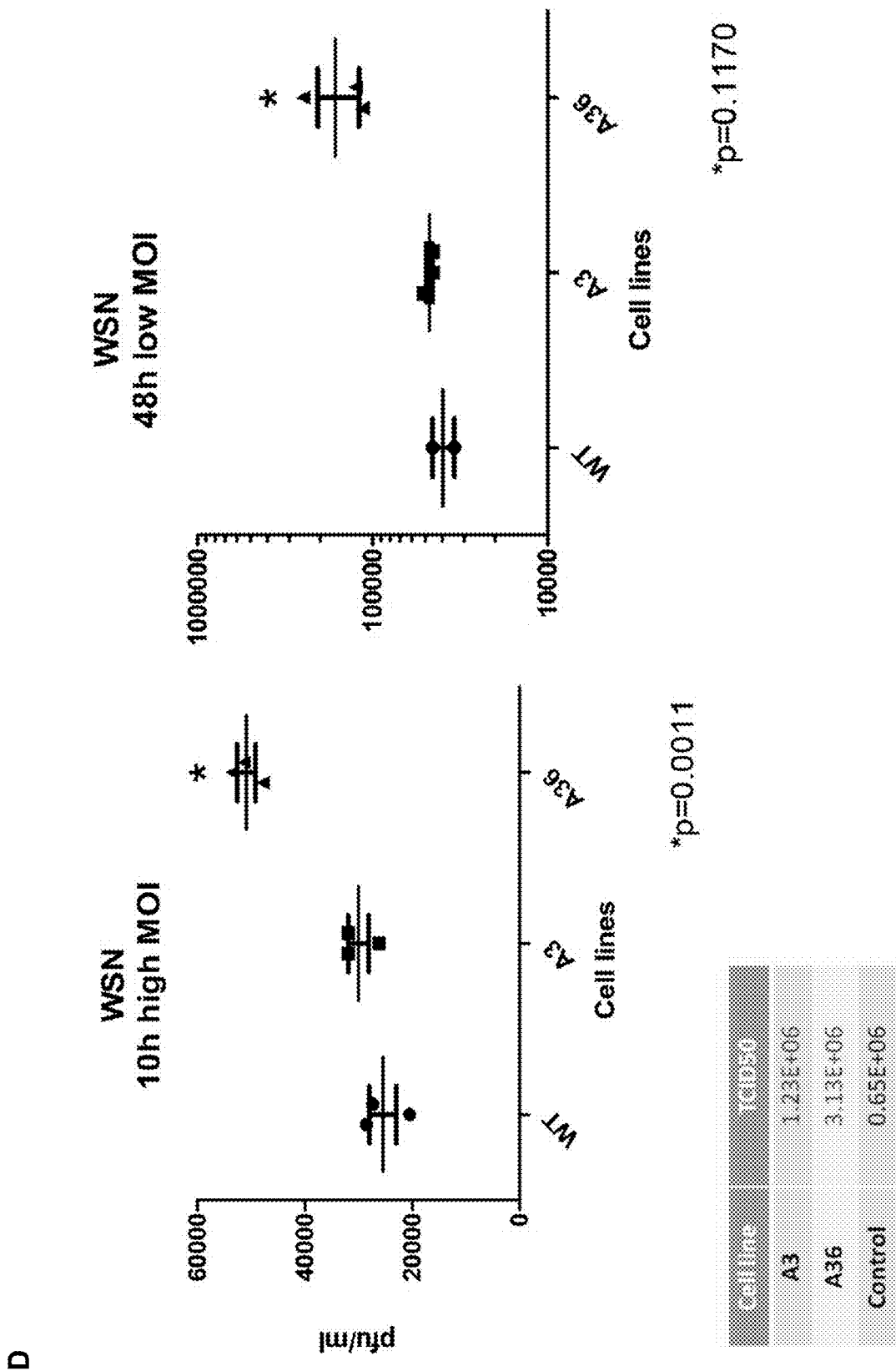

FIG. 13. Generation of IFNAR1 DF-1 KO cell lines. After transfection, the cells from the parental cell lines presented an alternative amplicon during the PCR screening in around 30% of the alleles. A. Deletion was confirmed by sequencing. Cells were sorted to obtain single clones presenting: biallelic (A136 and A142) mono-allelic (A13) or no apparent deletion (A143) when compared with the Wild Type (WT). B. IFNAR1A gene expression was evaluated by qPCR. Results expressed as the mean of ΔΔct value+/−2 standard deviation (SD) against housekeeping WSN viral particles produced on the KO cell lines. Pfu and $TCID_{50}$ were establish after infecting MDCK cells with the H1N1 A/WSN/1933 growth on the different cell lines as an indicative of total virus yield. C. Gene KO at 0 and 48 h. D. WSN viral particles produced on the KO cell lines. Pfu and TCID$_{50}$ were establish after infecting MDCK cells with the H1N1 A/WSN/1933 growth on the different cell lines as an indicative of total virus yield.

Figure 14:
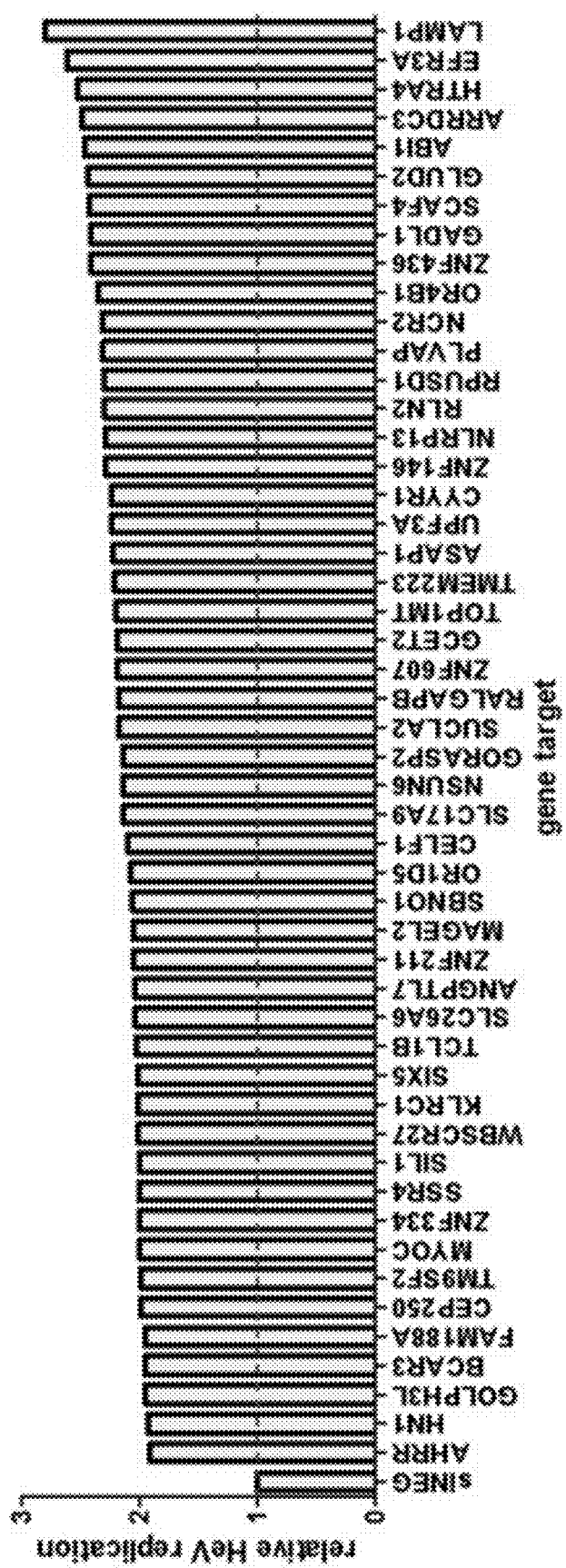

FIG. 14. Screening and identification of antiviral genes against Hendra Virus. Hendra virus replication in the immortalized human cell line HeLa, in control cells (siNT1), or in cells transfected with siRNAs to silence expression listed. A significant increase in viral replication using siRNA was observed. LAMP1 shown the highest increase in viral titre.

Figure 15:
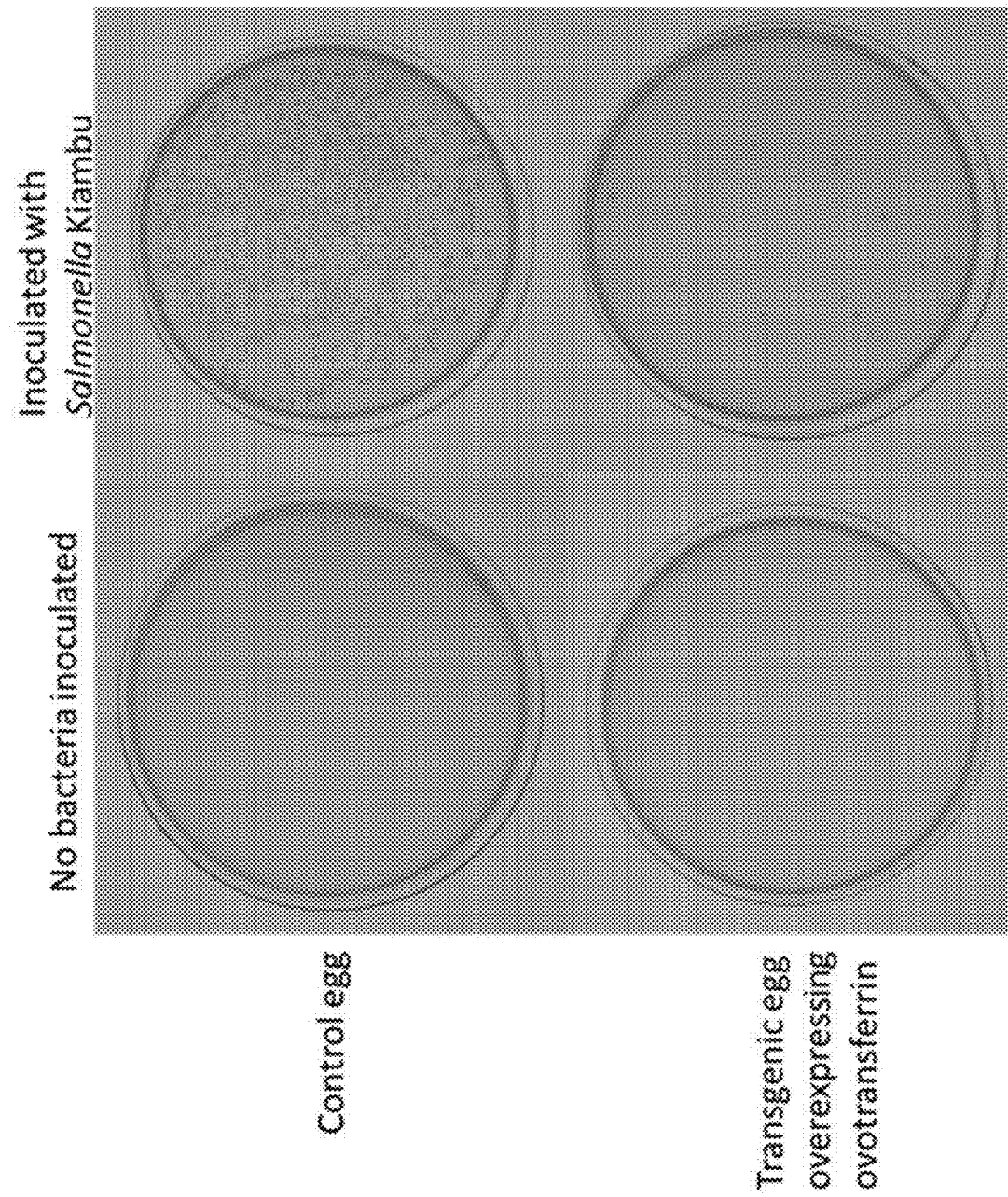

FIG. 15. Anti-microbial activity of avian eggs overexpressing ovotransferrin. Overexpression of ovotransferrin increases the anti-microbial properties of the egg white as shown by decreased grown of *Salmonella* Kiambu in egg white overexpressing overtransferrin compared to controls.

Figure 16:
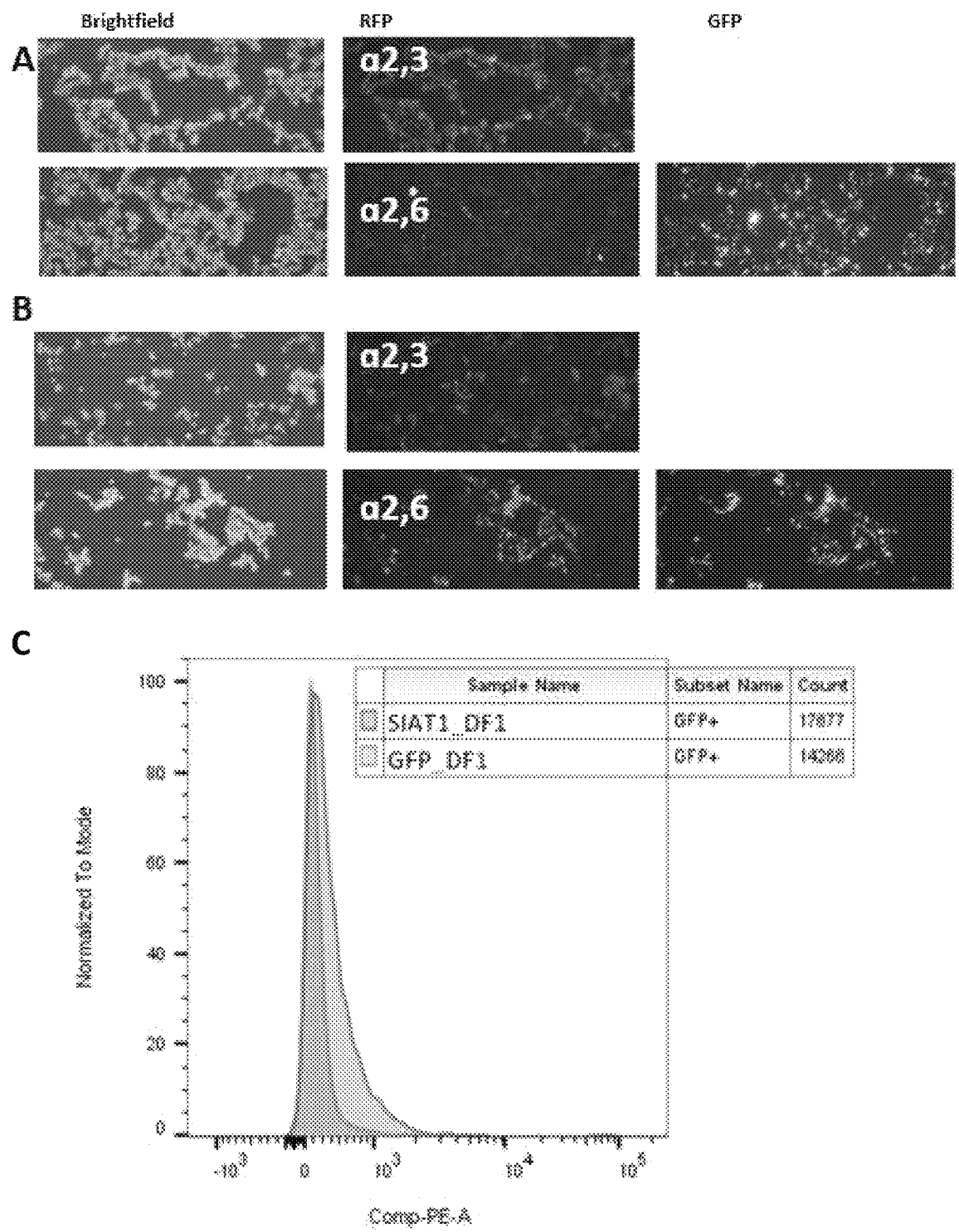

FIG. 16. Expression of SIAT1 gene shifts conformation of sialic acid residues from α-2,3 to α-2,6. Chicken fibroblast DF1 cells were transfected with transposon plasmids to drive expression of either A. a eGFP marker gene or B. both a eGFP marker gene and SIAT1, followed by sorting for eGFP-positive populations. Cells were stained with fluorescence-tagged lectins specific for either α-2,3 or α-2,6 sialic acid residues. All DF1 cells stained positively for α-2,3 residues, however only cells transfected with the SIAT1 gene were positive for α-2,6 staining. Panels show DF1 cells at 20× magnification, from left to right under brightfield, red fluorescence (RFP) excitation and green fluorescence (GFP) excitation. Fluorescence histograms from FACS analysis of DF1s stained for α-2,6 residues C. showed stronger staining for DF1s transfected with the SIAT1 and marker gene, in comparison to DF1s transfected with the marker gene alone.

KEY TO SEQUENCE LISTING

SEQ ID NO: 1: si-BACE2-1 sense nucleotide sequence.
SEQ ID NO: 2: si-BACE2-1 antisense nucleotide sequence.
SEQ ID NO: 3: si-BACE2-2 sense nucleotide sequence.
SEQ ID NO: 4: si-BACE2-2 antisense nucleotide sequence.
SEQ ID NO: 5: si-BACE2-3 sense nucleotide sequence.
SEQ ID NO: 6: si-BACE2-3 antisense nucleotide sequence.
SEQ ID NO: 7: si-BACE2-4 sense nucleotide sequence.
SEQ ID NO: 8: si-BACE2-4 antisense nucleotide sequence.
SEQ ID NO: 9: si-GNAZ-1 sense nucleotide sequence.
SEQ ID NO: 10: si-GNAZ-1 antisense nucleotide sequence.
SEQ ID NO: 11: si-GNAZ-2 sense nucleotide sequence.
SEQ ID NO: 12: si-GNAZ-2 antisense nucleotide sequence.
SEQ ID NO: 13: si-GNAZ-3 sense nucleotide sequence.
SEQ ID NO: 14: si-GNAZ-3 antisense nucleotide sequence.
SEQ ID NO: 15: si-GNAZ-4 sense nucleotide sequence.
SEQ ID NO: 16: si-GNAZ-4 antisense nucleotide sequence.
SEQ ID NO: 17: si-UBE1DC1-1sense nucleotide sequence.
SEQ ID NO: 18: si-UBE1DC1-1 antisense nucleotide sequence.
SEQ ID NO: 19: si-UBE1DC1-2 sense nucleotide sequence.
SEQ ID NO: 20: si-UBE1DC1-2 antisense nucleotide sequence.
SEQ ID NO: 21: si-UBE1DC1-3 sense nucleotide sequence.
SEQ ID NO: 22: si-UBE1DC1-3 antisense nucleotide sequence.
SEQ ID NO: 23: si-UBE1DC1-4 sense nucleotide sequence.
SEQ ID NO: 24: si-UBE1DC1-4 antisense nucleotide sequence.
SEQ ID NO: 25: si-CDX2-1 sense nucleotide sequence.
SEQ ID NO: 26: si-CDX2-1 antisense nucleotide sequence.
SEQ ID NO: 27: si-CDX2-2 sense nucleotide sequence.
SEQ ID NO: 28: si-CDX2-2 antisense nucleotide sequence.
SEQ ID NO: 29: si-CDX2-3 sense nucleotide sequence.
SEQ ID NO: 30: si-CDX2-3 antisense nucleotide sequence.
SEQ ID NO: 31: si-CDX2-4 sense nucleotide sequence.
SEQ ID NO: 32: si-CDX2-4 antisense nucleotide sequence.
SEQ ID NO: 33: si-ZFPM2-1 sense nucleotide sequence.
SEQ ID NO: 34: si-ZFPM2-1 antisense nucleotide sequence.
SEQ ID NO: 35: si-ZFPM2-2 sense nucleotide sequence.
SEQ ID NO: 36: si-ZFPM2-2 antisense nucleotide sequence.
SEQ ID NO: 37: si-ZFPM2-3 sense nucleotide sequence.
SEQ ID NO: 38: si-ZFPM2-3 antisense nucleotide sequence.
SEQ ID NO: 39: si-ZFPM2-4 sense nucleotide sequence.
SEQ ID NO: 40: si-ZFPM2-4 antisense nucleotide sequence.
SEQ ID NO: 41: si-TRIM50-1 sense nucleotide sequence.
SEQ ID NO: 42: si-TRIM50-1 antisense nucleotide sequence.
SEQ ID NO: 43: si-TRIM50-2 sense nucleotide sequence.
SEQ ID NO: 44: si-TRIM50-2 antisense nucleotide sequence.
SEQ ID NO: 45: si-TRIM50-3 sense nucleotide sequence.
SEQ ID NO: 46: si-TRIM50-3 antisense nucleotide sequence.
SEQ ID NO: 47: si-TRIM50-4 sense nucleotide sequence.
SEQ ID NO: 48: si-TRIM50-4 antisense nucleotide sequence.
SEQ ID NO: 49: si-DDI2-1 sense nucleotide sequence.
SEQ ID NO: 50: si-DDI2-1 antisense nucleotide sequence.
SEQ ID NO: 51: si-DDI2-2 sense nucleotide sequence.
SEQ ID NO: 52: si-DDI2-2 antisense nucleotide sequence.
SEQ ID NO: 53: si-DDI2-3 sense nucleotide sequence.
SEQ ID NO: 54: si-DDI2-3 antisense nucleotide sequence.
SEQ ID NO: 55: si-DDI2-4 sense nucleotide sequence.
SEQ ID NO: 56: si-DDI2-4 antisense nucleotide sequence.
SEQ ID NO: 57: si-LOC100859339-1 sense nucleotide sequence.
SEQ ID NO: 58: si-LOC100859339-1 antisense nucleotide sequence.
SEQ ID NO: 59: si-LOC100859339-2 sense nucleotide sequence.
SEQ ID NO: 60: si-LOC100859339-2 antisense nucleotide sequence.
SEQ ID NO: 61: si-LOC100859339-3 sense nucleotide sequence.

SEQ ID NO: 62: si-LOC100859339-3 antisense nucleotide sequence.
SEQ ID NO: 63: si-LOC100859339-4 sense nucleotide sequence.
SEQ ID NO: 64: si-LOC100859339-4 antisense nucleotide sequence.
SEQ ID NO: 65: si-CNOT4-1 sense nucleotide sequence.
SEQ ID NO: 66: si-CNOT4-1 antisense nucleotide sequence.
SEQ ID NO: 67: si-CNOT4-2 sense nucleotide sequence.
SEQ ID NO: 68: si-CNOT4-2 antisense nucleotide sequence.
SEQ ID NO: 69: si-CNOT4-3 sense nucleotide sequence.
SEQ ID NO: 70: si-CNOT4-3 antisense nucleotide sequence.
SEQ ID NO: 71: si-CNOT4-4 sense nucleotide sequence.
SEQ ID NO: 72: si-CNOT4-4 antisense nucleotide sequence.
SEQ ID NO: 73: si-CAPN13-1 sense nucleotide sequence.
SEQ ID NO: 74: si-CAPN13-1 antisense nucleotide sequence.
SEQ ID NO: 75: si-CAPN13-2 sense nucleotide sequence.
SEQ ID NO: 76: si-CAPN13-2 antisense nucleotide sequence.
SEQ ID NO: 77: si-CAPN13-3 sense nucleotide sequence.
SEQ ID NO: 78: si-CAPN13-3 antisense nucleotide sequence.
SEQ ID NO: 79: si-CAPN13-4 sense nucleotide sequence.
SEQ ID NO: 80: si-CAPN13-4 antisense nucleotide sequence.
SEQ ID NO: 81: si-DNASE1L2-1 sense nucleotide sequence.
SEQ ID NO: 82: si-DNASE1L2-1 antisense nucleotide sequence.
SEQ ID NO: 83: si-DNASE1L2-2 sense nucleotide sequence.
SEQ ID NO: 84: si-DNASE1L2-2 antisense nucleotide sequence.
SEQ ID NO: 85: si-DNASE1L2-3 sense nucleotide sequence.
SEQ ID NO: 86: si-DNASE1L2-3 antisense nucleotide sequence.
SEQ ID NO: 87: si-DNASE1L2-4 sense nucleotide sequence.
SEQ ID NO: 88: si-DNASE1L2-4 antisense nucleotide sequence.
SEQ ID NO: 89: si-PHF21A-1 sense nucleotide sequence.
SEQ ID NO: 90: si-PHF21A-1 antisense nucleotide sequence.
SEQ ID NO: 91: si-PHF21A-2 sense nucleotide sequence.
SEQ ID NO: 92: si-PHF21A-2 antisense nucleotide sequence.
SEQ ID NO: 93: si-PHF21A-3 sense nucleotide sequence.
SEQ ID NO: 94: si-PHF21A-3 antisense nucleotide sequence.
SEQ ID NO: 95: si-PHF21A-4 sense nucleotide sequence.
SEQ ID NO: 96: si-PHF21A-4 antisense nucleotide sequence.
SEQ ID NO: 97: si-PCGF5-1 sense nucleotide sequence.
SEQ ID NO: 98: si-PCGF5-1 antisense nucleotide sequence.
SEQ ID NO: 99: si-PCGF5-2 sense nucleotide sequence.
SEQ ID NO: 100: si-PCGF5-2 antisense nucleotide sequence.
SEQ ID NO: 101: si-PCGF5-3 sense nucleotide sequence.
SEQ ID NO: 102: si-PCGF5-3 antisense nucleotide sequence.
SEQ ID NO: 103: si-PCGF5-4 sense nucleotide sequence.
SEQ ID NO: 104: si-PCGF5-4 antisense nucleotide sequence.
SEQ ID NO: 105: si-HSBP1-1 sense nucleotide sequence.
SEQ ID NO: 106: si-HSBP1-1 antisense nucleotide sequence.
SEQ ID NO: 107: si-HSBP1-2 sense nucleotide sequence.
SEQ ID NO: 108: si-HSBP1-2 antisense nucleotide sequence.
SEQ ID NO: 109: si-HSBP1-3 sense nucleotide sequence.
SEQ ID NO: 110: si-HSBP1-3 antisense nucleotide sequence.
SEQ ID NO: 111: si-HSBP1-4 sense nucleotide sequence.
SEQ ID NO: 112: si-HSBP1-4 antisense nucleotide sequence.
SEQ ID NO: 113: si-GAPDH-1 sense nucleotide sequence.
SEQ ID NO: 114: si-GAPDH-1 antisense nucleotide sequence.
SEQ ID NO: 115: si-GAPDH-2 sense nucleotide sequence.
SEQ ID NO: 116: si-GAPDH-2 antisense nucleotide sequence.
SEQ ID NO: 117: si-GAPDH-3 sense nucleotide sequence.
SEQ ID NO: 118: si-GAPDH-3 antisense nucleotide sequence.
SEQ ID NO: 119: si-GAPDH-4 sense nucleotide sequence.
SEQ ID NO: 120: si-GAPDH-4 antisense nucleotide sequence.
SEQ ID NO: 121: si-IFNAR1-1 sense nucleotide sequence.
SEQ ID NO: 122: si-IFNAR1-1 antisense nucleotide sequence.
SEQ ID NO: 123: si-IFNAR1-2 sense nucleotide sequence.
SEQ ID NO: 124: si-IFNAR1-2 antisense nucleotide sequence.
SEQ ID NO: 125: si-IFNAR1-3 sense nucleotide sequence.
SEQ ID NO: 126: si-IFNAR1-3 antisense nucleotide sequence.
SEQ ID NO: 127: si-IFNAR1-4 sense nucleotide sequence.
SEQ ID NO: 128: si-IFNAR1-4 antisense nucleotide sequence.
SEQ ID NO: 129: si-IL28RA-1 sense nucleotide sequence.
SEQ ID NO: 130: si-IL28RA-1 antisense nucleotide sequence.
SEQ ID NO: 131: si-IL28RA-2 sense nucleotide sequence.
SEQ ID NO: 132: si-IL28RA-2 antisense nucleotide sequence.
SEQ ID NO: 133: si-IL28RA-3 sense nucleotide sequence.
SEQ ID NO: 134: si-IL28RA-3 antisense nucleotide sequence.
SEQ ID NO: 135: si-IL28RA-4 sense nucleotide sequence.

SEQ ID NO: 136: si-IL28RA-4 antisense nucleotide sequence.
SEQ ID NO: 137: si-MDA5-1 sense nucleotide sequence.
SEQ ID NO: 138: si-MDA5-1 antisense nucleotide sequence.
SEQ ID NO: 139: si-MDA5-2 sense nucleotide sequence.
SEQ ID NO: 140: si-MDA5-2 antisense nucleotide sequence.
SEQ ID NO: 141: si-MDA5-3 sense nucleotide sequence.
SEQ ID NO: 142: si-MDA5-3 antisense nucleotide sequence.
SEQ ID NO: 143: si-MDA5-4 sense nucleotide sequence.
SEQ ID NO: 144: si-MDA5-4 antisense nucleotide sequence.
SEQ ID NO: 145: si-IL-6-1 sense nucleotide sequence.
SEQ ID NO: 146: si-IL-6-1 antisense nucleotide sequence.
SEQ ID NO: 147: si-IL-6-2 sense nucleotide sequence.
SEQ ID NO: 148: si-IL-6-2 antisense nucleotide sequence.
SEQ ID NO: 149: si-IL-6-3 sense nucleotide sequence.
SEQ ID NO: 150: si-IL-6-3 antisense nucleotide sequence.
SEQ ID NO: 151: si-IL-6-4 sense nucleotide sequence.
SEQ ID NO: 152: si-IL-6-4 antisense nucleotide sequence.
SEQ ID NO: 153: si-IL1R1-1 sense nucleotide sequence.
SEQ ID NO: 154: si-IL1R1-1 antisense nucleotide sequence.
SEQ ID NO: 155: si-IL1R1-2 sense nucleotide sequence.
SEQ ID NO: 156: si-IL1R1-2 antisense nucleotide sequence.
SEQ ID NO: 157: si-IL1R1-3 sense nucleotide sequence.
SEQ ID NO: 158: si-IL1R1-3 antisense nucleotide sequence.
SEQ ID NO: 159: si-IL1R1-4 sense nucleotide sequence.
SEQ ID NO: 160: si-IL1R1-4 antisense nucleotide sequence.
SEQ ID NO: 161: Nucleotide sequence Tol2 chromosomal integration site.
SEQ ID NO: 162: Nucleotide sequence Tol2 chromosomal integration site.
SEQ ID NO: 163: Nucleotide sequence Tol2 chromosomal integration site.
SEQ ID NO: 164: Nucleotide sequence Tol2 chromosomal integration site.
SEQ ID NO: 165: Nucleotide sequence Tol2 chromosomal integration site.
SEQ ID NO: 166: Nucleotide sequence Tol2 chromosomal integration site.
SEQ ID NO: 167: Nucleotide sequence Tol2 chromosomal integration site.
SEQ ID NO: 168: Nucleotide sequence Tol2 chromosomal integration site.
SEQ ID NO: 169: Nucleotide sequence Tol2 chromosomal integration site.

DETAILED DESCRIPTION OF THE INVENTION

General Techniques and Selected Definitions

Unless specifically defined otherwise, all technical and scientific terms used herein shall be taken to have the same meaning as commonly understood by one of ordinary skill in the art (e.g., in cell culture, molecular genetics, transgenic avians, immunology, immunohistochemistry, precision genome engineering, protein chemistry, and biochemistry).

Unless otherwise indicated, the cell culture and immunological techniques utilized in the present invention are standard procedures, well known to those skilled in the art. Such techniques are described and explained throughout the literature in sources such as, J. Perbal, A Practical Guide to Molecular Cloning, John Wiley and Sons (1984), J. Sambrook et al., Molecular Cloning: A Laboratory Manual, Cold Spring Harbour Laboratory Press (1989), T. A. Brown (editor), Essential Molecular Biology: A Practical Approach, Volumes 1 and 2, IRL Press (1991), D. M. Glover and B. D. Hames (editors), DNA Cloning: A Practical Approach, Volumes 1-4, IRL Press (1995 and 1996), and F. M. Ausubel et al. (editors), Current Protocols in Molecular Biology, Greene Pub. Associates and Wiley-Interscience (1988, including all updates until present), Ed Harlow and David Lane (editors) Antibodies: A Laboratory Manual, Cold Spring Harbour Laboratory, (1988), and J. E. Coligan et al. (editors) Current Protocols in Immunology, John Wiley & Sons (including all updates until present).

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

As used herein, the term "Z chromosome" refers to an avian sex chromosome. Males avians comprise two copies of the Z chromosome (ZZ) and females comprise one copy of the Z chromosome derived from their maternal parent and one copy of the W chromosome (ZW).

As used herein, the term "egg" refers to an ovum that has been laid by a bird. Typically, avian eggs consist of a hard, oval outer eggshell, the "egg white" or albumen, the egg yolk, and various thin membranes. The egg may or may not be fertilized.

As used herein, "integrity of the shell of the egg" refers to the shell of the egg that is sufficiently intact to allow the development of a chick or sufficiently intact to allow the egg to be used as a bioreactor (for virus or protein production). In an embodiment, the shell may have a small hole for insertion of e.g. a fiber optic to detect the presence of a marker. In an embodiment, the shell of the egg is whole and undisrupted (the marker is detected through the shell of the egg).

Genetic Modifications

As used herein, the term "genetic modification" is any man made alteration to the genetic material in the avian and/or avian egg. The modification may have been made to one or both parents of the egg or avian, or an ancestor of one of both parents. Methods of genetically modifying cells are well known in the art and can include any method known to a person skilled in the art.

In one example, the genetic modification is a mutation to an endogenous gene in the genome introduced by a programmable nuclease. For instance, the mutation can be a frame-shift and/or deletion that results in the gene no longer encoding a functional protein. In another embodiment, homologous recombination is used to delete part or all of a target gene such that the protein is not produced. In an embodiment, the genetic modification is introduced by non-homologous end joining. In an embodiment, the genetic modification is introduced by a chemical mutagen. In an alternate embodiment, the genetic modification is the insertion of a transgene, for example in a nucleic acid construct, which expresses a polynucleotide in the egg. The transgene may be extrachromosomal or integrated into the genome of the egg. Preferably, the transgene is inserted on the Z chromosome.

In an embodiment, the genetic modification is a mutation of an endogenous gene which partially or completely inactivates the gene, such as a point mutation, an insertion, or a deletion (or a combination of one or more thereof). The point mutation may be a premature stop codon (a nonsense mutation), a splice-site mutation, a deletion, a frame-shift mutation or an amino acid substitution mutation that reduces activity of the gene or the encoded polypeptide.

In an embodiment, the transgene encodes an antisense polynucleotide, a sense polynucleotide, a microRNA, a polynucleotide which encodes a polypeptide which binds the endogenous enzyme, a transposon, an aptamer, a double stranded RNA molecule and a processed RNA molecule derived therefrom. In an embodiment, the transgene comprises an open reading frame encoding the polynucleotide operably linked to a promoter which directs expression of the polynucleotide in the avian and/or the avian egg.

Programmable Nucleases

In some embodiments, a genetic modification as referred to herein may be introduced to the avian or the parental maternal and/or paternal germ line of the egg via a programmable nuclease. In a preferred embodiment, one or more genetic modifications is introduced into the Z chromosome of a of the parental maternal and/or paternal germ line of the egg via a programmable nuclease. In an embodiment, the genetic modification introduced by the programmable nuclease modifies a production trait in the avian and/or in the egg or progeny thereof.

As used herein, the term "programmable nuclease" relates to nucleases that is "targeted" ("programed") to recognize and edit a pre-determined site in a genome of an avian egg or in the parental maternal and/or paternal germ line of an avian egg.

In an embodiment, the programmable nuclease can induce site specific DNA cleavage at a pre-determined site in a genome. In an embodiment, the programmable nuclease may be programmed to recognize a genomic location with a DNA binding protein domain, or combination of DNA binding protein domains. In an embodiment, the nuclease introduces a deletion, substitution or an insertion into the gene or a regulatory region thereof.

In an embodiment, the programmable nuclease may be programmed to recognize a genomic location by a combination of DNA-binding zinc-finger protein (ZFP) domains. ZFPs recognize a specific 3-bp in a DNA sequence, a combination of ZFPs can be used to recognize a specific a specific genomic location.

In an embodiment, the programmable nuclease may be programmed to recognize a genomic location by transcription activator-like effectors (TALEs) DNA binding domains.

In an alternate embodiment, the programmable nuclease may be programmed to recognize a genomic location by one or more RNA sequences. In an alternate embodiment, the programmable nuclease may be programmed by one or more DNA sequences. In an alternate embodiment, the programmable nuclease may be programmed by one or more hybrid DNA/RNA sequences. In an alternate embodiment, the programmable nuclease may be programmed by one or more of an RNA sequence, a DNA sequences and a hybrid DNA/RNA sequence.

In an alternate embodiment, the programmable nuclease can be used for multiplex silencing i.e. delivery of programmable nuclease with more than one "targeting" or "programming sequence" (i.e. two, three, four, five or more programming sequences) such that two, three, four, five or more genes can be targeted simultaneously (Kim et al., 2014).

Programmable nucleases that can be used in accordance with the present disclosure include, but are not limited to, RNA-guided engineered nuclease (RGEN) derived from the bacterial clustered regularly interspaced short palindromic repeat (CRISPR)-cas (CRISPR-associated) system, zinc-finger nuclease (ZFN), transcription activator-like nuclease (TALEN), and argonautes.

(CRISPR)-cas (CRISPR-associated) system is a microbial nuclease system involved in defence against invading phages and plasmids. CRISPR loci in microbial hosts contain a combination of CRISPR-associated (Cas) genes as well as non-coding RNA elements capable of programming the specificity of the CRISPR-mediated nucleic acid cleavage. Three types (I-III) of CRISPR systems have been identified across a wide range of bacterial hosts with II RGEN classes (Makarova et al., 2015). One key feature of each CRISPR locus is the presence of an array of repetitive sequences (direct repeats) interspaced by short stretches of non-repetitive sequences (spacers). The non-coding CRISPR array is transcribed and cleaved within direct repeats into short crRNAs containing individual spacer sequences, which direct Cas nucleases to the target site (protospacer).

The Type II CRISPR carries out targeted DNA double-strand break in four sequential steps (for example, see Cong et al., 2013). First, two non-coding RNA, the pre-crRNA array and tracrRNA, are transcribed from the CRISPR locus. Second, tracrRNA hybridizes to the repeat regions of the pre-crRNA and mediates the processing of pre-crRNA into mature crRNAs containing individual spacer sequences. Third, the mature crRNA:tracrRNA complex directs Cas9 to the target DNA via Watson-Crick base-pairing between the spacer on the crRNA and the protospacer on the target DNA next to the protospacer adjacent motif (PAM), an additional requirement for target recognition. Finally, Cas9 mediates cleavage of target DNA to create a double-stranded break within the protospacer. The CRISPR system can also be used to generate single-stranded breaks in the genome. Thus, the CRISPR system can be used for RNA guided (or RNA programmed) site specific genome editing.

In an embodiment, the nuclease is a RNA-guided engineered nuclease (RGEN). In an embodiment, the RGEN is from an archaeal genome or is a recombinant version thereof. In an embodiment, the RGEN is from a bacterial genome or is a recombinant version thereof. In an embodiment, the RGEN is from a Type I (CRISPR)-cas (CRISPR-associated) system. In an embodiment, the RGEN is from a Type II (CRISPR)-cas (CRISPR-associated) system. In an embodiment, the RGEN is from a Type III (CRISPR)-cas (CRISPR-associated) system. In an embodiment, the nuclease is a class I RGEN. In an embodiment, the nuclease is a class II RGEN. In an embodiment, the RGEN is a multi-component enzyme. In an embodiment, the RGEN is a single component enzyme. In an embodiment, the RGEN is CAS3. In an embodiment, the RGEN is CAS10. In an embodiment, the RGEN is CAS9. In an embodiment, the RGEN is Cpf1 (Zetsche et al., 2015). In an embodiment, the RGEN is targeted by a single RNA or DNA. In an embodiment, the RGEN is targeted by more than one RNA and/or DNA. In an embodiment, the CAS9 is from *Streptococcus pyogenes*.

In an embodiment, the programmable nuclease may be a transcription activator-like effector (TALE) nuclease (see, e.g., Zhang et al., 2011). TALEs are transcription factors from the plant pathogen *Xanthomonas* that can be readily engineered to bind new DNA targets. TALEs or truncated versions thereof may be linked to the catalytic domain of endonucleases such as FokI to create targeting endonuclease called TALE nucleases or TALENs.

In an embodiment, the programmable nuclease is a zinc-finger nuclease (ZFN). In one embodiment, each monomer of the ZFN comprises 3 or more zinc finger-based DNA binding domains, wherein each zinc finger-based DNA binding domain binds to a 3 bp subsite. In other embodiments, the ZFN is a chimeric protein comprising a zinc finger-based DNA binding domain operably linked to an independent nuclease. In one embodiment, the independent endonuclease is a FokI endonuclease. In one embodiment, the nuclease agent comprises a first ZFN and a second ZFN, wherein each of the first ZFN and the second ZFN is operably linked to a FokI nuclease, wherein the first and the second ZFN recognize two contiguous target DNA sequences in each strand of the target DNA sequence separated by about 6 bp to about 40 bp cleavage site or about a 5 bp to about 6 bp cleavage site, and wherein the FokI nucleases dimerize and make a double strand break (see, for example, US20060246567, US20080182332, US20020081614, US20030021776, WO/2002/057308, US20130123484, US20100291048 and WO 11/017293).

In an embodiment, the programmable nuclease may be a DNA programmed argonaute (WO 14/189628). Prokaryotic and eukaryotic argonautes are enzymes involved in RNA interference pathways. An argonaute can bind and cleave a target nucleic acid by forming a complex with a designed nucleic acid-targeting acid. Cleavage can introduce double stranded breaks in the target nucleic acid which can be repaired by non-homologous end joining machinery. A DNA "guided" or "programmed" argonaute can be directed to introducing double stranded DNA breaks in predetermined locations in DNA. In an embodiment, the argonaute is from *Natronobacterium gregoryi*.

Homologous Recombination

In an embodiment, a genetic modification is introduced by homologous recombination. Homologous recombination is a type of genetic recombination in which nucleotide sequences are exchanged between two similar or identical molecules of DNA which can involve the use of the double-strand break repair (DSBR) pathway and the synthesis-dependent strands annealing (SDSA pathway) (Lodish et al., 2000; Weaver, 2002). Homologues recombination can be used to a delete a gene or portion thereof, or to introduce a substitution or an insertion into a gene such as an antiviral gene or a regulatory region thereof. In addition, homologous recombination can be used to insert a transgene. Homologous recombination can be used to introduce a genetic modification into the DNA of a host cell by any method known to a person skilled in the art. In an embodiment, homologous recombination may be triggered by a programmable nuclease.

Double-Stranded RNA

In one embodiment, the genetic modification, preferably the second genetic modification, is a transgene which encodes a dsRNA molecule for RNAi, preferably integrated into the genome of the avian.

The terms "RNA interference", "RNAi" or "gene silencing" refer generally to a process in which a dsRNA molecule reduces the expression of a nucleic acid sequence with which the double-stranded RNA molecule shares substantial or total homology. However, it has been shown that RNA interference can be achieved using non-RNA double stranded molecules (see, for example, US 20070004667).

The double-stranded regions should be at least 19 contiguous nucleotides, for example about 19 to 23 nucleotides, or may be longer, for example 30 or 50 nucleotides, or 100 nucleotides or more. The full-length sequence corresponding to the entire gene transcript may be used. Preferably, they are about 19 to about 23 nucleotides in length.

The degree of identity of a double-stranded region of a nucleic acid molecule to the targeted transcript should be at least 90% and more preferably 95-100%. The nucleic acid molecule may of course comprise unrelated sequences which may function to stabilize the molecule.

The term "short interfering RNA" or "siRNA" as used herein refers to a nucleic acid molecule which comprises ribonucleotides capable of inhibiting or down regulating gene expression, for example by mediating RNAi in a sequence-specific manner, wherein the double stranded portion is less than 50 nucleotides in length, preferably about 19 to about 23 nucleotides in length. For example the siRNA can be a nucleic acid molecule comprising self-complementary sense and antisense regions, wherein the antisense region comprises nucleotide sequence that is complementary to nucleotide sequence in a target nucleic acid molecule or a portion thereof and the sense region having nucleotide sequence corresponding to the target nucleic acid sequence or a portion thereof. The siRNA can be assembled from two separate oligonucleotides, where one strand is the sense strand and the other is the antisense strand, wherein the antisense and sense strands are self-complementary.

As used herein, the term siRNA is meant to be equivalent to other terms used to describe nucleic acid molecules that are capable of mediating sequence specific RNAi, for example micro-RNA (miRNA), short hairpin RNA (shRNA), short interfering oligonucleotide, short interfering nucleic acid (siNA), short interfering modified oligonucleotide, chemically-modified siRNA, post-transcriptional gene silencing RNA (ptgsRNA), and others. In addition, as used herein, the term RNAi is meant to be equivalent to other terms used to describe sequence specific RNA interference, such as post transcriptional gene silencing, translational inhibition, or epigenetics. For example, siRNA molecules of the invention can be used to epigenetically silence genes at both the post-transcriptional level or the pre-transcriptional level. In a non-limiting example, epigenetic regulation of gene expression by siRNA molecules of the invention can result from siRNA mediated modification of chromatin structure to alter gene expression.

By "shRNA" or "short-hairpin RNA" is meant an RNA molecule where less than about 50 nucleotides, preferably about 19 to about 23 nucleotides, is base paired with a complementary sequence located on the same RNA molecule, and where said sequence and complementary sequence are separated by an unpaired region of at least about 4 to about 15 nucleotides which forms a single-stranded loop above the stem structure created by the two regions of base complementarity. An Example of a sequence of a single-stranded loop includes: 5' UUCAAGAGA 3'.

Included shRNAs are dual or bi-finger and multi-finger hairpin dsRNAs, in which the RNA molecule comprises two or more of such stem-loop structures separated by single-stranded spacer regions.

The dsRNAs as described herein may be used to reduce the expression of a gene the controls a production trait such as viral production. For example, the dsRNAs may be expressed from a nucleic acid construct inserted into the Z chromosome of the avian with expression of the dsRNA resulting in reduced expression of gene which controls a production trait in an avian. In an embodiment, the gene is BACE2, GNAZ, UBE1DC1, CDX2, ZFPM2, TRIM50, DDI2, LOC1008859339, CNOT4, CAPN13, DNASEIL2, PHF21A, PCGF5, HSBP1, GAPDH, IFNAR1, IL28RA, MDA5, IL-6, IL1R1. In an embodiment, the dsRNA comprises a sequence as shown in Table 1.

TABLE 1

| \multicolumn{5}{c}{siRNA sequences for silencing of antiviral genes} |
| Target gene | | Sense sequence (5' to 3') | Antisense sequence (5' to 3') | Accession no. |
| --- | --- | --- | --- | --- |
| BACE2 | si-BACE2-1 | SEQ NO: 1 GUGCAAGCAUAGAUCUUAAUU | SEQ NO: 2 UUAAGAUCUAUGCUUGCACUU | XM_416735 |
|  | si-BACE2-2 | SEQ NO: 3 GGGAUUGAAGUCACAGUUAUU | SEQ NO: 4 UAACUGUGACUUCAAUCCCUU |  |
|  | si-BACE2-3 | SEQ NO: 5 CGUUAAAUAUUCUGGUUGAUU | SEQ NO: 6 UCAACCAGAAUAUUUAACGUU |  |
|  | si-BACE2-4 | SEQ NO: 7 GGGUUAAAUGGCAUGGAAUUU | SEQ NO: 8 AUUCCAUGCCAUUUAACCCUU |  |
| GNAZ | si-GNAZ-1 | SEQ NO: 9 ACGCAUAAUUCGGGCUCUAUU | SEQ NO: 10 UAGAGCCCGAAUUAUGCGUUU | XM_001232444 |
|  | si-GNAZ-2 | SEQ NO: 11 CCACUAGCCUGUUACAUUAUU | SEQ NO: 12 UAAUGUAACAGGCUAGUGGUU |  |
|  | si-GNAZ-3 | SEQ NO: 13 AGGUUAAAGAUGAGCGAUAUU | SEQ NO: 14 UAUCGCUCAUCUUUAACCUUU |  |
|  | si-GNAZ-4 | SEQ NO: 15 GUGUGGAGCUGAGUGGAUAUU | SEQ NO: 16 UAUCCACUCAGCUCCACACUU |  |
| UBE1DC1 | si-UBE1DC1-1 | SEQ NO: 17 UCCACAAUGUAGUGAUCAAUU | SEQ NO: 18 UUGAUCACUACAUUGUGGAUU | NM_001001765 |
|  | si-UBE1DC1-2 | SEQ NO: 19 CGAAUUAGUAUCAGAAACUUU | SEQ NO: 20 AGUUUCUGAUACUAAUUCGUU |  |
|  | si-UBE1DC1-3 | SEQ NO: 21 CGGAAUUACUGUAGCAUAUUU | SEQ NO: 22 AUAUGCUACAGUAAUUCCGUU |  |
|  | si-UBE1DC1-4 | SEQ NO: 23 CAAUUAACACGGCCUGCAAUU | SEQ NO: 24 UUGCAGGCCGUGUUAAUUGUU |  |
| CDX2 | si-CDX2-1 | SEQ NO: 25 UCUGCGAGUGGGUGAGGAAUU | SEQ NO: 26 UUCCUCACCCACUCGCAGAUU | NM_204311 |
|  | si-CDX2-2 | SEQ NO: 27 CCAGGACGAAGGACAAAUAUU | SEQ NO: 28 UAUUUGUCCUUCGUCCUGGUU |  |
|  | si-CDX2-3 | SEQ NO: 29 UGAGCUACCUCCUGGACAAUU | SEQ NO: 30 UUGUCCAGGAGGUAGCUCAUU |  |
|  | si-CDX2-4 | SEQ NO: 31 GCUCGGUAGCCAAGUCAAAUU | SEQ NO: 32 UUUGACUUGGCUACCGAGCUU |  |
| ZFPM2 | si-ZFPM2-1 | SEQ NO: 33 UUAACAAGGUAGAGAACUAUU | SEQ NO: 34 UAGUUCUCUACCUUGUUAAUU | XM_418380 |
|  | si-ZFPM2-2 | SEQ NO: 35 GAGGCAUGGUAAUAGUUAAUU | SEQ NO: 36 UUAACUAUUACCAUGCCUCUU |  |
|  | si-ZFPM2-3 | SEQ NO: 37 GUACCUGUGUUUAGCAUAUUU | SEQ NO: 38 AUAUGCUAAACACAGGUACUU |  |
|  | si-ZFPM2-4 | SEQ NO: 39 GGAAUAAAGCCAAGCGAUUUU | SEQ NO: 40 AAUCGCUUGGCUUUAUUCCUU |  |
| TRIM50 | si-TRIM50-1 | SEQ NO: 41 GCUCAUCGGCCUCAAGGAAUU | SEQ NO: 42 UUCCUUGAGGCCGAUGAGCUU | XM_415709 |
|  | si-TRIM50-2 | SEQ NO: 43 CGGAAGAUGAGCAUUGACAUU | SEQ NO: 44 UGUCAAUGCUCAUCUUCCGUU |  |
|  | si-TRIM50-3 | SEQ NO: 45 ACGAAAGUCAGCUUGAUUUUU | SEQ NO: 46 AAAUCAAGCUGACUUUCGUUU |  |
|  | si-TRIM50-4 | SEQ NO: 47 GGGCACAGUCAGCCGCAAAUU | SEQ NO: 48 UUUGCGGCUGACUGUGCCCUU |  |
| DDI2 | si-DDI2-1 | SEQ NO: 49 CGACAGAAAGAUACCGUAGUU | SEQ NO: 50 CUACGGUAUCUUUCUGUCGUU | XM_423293 |
|  | si-DDI2-2 | SEQ NO: 51 GAUUAUACCAGCAAGAAAUUU | SEQ NO: 52 AUUUCUUGCUGGUAUAAUCUU |  |
|  | si-DDI2-3 | SEQ NO: 53 CAGUGGAGACCUAGAUAAAUU | SEQ NO: 54 UUUAUCUAGGUCUCCACUGUU |  |
|  | si-DDI2-4 | SEQ NO: 55 AGAGAGGAUCCGACUGUAUUU | SEQ NO: 56 AUACAGUCGGAUCCUCUCUUU |  |

TABLE 1-continued siRNA sequences for silencing of antiviral genes

| Target gene | | Sense sequence (5' to 3') | Antisense sequence (5' to 3') | Accession no. |
|---|---|---|---|---|
| LOC100859339 | si-LOC100859339-1 | SEQ NO: 57 UGACGGGACUGGUGAGCAUUU | SEQ NO: 58 AUGCUCACCAGUCCCGUCAUU | XM_003642919 |
| | si-LOC100859339-2 | SEQ NO: 59 UCGACAACUUUGACGUGUAUU | SEQ NO: 60 UACACGUCAAAGUUGUCGAUU | |
| | si-LOC100859339-3 | SEQ NO: 61 GCGUCGAGUUCAUGAGCUCUU | SEQ NO: 62 GAGCUCAUGAACUCGACGCUU | |
| | si-LOC100859339-4 | SEQ NO: 63 GCGCAGAGCGGUACCAUAAUU | SEQ NO: 64 UUAUGGUACCGCUCUGCGCUU | |
| CNOT4 | si-CNOT4-1 | SEQ NO: 65 CCGCAAAGCCUUAGCAGACUU | SEQ NO: 66 GUCUGCUAAGGCUUUGCGGUU | NM_001012811 |
| | si-CNOT4-2 | SEQ NO: 67 GCAAGAACUAUACAAACUAUU | SEQ NO: 68 UAGUUUGUAUAGUUCUUGCUU | |
| | si-CNOT4-3 | SEQ NO: 69 CGGGUAAGCACCAAGAAUAUU | SEQ NO: 70 UAUUCUUGGUGCUUACCCGUU | |
| | si-CNOT4-4 | SEQ NO: 71 ACACGAGCUAGGAGAUGAAUU | SEQ NO: 72 UUCAUCUCCUAGCUCGUGUUU | |
| CAPN13 | si-CAPN13-1 | SEQ NO: 73 GGAGUUAGCAGAUUUGAUAUU | SEQ NO: 74 UAUCAAAUCUGCUAACUCCUU | XM_419369 |
| | si-CAPN13-2 | SEQ NO: 75 CGACAGAGGACCGAGAAUUUU | SEQ NO: 76 AAUUCUCGGUCCUCUGUCGUU | |
| | si-CAPN13-3 | SEQ NO: 77 GGUCAUUUCACUCAUACAAUU | SEQ NO: 78 UUGUAUGAGUGAAAUGACCUU | |
| | si-CAPN13-4 | SEQ NO: 79 UUGUAAAGAAUCAAGACGAUU | SEQ NO: 80 UCGUCUUGAUUCUUUACAAUU | |
| DNASE1L2 | si-DNASE1L2-1 | SEQ NO: 81 CGGAGGAGUUCGUGAUGGUUU | SEQ NO: 82 ACCAUCACGAACUCCUCCGUU | XM_425256 |
| | si-DNASE1L2-2 | SEQ NO: 83 CCGUCGAGGUGAAGCUGAUUU | SEQ NO: 84 AUCAGCUUCACCUCGACGGUU | |
| | si-DNASE1L2-3 | SEQ NO: 85 AAGCAGAGCGACUGGGCCUUU | SEQ NO: 86 AGGCCCAGUCGCUCUGCUUUU | |
| | si-DNASE1L2-4 | SEQ NO: 87 UGGCAGUCAGCGACCAUUAUU | SEQ NO: 88 UAAUGGUCGCUGACUGCCAUU | |
| PHF21A | si-PHF21A-1 | SEQ NO: 89 UGUCAAGACCAGAUGUUAAUU | SEQ NO: 90 UUAACAUCUGGUCUUGACAUU | NM_001199647 |
| | si-PHF21A-2 | SEQ NO: 91 GUGAUAUCCAUGAGGACUUUU | SEQ NO: 92 AAGUCCUCAUGGAUAUCACUU | |
| | si-PHF21A-3 | SEQ NO: 93 ACAAGGGCGAUGAGACUAAUU | SEQ NO: 94 UUAGUCUCAUCGCCCUUGUUU | |
| | si-PHF21A-4 | SEQ NO: 95 CCAUUGGCACAGUCAGAAAUU | SEQ NO: 96 UUUCUGACUGUGCCAAUGGUU | |
| PCGF5 | si-PCGF5-1 | SEQ NO: 97 UGGGAAAGGAUCAUACUAUUU | SEQ NO: 98 AUAGUAUGAUCCUUUCCCAUU | XM_421668 |
| | si-PCGF5-2 | SEQ NO: 99 CGGUUAGACCAAAGGGCCAUU | SEQ NO: 100 UGGCCCUUUGGUCUAACCGUU | |
| | si-PCGF5-3 | SEQ NO: 101 CGAGUAACCGUGGGAACUAUU | SEQ NO: 102 UAGUUCCCACGGUUACUCGUU | |
| | si-PCGF5-4 | SEQ NO: 103 GCAUGAGACCAACCCACUAUU | SEQ NO: 104 UAGUGGGUUGGUCUCAUGCUU | |
| HSBP1 | si-HSBP1-1 | SEQ NO: 105 UCAAGUAACGGGUGUAUUUUU | SEQ NO: 106 AAAUACACCCGUUACUUGAUU | NM_001112809 |
| | si-HSBP1-2 | SEQ NO: 107 GACACAAGCGGGAGUAGAAUU | SEQ NO: 108 UUCUACUCCCGCUUGUGUCUU | |
| | si-HSBP1-3 | SEQ NO: 109 CGAUUUGUGUACUGUAAUUUU | SEQ NO: 110 AAUUACAGUACACAAAUCGUU | |
| | si-HSBP1-4 | SEQ NO: 111 GUGGAUGACUGUAUUAUUUUU | SEQ NO: 112 AAAUAAUACAGUCAUCCACUU | |
| GAPDH | si-GAPDH-1 | SEQ NO: 113 GGGUGUCAACCAUGAGAAAUU | SEQ NO: 114 UUUCUCAUGGUUGACACCCUU | NM_204305 |
| | si-GAPDH-2 | SEQ NO: 115 GUACCACCUUACAUCAAUAUU | SEQ NO: 116 UAUUGAUGUAAGGUGGUACUU | |
| | si-GAPDH-3 | SEQ NO: 117 ACGGGAAACUUGUGAUCAAUU | SEQ NO: 118 UUGAUCACAAGUUUCCCGUUU | |
| | si-GAPDH-4 | SEQ NO: 119 AGUCGGAGUCAACGGAUUUUU | SEQ NO: 120 AAAUCCGUUGACUCCGACUUU | |

TABLE 1-continued siRNA sequences for silencing of antiviral genes

| Target gene | | Sense sequence (5' to 3') | Antisense sequence (5' to 3') | Accession no. |
|---|---|---|---|---|
| IFNAR1 | si-IFNAR1-1 | SEQ NO: 121<br>GGUAUCAGGAUGUGAGAACUU | SEQ NO: 122<br>GUUCUCACAUCCUGAUACCUU | NM_204859 |
| | si-IFNAR1-2 | SEQ NO: 123<br>GUGGCUAAUUUCUGUGUUUUU | SEQ NO: 124<br>AAACACAGAAAUUAGCCACUU | |
| | si-IFNAR1-3 | SEQ NO: 125<br>AGAAGUAGAUCCUCCGGUAUU | SEQ NO: 126<br>UACCGGAGGAUCUACUUCUUU | |
| | si-IFNAR1-4 | SEQ NO: 127<br>GAGUAGGAUCACAGAAGAAUU | SEQ NO: 128<br>UUCUUCUGUGAUCCUACUCUU | |
| IL28RA | si-IL28RA-1 | SEQ NO: 129<br>UGACGUGUGUGAUUCCAAAUU | SEQ NO: 130<br>UUUGGAAUCACACACGUCAUU | XM_417841 |
| | si-IL28RA-2 | SEQ NO: 131<br>CCAGUGUGCAUGCAGUUAAUU | SEQ NO: 132<br>UUAACUGCAUGCACACUGGUU | |
| | si-IL28RA-3 | SEQ NO: 133<br>AUUCCGGGCUCAAGUGAAAUU | SEQ NO: 134<br>UUUCACUUGAGCCCGGAAUUU | |
| | si-IL28RA-4 | SEQ NO: 135<br>AAAUCACAGUUCAAGGAAUUU | SEQ NO: 136<br>AUUCCUUGAACUGUGAUUUUU | |
| MDA5 | si-MDA5-1 | SEQ NO: 137<br>CGAAAGGAGUUUAAUCCAUUU | SEQ NO: 138<br>AUGGAUUAAACUCCUUUCGUU | NM_001193638 |
| | si-MDA5-2 | SEQ NO: 139<br>CGUUAGUGGAACAGCAUUUUU | SEQ NO: 140<br>AAAUGCUGUUCCACUAACGUU | |
| | si-MDA5-3 | SEQ NO: 141<br>GGGGAAAUAUGAUAAUUUAUU | SEQ NO: 142<br>UAAACCAUCAUAUUUCCCCUU | |
| | si-MDA5-4 | SEQ NO: 143<br>GCAGAUGACUUAAGUGGAAUU | SEQ NO: 144<br>UUCCACUUAAGUCAUCUGCUU | |
| IL-6 | si-IL-6-1 | SEQ NO: 145<br>CGGCAGAUGGUGAUAAAUCUU | SEQ NO: 146<br>GAUUUAUCACCAUCUGCCGUU | NM_204628 |
| | si-IL-6-2 | SEQ NO: 147<br>CGUGAGGGCCGUUCGCUAUUU | SEQ NO: 148<br>AUAGCGAACGGCCCUCACGUU | |
| | si-IL-6-3 | SEQ NO: 149<br>ACGAGAUGUGCAAGAAGUUUU | SEQ NO: 150<br>AACUUCUUGCACAUCUCGUUU | |
| | si-IL-6-4 | SEQ NO: 151<br>AUUCAAGAGACUUUCGAUAUU | SEQ NO: 152<br>UAUCGAAAGUCUCUUGAAUUU | |
| IL1R1 | si-IL1R1-1 | SEQ NO: 153<br>ACACAUGCCGUAUGGUAUAUU | SEQ NO: 154<br>UAUACCAUACGGCAUGUGUUU | NM_205485 |
| | si-IL1R1-2 | SEQ NO: 155<br>GCUUAUUGGUCAUCUAAUUUU | SEQ NO: 156<br>AAUUAGAUGACCAAUAAGCUU | |
| | si-IL1R1-3 | SEQ NO: 157<br>CGUAUCAAGUGGUGUGUAUUU | SEQ NO: 158<br>AUACACACCACUUGAUACGUU | |
| | si-IL1R1-4 | SEQ NO: 159<br>GGUAGUAACAUGCCGAUAAUU | SEQ NO: 160<br>UUAUCGGCAUGUUACUACCUU | |

Nucleic Acid Constructs

A "transgene" as referred to herein has the normal meaning in the art of biotechnology and includes a genetic sequence which has been produced or altered by recombinant DNA or RNA technology and which has been introduced into an avian egg, or parent(s) of the egg or a predecessor thereof. The transgene may include genetic sequences derived from an avian cell. Typically, the transgene has been introduced into the avian, or egg thereof, by human manipulation such as, for example, by transformation but any method can be used as one of skill in the art recognizes. A transgene includes genetic sequences that are introduced into a chromosome as well as those that are extrachromosomal. The transgene will typically comprise an open reading frame encoding a polynucleotide of interest operably linked to a suitable promoter for expressing the polynucleotide in an avian egg.

Introduction of a genetic modification into an avian and/or into an egg of an avian may involve the use of nucleic acid construct. In an embodiment, the nucleic acid construct may comprise a transgene. As used herein, "nucleic acid construct" refers to any nucleic acid molecule that encodes, for example, a double-stranded RNA molecule as defined herein, a RNA, DNA or RNA/DNA hybrid sequences which "guides" or "targets" a programmable nuclease, or a protein of interest such as a detectable marker. Typically, the nucleic acid construct will be double stranded DNA or double-stranded RNA, or a combination thereof. Furthermore, the nucleic acid construct will typically comprise a suitable promoter operably linked to an open reading frame encoding the polynucleotide. The nucleic acid construct may comprise, for example, a first open reading frame encoding a first single strand of the double-stranded RNA molecule, with the complementary (second) strand being encoded by a second open reading frame by a different, or preferably the same, nucleic acid construct. The nucleic acid construct may be a linear fragment or a circular molecule and it may or may not be capable of replication. The skilled person will understand that the nucleic acid construct of the invention may be included within a suitable vector. Transfection or transformation of the nucleic acid construct into a recipient cell allows the cell to express an RNA or DNA molecule encoded by the nucleic acid construct.

In another example, the nucleic acid construct may express multiple copies of the same, and/or one or more (e.g. 1, 2, 3, 4, 5, or more) including multiple different, RNA molecules comprising a double-stranded region, for example a short hairpin RNA. In another example, the nucleic acid construct may be a gene targeting cassette as described in Schusser et al. (2013)

The nucleic acid construct also may contain additional genetic elements. The types of elements that may be included in the construct are not limited in any way and may be chosen by one with skill in the art. In some embodiments, the nucleic acid construct is inserted into a host cell as a transgene. In such instances it may be desirable to include "stuffer" fragments in the construct which are designed to protect the sequences encoding the RNA molecule from the transgene insertion process and to reduce the risk of external transcription read through. Stuffer fragments may also be included in the construct to increase the distance between, e.g., a promoter and a coding sequence and/or terminator component. The stuffer fragment can be any length from 5-5000 or more nucleotides. There can be one or more stuffer fragments between promoters. In the case of multiple stuffer fragments, they can be the same or different lengths. The stuffer DNA fragments are preferably different sequences. Preferably, the stuffer sequences comprise a sequence identical to that found within a cell, or progeny thereof, in which they have been inserted. In a further embodiment, the nucleic acid construct comprises stuffer regions flanking the open reading frame(s) encoding the double stranded RNA(s).

Alternatively, the nucleic acid construct may include a transposable element, for example a transposon characterized by terminal inverted repeat sequences flanking the open reading frames encoding the double stranded RNA(s). Examples of suitable transposons include Tol2, mini-Tol, Sleeping Beauty, Mariner and Galluhop.

Other genetic elements that may find use in embodiments of the present invention include those coding for proteins which confer a selective growth advantage on cells such as adenosine deaminase, aminoglycodic phosphotransferase, dihydrofolate reductase, hygromycin-B-phosphotransferase, or drug resistance.

Where the nucleic acid construct is to be transfected into an avian, it is desirable that the promoter and any additional genetic elements consist of nucleotide sequences that naturally occur in the avian's genome.

In some instances it may be desirable to insert the nucleic acid construct into a vector. The vector may be, e.g., a plasmid, virus or artificial chromosome derived from, for example, a bacteriophage, adenovirus, adeno-associated virus, retrovirus, poxvirus or herpesvirus. Such vectors include chromosomal, episomal and virus-derived vectors, e.g., vectors derived from bacterial plasmids, bacteriophages, and viruses, vectors derived from combinations thereof, such as those derived from plasmid and bacteriophage genetic elements, cosmids and phagemids.

In an embodiment, the nucleic acid construct comprises a promoter. The skilled person will appreciate that a promoter such as a constitutive promoter, tissue specific or development stage specific promoter or an inducible promoter can be used in the present invention. In an embodiment, the promoter is an avian promoter. In an embodiment, the promoter is a Pol I, Pol II or Pol II promoter. Examples of avian promoters include the 7sK RNA polymerase III Promoter, U6 RNA polymerase II promoter (Bannister et al., 2007; Massin et al., 2005).

Transgenic Avians

The term "avian" as used herein refers to any species, subspecies or race of organism of the taxonomic Class Aves, such as, but not limited to, chicken, turkey, duck, goose, quail, pheasants, parrots, finches, hawks, crows and ratites including ostrich, emu and cassowary. The term includes both chicken commercial layer and broiler lines. The term includes the various known breeds of *Gallus gallus* (chickens), for example, AC, Ancona, Andalusian, Amrox, Appenzell Bearded Hen, Appenzell Pointed Hood Hen, Araucana, Aseel, Australorp, Bandara, Baheij, Barred-Rock, Brahma, Brown Leghorn, Barnevelders, Buckeye, Buttercup, California Gray, Campine, Catalana, Chantecler, Cochin, Cornish, Crevecoeur, Cubalaya, Delaware, Dominiques, Dorking, Dutch Bantams, Faverolles, Frieslands, Frizzle, *Gallus Inauris*, Gimmizah, Golden Montazah, Hamburgs, Holland, Houdan, Java, Jersey Giant, Italian Partidge-coloured, Junglefowl (Green), Junglefowl (Gray), La Fleche, Lakenvelder, Lamona, Langshan, Leghorn, Malay, Matrouh, Minorca, Modern Gam, Naked Neck (Turken), New Hampshire Red, Old English Game, Orpington, Plymouth Rock, Polish, Red Cap, Rhode Island Red, Silkie Bantam, Silver Montazah, Styrian, Sultan, Sumatra, Sussex, Swiss Hen, White-Faced Black-Spanish, White Leghorn, Wyandottes as well as strains of turkeys, pheasants, quails, duck, game hen, guinea fowl, squab, ostriches and other poultry commonly bred in commercial quantities. The term includes various known breeds of ducks. The term includes various known breeds of ducks, for example, Call, Cayuga, Crested, Khaki Campbell, Muscovy, Orpington, Pekin, Pommeranian, Rouen and Runner. The term includes various known breeds of turkeys Black, Bourbon, Bronze, Narragansett, Royal Palm, Slate and White. The term includes various known breeds of geese, for example, African, Chinese Brown, Chinese White, Diepholz, Embden, Egyptian, Pilgrim and Toulouse.

As used herein, the terms "transgenic male avian", "transgenic female avian", "transgenic avian", or variations thereof refers to an avian in which one or more, preferably all, cells of the avian contain the first genetic modification, the second genetic modification, or preferably both. The transgenic avian may be an avian in the layer or broiler industry breeding structure, for example a parental line, grandparent line or great grandparent line (see FIG. 2).

In an embodiment, the avian is a female (ZW) in the parental or the great grandparent line as shown in FIG. 2 and comprises the first and/or the second genetic modification on the Z chromosome, preferably both genetic modifications.

In another embodiment, the avian is a male (ZZ) in the grandparent line as shown in FIG. 2 and comprises the first and/or the second genetic modification on both Z chromosomes, preferably both genetic modifications.

In another embodiment, the avian is a male (ZZ) in the great grandparent line as shown in FIG. 2 and comprises the first and/or the second genetic modification on a single Z chromosome, preferably both genetic modifications.

In an embodiment, the first and/or second genetic modification on the Z chromosome are in a location which does not negatively affect the viability of the chicken. In an embodiment, the first and/or second genetic modification on the Z chromosome are in a location that does not detrimentally impact expression and regulation of genes on the Z chromosome. In an embodiment, the first and/or second genetic modification on the Z chromosome is in an exon of a gene located on the Z chromosome. In an embodiment, the first and/or second genetic modification on the Z chromosome is in an intron of a gene located on the Z chromosome. In an embodiment, the first and/or second genetic modification on the Z chromosome is in an insertion site or in a gene located on the Z chromosome as shown in Table 4 or Table 5. In an embodiment, the first and/or second genetic modification on the Z chromosome is located in a gene selected from PALM2, UGCG, MAP1b, IFNβ, IFNA1, IFNA3, IL11RA, NP_990383.1, IPI00681421.2, NP_001026617.1, A1EA95, NP_989906.1, IP100576148.2, IP100679858.2, NP_990202.1, IP100818057.1, NFIL3, TFIP8, TICAM2, MEKK1 and IFNKL (interferon kappa-like). In an embodiment, the first and/or second genetic modification on the Z chromosome is located in the Ensemble ID selected from ENSGALT00000045403, ENSGALT00000025241, ENSGALT00000025295 and ENSGALT00000024188. In an embodiment, the first and/or second genetic modification on the Z chromosome is located in the Genescan prediction selected from chrZ.1779, chrZ.1406, chrZ.889, chrZ.25 and chrZ.1602.

Transgenic avians comprising a genetic modification in the germ line can be used for the production of avians and/or eggs comprising the germline genetic modification. In one embodiment, the transgenic avian is a female transgenic avian comprising a genetic modification in the Z chromosome wherein only male avians and/or eggs produced by the avian inherit the genetic modification.

Transgenic avians of the present invention can be used for the production of eggs comprising a genetic modification wherein the genetic modification reduces the expression of an antiviral gene and/or protein in the egg when compared to an isogenic egg lacking the genetic modification. In one embodiment, the genetic modification results in reduced expression of one or more genes and/or proteins in the animal and/or progeny thereof and/or eggs produced by the avian or progeny thereof. In an embodiment, a gene knockout animal can be produced. In another embodiment, the genetic modification is at least introduced into the DNA of the fertilized ovum (at the single cell stage). As the skilled person will appreciate, in this embodiment the genetic modification may be introduced into either the maternal or paternal derived DNA, or both.

Techniques for producing transgenic animals are well known in the art. A useful general textbook on this subject is Houdebine, Transgenic animals—Generation and Use (Harwood Academic, 1997). In recent years there have been rapid advances in technologies to engineer the genome of avian species (reviewed in Doran et al., 2016).

Heterologous DNA can be introduced, for example, into fertilized ova. For instance, totipotent or pluripotent stem cells can be transformed by microinjection, calcium phosphate mediated precipitation, liposome fusion, retroviral infection or other means, the transformed cells are then introduced into the embryo, and the embryo then develops into a transgenic animal. In one method, developing embryos are infected with a retrovirus containing the desired DNA, and transgenic animals produced from the infected embryo. In an alternative method, however, the appropriate DNAs are coinjected into the pronucleus or cytoplasm of embryos, preferably at the single cell stage, and the embryos allowed to develop into mature transgenic animals.

Another method used to produce a transgenic avian involves microinjecting a nucleic acid into pro-nuclear stage eggs by standard methods. Injected eggs are then cultured before transfer into the oviducts of pseudopregnant recipients.

Transgenic avians may also be produced by nuclear transfer technology. Using this method, fibroblasts from donor animals are stably transfected with a plasmid incorporating the coding sequences for a binding domain or binding partner of interest under the control of regulatory sequences. Stable transfectants are then fused to enucleated oocytes, cultured and transferred into female recipients.

Sperm-mediated gene transfer (SMGT) is another method that may be used to generate transgenic animals. This method was first described by Lavitrano et al. (1989). Sperm-mediate transfer may comprise the use of a programmable nuclease as described in WO2017024343.

Another method of producing transgenic animals is linker based sperm-mediated gene transfer technology (LB-SMGT). This procedure is described in U.S. Pat. No. 7,067,308. Briefly, freshly harvested semen is washed and incubated with murine monoclonal antibody mAbC (secreted by the hybridoma assigned ATCC accession number PTA-6723) and then the construct DNA. The monoclonal antibody aids in the binding of the DNA to the semen. The sperm/DNA complex is then artificially inseminated into a female.

Another method used to produce a transgenic avian is homologous recombination. One example of this procedure is provided in Schusser et al. (2013). Schusser et al describes gene targeting by homologous recombination in cultured primordial germ cells to generate gene specific knockout birds. In one example, the transgenic avian is produced using the gene silencing cassette described in Schusser et al. (2013).

Germ line transgenic chickens may be produced by injecting replication-defective retrovirus into the subgerminal cavity of chick blastoderms in freshly laid eggs (U.S. Pat. No. 5,162,215; Bosselman et al., 1989; Thoraval et al., 1995). The retroviral nucleic acid carrying a foreign gene randomly inserts into a chromosome of the embryonic cells, generating transgenic animals, some of which bear the transgene in their germ line. Use of insulator elements inserted at the 5' or 3' region of the fused gene construct to overcome position effects at the site of insertion has been described (Chim et al., 1993).

Another method for generating germ line transgenic animals is by using a transposon, for example the Tol2 transposon, to integrate a nucleic acid construct of the invention into the genome of an animal. The Tol2 transposon which was first isolated from the medaka fish *Oryzias latipes* and belongs to the hAT family of transposons is described in Koga et al. (1996) and Kawakami et al. (2000). Mini-Tol2 is a variant of Tol2 and is described in Balciunas et al. (2006). The Tol2 and Mini-Tol2 transposons facilitate integration of a transgene into the genome of an organism when co-acting with the Tol2 transposase. By delivering the Tol2 transposase on a separate non-replicating plasmid, only the Tol2 or Mini-Tol2 transposon and transgene is integrated into the genome and the plasmid containing the Tol2 transposase is lost within a limited number of cell divisions. Thus, an integrated Tol2 or Mini-Tol2 transposon will no longer have the ability to undergo a subsequent transposition event. Additionally, as Tol2 is not known to be a naturally occurring avian transposon, there is no endogenous transposase activity in an avian cell, for example a chicken cell, to cause further transposition events.

Any other suitable transposon system may be used in the methods of the present invention. For example, the transposon system may be a Sleeping Beauty, Frog Prince or Mos1 transposon system, or any transposon belonging to the tc1/mariner or hAT family of transposons may be used.

The injection of avian embryonic stem cells into recipient embryos to yield chimeric birds is described in U.S. Pat. No. 7,145,057. Breeding the resulting chimera yields transgenic birds whose genome comprises the genetic modification(s).

Methods of obtaining transgenic chickens from long-term cultures of avian primordial germ cells (PGCs) are described in US 20060206952. When combined with a host avian embryo by known procedures, those modified PGCs are transmitted through the germ line to yield transgenic offspring.

A viral delivery system based on any appropriate virus may be used to deliver the nucleic acid constructs of the present invention to a cell. In addition, hybrid viral systems may be of use. The choice of viral delivery system will depend on various parameters, such as efficiency of delivery into the cell, tissue, or organ of interest, transduction efficiency of the system, pathogenicity, immunological and toxicity concerns, and the like. It is clear that there is no single viral system that is suitable for all applications. When selecting a viral delivery system to use in the present invention, it is important to choose a system where nucleic acid construct-containing viral particles are preferably: 1) reproducibly and stably propagated; 2) able to be purified to high titers; and 3) able to mediate targeted delivery (delivery of the nucleic acid expression construct to the cell, tissue, or organ of interest, without widespread dissemination).

In one embodiment, transfection reagents can be mixed with an isolated nucleic acid molecule, polynucleotide or nucleic acid construct as described herein and injected directly into the blood of developing avian embryos as described in WO 2013/155572 and Tyack et al. (2013) Transgen. Comm. 22:1257-1264. This method is referred to herein as "direct injection". Using such a method the transgene is introduced into primordial germ cells (PGCs) in the embryo and inserted into the genome of the avian. Direct injection can additional be used to administer a programmable nuclease.

Accordingly, a polynucleotide, such as transgene and/or nucleic acid construct as defined herein, can be complexed or mixed with a suitable transfection reagent. The term "transfection reagent" as used herein refers to a composition added to the polynucleotide for enhancing the uptake of the polynucleotide into a eukaryotic cell including, but not limited to, an avian cell such as a primordial germ cell. While any transfection reagent known in the art to be suitable for transfecting eukaryotic cells may be used, transfection reagents comprising a cationic lipid are particularly useful. Non-limiting examples of suitable commercially available transfection reagents comprising cationic lipids include Lipofectamine (Life Technologies) and Lipofectamine 2000 (Life Technologies).

The polynucleotide may be mixed (or "complexed") with the transfection reagent according to the manufacturer's instructions or known protocols. By way of example, when transfecting plasmid DNA with Lipofectamine 2000 transfection reagent (Invitrogen, Life Technologies), DNA may be diluted in 50 µL Opit-MEM medium and mixed gently. The Lipofectamine 2000 reagent is mixed gently and an appropriate amount diluted in 50 µL Opti-MEM medium. After a 5 minute incubation, the diluted DNA and transfection reagent are combined and mixed gently at room temperature for 20 minutes.

A suitable volume of the transfection mixture may then be directly injected into an avian embryo in accordance with the method of the invention. Typically, a suitable volume for injection into an avian embryo is about 1 µL to about 3 µL, although suitable volumes may be determined by factors such as the stage of the embryo and species of avian being injected. The skilled person will appreciate that the protocols for mixing the transfection reagent and DNA, as well as the volume to be injected into the avian embryo, may be optimised in light of the teachings of the present specification.

Prior to injection, eggs are incubated at a suitable temperature for embryonic development, for example around 37.5 to 38° C., with the pointy end upward for approximately 2.5 days (Stages 12-17), or until such time as the blood vessels in the embryo are of sufficient size to allow injection. The optimal time for injection of the transfection mixture is the time of PGC migration that typically occurs around Stages 12-17, but more preferably Stages 13-14. As the skilled person will appreciate, broiler line chickens typically have faster growing embryos, and so injection should preferably occur early in Stages 13-14 so as to introduce the transfection mixture into the bloodstream at the time of PGC migration.

To access a blood vessel of the avian embryo, a hole is made in the egg shell. For example, an approximately 10 mm hole may be made in the pointy end of the egg using a suitable implement such as forceps. The section of shell and associated membranes are carefully removed while avoiding injury to the embryo and it's membranes.

Following injection of the transfection mixture into the blood vessel of the avian embryo, the egg is sealed using a sufficient quantity of parafilm, or other suitable sealant film as known in the art. For example, where a 10 mm hole has been made in the shell, an approximately 20 mm square piece of parafilm may be used to cover the hole. A warm scalpel blade may then be used to affix the parafilm to the outer egg surface. Eggs are then turned over to the pointy-end down position and incubated at a temperature sufficient for the embryo to develop, such as until later analysis or hatch. The direct injection technique is further described in WO 2013/155572 which claims priority from U.S. 61/636,331.

Animals and/or eggs produced using the methods of the invention can be screened for the presence of the genetic modification. This can step can be performed using any suitable procedure known in the art. For instance, a nucleic acid sample, such as a genomic DNA sample, can be analysed using standard DNA amplification and sequencing procedures to determine if the genetic modification is present at the targeted site (locus) in the genome. In an embodiment, the screening also determines whether the animal and/or egg is homozygous or heterozygous for the genetic modification. In another embodiment, the avian is screened to identify whether the genetic modification can be found in germ line cells such that it can be passed on to its offspring.

Marker Detectable in the Egg

As used herein, the terms "a marker detectable in the egg" and "detectable marker" as used interchangeably in the context of the first genetic modification. The detectable marker may be a protein that can be expressed in the egg of an avian of the invention and detected by any method known to a person skilled in the art that does not disrupt the integrity of the egg of the shell. In an embodiment, the detectable maker may be a fluorescent protein, a luminescent protein, an audible (vibrating protein), a sonic protein, a metabolic marker or a selective chelating protein. In an embodiment, the marker is detectable within one day, or two days, of the point of lay without disrupting the integrity of the shell of the egg. In an embodiment, the marker is detectable before the egg hatches. In an embodiment, the marker is detectable at least at day 1 of embryogenesis, or at least at day 2 of embryogenesis, or at least at day 2.4 of embryogenesis, or at least at day 4 of embryogenesis, or at least at day 6 of embryogenesis, or at least at day 8 of embryogenesis, or at least at day 10 of embryogenesis, or at least at day 12 of embryogenesis, or at least at day 14 of embryogenesis, or at least at day 16 of embryogenesis, or at least at day 18 of embryogenesis.

In a preferred embodiment the marker is a fluorescent protein. In an embodiment, the fluorescent protein is a near infrared fluorescent protein e.g. TagRFP657. In an embodiment, the fluorescent protein is a photoactivatable fluorescent protein. In an embodiment, the fluorescent protein is selected from: but not limited to, Green fluorescent protein (GFP), Enhanced green fluorescent protein (EGFP), Emerald, Superfolder GFP, Azami Green, mWasabi, TagGFP, TurboGFP, mNeonGreen, mUKG, AcGFP, ZsGreen, Cloverm Sapphire, T-Sapphire, Enhanced blue fluorescent protein (EBFP), EBFP2, Azurite, TagBFP, mTagBFP, mKalama1, Cyan fluorescent protein (CFP), mCFP, Enhanced cyan fluorescent protein (ECFP), mECFP, Cerulean, SCFP3A, mTurquoise, mTurquoise2, CyPet, AmCyan1, Midori-Ishi Cyan, TagCFP, mTFP1 (Teal), Yellow fluorescent protein (YFP), Enhanced yellow fluorescent protein (EYFP), Super yellow fluorescent protein (SYFP), Topaz, Venus, Citrine, mCitrine, YPet, TagYFP, TurboYFP, PhiYFP, ZsYellow1, mBanana, Kusabira Orange, Kusabira Orange2, mOrange, mOrange2, dTomato, dTomato-Tandem, Red fluorescent protein (RFP), TurboRFP, TurboFP602, TurboFP635, Tag ref fluorescent protein (RFP), TagRFP-T, DsRed, DsRed2, DsRed-Express (T1), DsRed-Monomer, mTangerine, mKeima-Red, mRuby, mRuby2, mApple, mStrawberry, AsRed2, mRFP1, JRed, mCherry, mKate2, mKate (TagFP635), HcRed1, mRaspberry, dKeima-Tandem, HcRed-Tandem, mPlum, mNeptune, NirFP, Sirius, TagRFP657, AQ143, Kaede, KikGR1, PX-CFP2, mEos2, IrisFP, mEOS3.2, PSmOrange, PAGFP, Dronpa, Allophycocyanin, GFPuv, R-phycoerythrin (RPE), Peridinin Chlorophyll (PerCP), P3, Katusha, B-phycoerythrin (BPE), mKO, and J-Red. In an embodiment, the fluorescent protein is RFP. In an embodiment, the fluorescent protein is GFP. In an embodiment GFP comprises one or more of the following mutations GFP (Y66H mutation), GFP (Y66F mutation), GFP (Y66W mutation), GFP (S65A mutation), GFP (S65C mutation), GFP (S65L mutation), GFP (S65T mutation).

In an embodiment, the marker is a luminescent protein. In an embodiment, the luminescent protein is selected from aequorin or a luciferase.

In an embodiment, an audible (vibrating protein), which may be detected by detecting a sound wave or vibration from the egg.

In an embodiment, the marker is a sonic protein. As used herein "sonic protein" refers to a protein that forms a structure in response to sound which can be detected by, for example candling (exposure to while light) or magnetic resonance imaging (MRI) or other detection systems.

In an embodiment, the marker is a metabolic marker. The metabolic marker, for example, may be a volatile product from an introduced marker enzyme. Such markers can be detected with a biosensor, for example the Cybernose® device.

In an embodiment, the marker is a selective chelating protein. As used herein "selective chelating protein" refers to a protein capable of sequestering and concentrating metal ions responsive to (MRI) or other detection systems.

In an embodiment, the marker can be detected without disrupting the integrity of the shell of the egg. This may be achieved by creating a fine hole in the egg suitable for insertion of a fiber optic or biosensor which allows for assessment of the presence/absence of the marker. Such fiber optics or biosensors may be hair width in size and may be incorporated into needles that are inserted into eggs which can for example detect, mark and remove male embryos. Such fibre optics or biosensors may be combined with existing egg injection platforms (e.g. Embrex in ovo injection systems) for rapid detection and removal of male embryo comprising the marker. Such fibre optics may be suitable for detecting a fluorescence, luminescence, audible (vibrating protein), metabolic marker or sonic protein. In an embodiment, the fibre optics referred to herein are less than 1000 μm, or is less than 900 μm, or is less than 900 μm, or is less than 800 μm, or is less than 700 μm, or is less than 600 μm, or is less than 500 μm, or is less than 400 μm, or is less than 300 μm, or is less than 200 μm, or is less than 100 μm, or is less than 50 μm, or is less than 40 μm, or is less than 30 μm, or is less than 20 μm, or is less than 10 μm, or is less than 5 μm, or is less than 4 μm, or is less than 3 μm, or is less than 2 μm, or is less than 1 μm in diameter.

In an embodiment, the marker can be detected through the shell of the egg, namely the shell of the egg is whole and undisrupted (no whole suitable for a fibre optic or biosensor). Such, embodiments reduce the risk of contamination of the egg which can be used for, for example, virus or protein production.

In an embodiment, the maker is a fluorescent protein and the marker is screened for by exposing the egg to a first wavelength of light and assessing for fluorescence at a second wavelength of light. In an embodiment, the first and second wavelength are the same wavelength. In an embodiment the first and second wavelengths are different wavelengths. In an embodiment, the light source may be a laser. The appropriate wavelengths for assessing for fluorescence of the fluorescent proteins as described herein could be readily determined by a person skilled in the art based on the literature. In an embodiment, the screening may also comprise the use of a filter.

A person skilled in the art would appreciate that the detection methods as described herein may be automated. The automated method may comprise a conveyor means which moves the eggs through and/or past a means for exposing the eggs to a first wavelength of light and through and/or past a means for detecting the presence of expression at a second wavelength of light. Automation may comprise adaption of an Embrex in ovo injection systems, or adaption of similar systems for detection of the markers referred to herein. Eggs which fluoresce may be separated from eggs which do not fluoresce by, for example, manually by human hands, a robotic arm, a vacuum apparatus which engages and lifts each egg by vacuum or by a gating means where the eggs are separated by gates which are only opened if the egg is fluorescent and/or are only opened if the egg is not fluorescent.

In an embodiment, the method is used for high volume gender sorting of avian eggs. In an embodiment, the male eggs are separated from female eggs and used for virus production or production of therapeutic proteins. In an embodiment, the female eggs are separated from the male eggs and used for egg production (for food) or meat production.

Production Traits

As used herein, the term "production trait" refers to any phenotype of an avian that has commercial value such as, but not limited to, virus production, recombinant protein production, muscle mass, nutritional content, fertility, egg production, feed efficiency, livability, meat yield, longevity, white meat yield, dark meat yield, disease resistance, disease susceptibility, optimal diet time to maturity, time to a target weight, weight at a target timepoint, average daily weight gain, meat quality, muscle content, muscle mass, fat content, feed intake, protein content, bone content, maintenance energy requirement, mature size, amino acid profile, fatty acid profile, stress susceptibility and response, digestive capacity, myostatin activity, pattern of fat deposition. In one embodiment, the trait is resistance to *Salmonella* infection, ascites, and listeria infection. The egg characteristic can be allergen free, quality, size, shape, shelf-life, freshness, cholesterol content, color, biotin content, calcium content, shell quality, yolk color, lecithin content, number of yolks, yolk content, white content, vitamin content, vitamin D content, nutrient density, protein content, albumen content, protein quality, avidin content, fat content, saturated fat content, unsaturated fat content, interior egg quality, number of blood spots, air cell size, grade, a bloom characteristic, chalaza prevalence or appearance, ease of peeling, likelihood of being a restricted egg, *Salmonella* content.

In an embodiment, the production trait is selected from: virus production, recombinant protein production, muscle mass, nutritional content, fertility and allergenicity.

In an embodiment, the production trait is not sex. In an embodiment, the avian comprises a functional non-modified DMRT1 gene.

In an embodiment, the production trait is modulated by a gene located on the Z chromosome. For example, the gene may be selected from: IFNB (ENSGALG00000005759) Z:6888741-6889590; IFNA1 (ENSGALG00000013245) Z:6896104-6896866; IFNA3 (ENSGALG00000005764) Z:6906540-6907121; IL11RA (ENSGALG00000005848) Z:7805781-7828820; NP_990383.1 (ENSGALG00000005194) Z:8423047-8426804; IPI00681421.2 (ENSGALG00000021353) Z:8426772-8430612; NP_001026617.1 (ENSGALG00000002383) Z:8431894-8435719; A1EA95 (ENSGALG00000013372) Z:10231937-1024566; NP_989906.1 (ENSGALG00000003733) Z:11395953-11424499; IPI00576148.2 (ENSGALG00000003747) Z:11551082-11574029; IPI00679858.2 (ENSGALG00000014714) Z:16329446-16353112; NP_990202.1 (ENSGALG00000014716) Z:16366576-16391591; IPI00818057.1 (ENSGALG00000023411) Z:20717464-20724015; IPI00598932.2 (ENSGALG00000015031) Z:28205728-28210197; NFIL3 (ENSGALG00000015209) Z:43619547-43620923; TFIP8 (ENSGALG00000002196) Z:69693040-69693606; TICAM2 (ENSGALG00000021410) Z:71110462-71115876; IFNKL interferon kappa-like (ENSGALG00000015062) Z: 34282788-34285316; and MEKK1 (ENSGALG00000014718) Z:47924788.

Virus Production

As used herein, the term "virus production" refers to increasing the virus production capability of an egg or increasing the suitability (immunogenicity) of a virus for vaccine production or increasing the quality (immunogenicity) of the virus produced in the avian egg. In one embodiment, a transgenic egg of the present invention, when inoculated with a virus, produces a greater amount of virus than an isogenic egg lacking the same modification. In one embodiment, a transgenic egg of the present invention, when inoculated with e.g. a mammalian virus, produces a virus that more closely represents the wild type virus (i.e. is less egg adapted or more immunogenic) and as a consequence vaccines derived from the virus induce a higher protective immune response than a virus produced in an isogenic egg lacking the same genetic modification. In an embodiment, the virus is more immunogenic in humans than a virus produced in an isogenic add lacking the same modification.

As used herein, the term “producing more virus than the isogenic egg” refers to the ability of an avian egg of the invention to be used to cultivate more virus than the isogenic egg. In an embodiment, the isogenic egg is from the same strain of avian as the avian egg of the invention. In an embodiment, the isogenic avian egg is genetically identical to the egg of the invention apart from the presence of the genetic modification. In an embodiment, an avian of the invention produces at least 0.5 fold, or at least 1 fold, or at least 2 fold, or at least a 3 fold, or at least 5 fold, or at least 10 fold, or at least 15 fold, or at least 20 fold, or at least 50 fold, or at least 100 fold more virus when compared to an isogenic egg lacking the genetic modification. Such an increase in virus production can readily be determined by the skilled person using routine techniques. For example, an egg of the invention and the isogenic egg can be inoculated with the same amount of the same virus and incubated under the same conditions for the same length of time and the amount of virus particles present in each egg can be determined using standard techniques, such as those outlined in the Examples.

As used herein, the term “virus or particles thereof” refers to whole virus which may or may not be inactivated and to particles of such viruses. A virus particle can be any size suitable for use in a split virus vaccine or subunit virus vaccine. The whole virus or particles of the virus can be harvested form the allantoic fluid of the egg. A harvested whole virus may be disrupted during the preparation of a vaccine composition to form particles of a suitable size for a split virus vaccine or subunit virus vaccine.

In an embodiment, virus production may be increased by introduction of a genetic modification which reduces the expression of an antiviral gene, and/or antiviral protein activity, in the egg compared to an isogenic egg lacking the same modification.

As used herein, the term “reduces the expression of an antiviral gene” refers to the ability of the genetic modification to down-regulate the level of RNA transcript and/or the level of translation from the RNA transcript in the egg when compared to the level(s) in the isogenic egg. In an embodiment, the isogenic egg is from the same strain of avian as the avian egg of the invention. In an embodiment, the isogenic avian egg is genetically identical to the egg of the invention apart from the presence of the genetic modification. In an embodiment, the gene encodes an antiviral protein, and hence the level of antiviral protein activity in the egg will also be reduced when compared to the level in the isogenic egg. In an embodiment, the genetic modification reduces expression of the antiviral gene in the egg by at least 10%, or at least 20%, or at least 30%, or at least 40%, or at least 50%, or at least 60%, or at least 70%, or at least 80%, or at least 90%, or at least 95%, or at least 98%, or at least 99%, or 100% when compared to the isogenic egg lacking the genetic modification. Such a reduction can be identified using standard procedures.

As used herein, the term “reduces the level of antiviral protein activity” refers to the ability of the genetic modification to down-regulate the level antiviral protein activity in the egg when compared to the level in the isogenic egg. In an embodiment, the isogenic egg is from the same strain of avian as the avian egg of the invention. In an embodiment, the isogenic avian egg is genetically identical to the egg of the invention apart from the presence of the genetic modification. The activity of the protein can be reduced by, for example, reducing the amount of the protein in the egg and/or reducing the ability of the protein to perform its natural function (such as binding of the protein by an aptamer). In an embodiment, the genetic modification reduces the level of antiviral protein activity in the egg by at least 10%, or at least 20%, or at least 30%, or at least 40%, or at least 50%, or at least 60%, or at least 70%, or at least 80%, or at least 90%, or at least 95%, or at least 98%, or at least 99%, or 100% when compared to the isogenic egg lacking the genetic modification. Such a reduction can be identified using standard procedures.

As used herein, an "antiviral gene" is any endogenous avian gene, the expression of which limits the production of the virus in the egg by any means. An antiviral gene may encode an antiviral protein.

As used herein, an "antiviral protein" is any endogenous avian protein, the presence of which limits the production of the virus in the egg.

The antiviral gene and/or protein may be involved in the ability of an adult avian to mount an immune response to a viral infection. In an embodiment, the antiviral gene and/or protein forms part of an interferon (IFN) pathway. In an embodiment, the antiviral gene and/or protein is in the Type I, Type II or Type III interferon pathway. In an embodiment, the antiviral gene and/or protein is in the Type I or Type III interferon pathway. In an embodiment, the antiviral gene and/or protein is the IFN-α/β receptor1 (IFNAR1) chain. In another embodiment, the antiviral gene and/or protein is IL-6.

In an alternate embodiment, the antiviral gene and/or protein may be, or known to be, involved in the ability of an adult avian to mount an immune response to a viral infection. Examples of some previously known functions of such genes/proteins include being involved in cellular metabolism, embryonic development, cell signaling or nucleic acid synthesis.

In an alternate embodiment, reducing the expression of the antiviral gene and/or protein reduces apoptosis of cells of the avian egg infected with the virus.

In an embodiment, the antiviral gene and/or protein is selected from one, two, three, four or more of: IFNAR1, IL-6, CNOT4, MDA5, IFNα, IFNβ, IFNγ, IFNλ, IFNAR2, UBE1DC1, GNAZ, CDX2, LOC100859339, IL28RA, ZFPM2, TRIM50, DNASEIL2, PHF21A, GAPDH, BACE2, HSBP1, PCGF5, IL-1RA, DDI2, CAPN13, UBA5, NPR2, IFIH1, LAMP1, EFR3A, ARRDC3, ABI1, SCAF4, GADL1, ZKSCAN7, PLVAP, RPUSD1, CYYR1, UPF3A, ASAP1, NXF1, TOP1MT, RALGAPB, SUCLA2, GORASP2, NSUN6, CELF1, ANGPTL7, SLC26A6, WBSCR27, SIL1, HTT, MYOC, TM9SF2, CEP250, FAM188A, BCAR3, GOLPH3L, HN1, ADCY7, AKAP10, ALX1, CBLN4, CRK, CXORF56, DDX10, EIF2S3, ESF1, GBF1, GCOM1, GTPBP4, HOXB9, IFT43, IMP4, ISY1, KIAA0586, KPNA3, LRRIQ1, LUC7L, MECR, MRPL12, POLR3E, PWP2, RPL7A, SERPINH1, SLC47A2, SMYD2, STAB1, TTK, WNT3, IFNGR1, IFNGR2, IL-10R2, IFNκ, IFNΩ, IL-1RB and XPO1 or the corresponding receptor or agonist thereof. In an embodiment, IFNα is one or more of the following isoforms: IFNα1, IFNα2, IFNα4, IFNα5, IFNα6, IFNα7, IFNA8, IFNα10, IFNα13, IFNα14, IFNα16, IFNα17 and IFNα21. In an embodiment, IFNλ is one or more of the following isoforms: IFNλ1, IFNλ2, IFNλ3, IFNλ4.

In an embodiment, the antiviral gene and/or protein is selected from one, two, three, four or more of: IFNAR1, IL-6, CNOT4, MDA5, IFNα, IFNβ, IFNγ, IFNλ, BACE2, UBA5, ZFPM2, TRIM50, DDI2, NPR2, CAPN13, DNASE1L2, PHF21A, PCGF5, IFIH1, IL-1RA, LAMP1, EFR3A, ABI1, GADL1, PLVAP, CYYR1, ASAP1, NXF1, NSUN6, ANGPTL7, SIL1, BCAR3, GOLPH3L, HN1, ADCY7, CBLN4, CXORF56, DDX10, EIF2S3, ESF1, GCOM1, GTPBP4, IFT43, KPNA3, LRRIQ1, LUC7L, MRPL12, POLR3E, PWP2, RPL7A, SMYD2, XPO1 and ZKSCAN7 or the corresponding receptor or agonist thereof.

In an embodiment, the antiviral gene and/or protein is selected from one, two, three, four or more of: IL-6, CNOT4, MDA5, IFNα, IFNβ, IFNγ, IFNAR2, UBE1DC1, GNAZ, CDX2, LOC100859339, IL28RA, ZFPM2, TRIM50, DNASEIL2, PHF21A, GAPDH, BACE2, HSBP1, PCGF5, IL-1RA, DDI2, CAPN13, UBA5, NPR2, LAMP1, EFR3A, ARRDC3, ABI1, SCAF4, GADL1, ZKSCAN7, PLVAP, RPUSD1, CYYR1, UPF3A, ASAP1, NXF1, TOP1MT, RALGAPB, SUCLA2, GORASP2, NSUN6, CELF1, ANGPTL7, SLC26A6, WBSCR27, SIL1, HTT, MYOC, TM9SF2, CEP250, FAM188A, BCAR3, GOLPH3L, HN1, ADCY7, AKAP10, ALX1, CBLN4, CRK, CXORF56, DDX10, EIF2S3, ESF1, GBF1, GCOM1, GTPBP4, HOXB9, IFT43, IMP4, ISY1, KIAA0586, KPNA3, LRRIQ1, LUC7L, MECR, MRPL12, POLR3E, PWP2, RPL7A, SERPINH1, SLC47A2, SMYD2, STAB1, TTK, WNT3, IFNGR1, IFNGR2, IL-10R2, IFNκ, IFNΩ, IL-1RB and XPO1 or the corresponding receptor or agonist thereof.

In an embodiment, the antiviral gene and/or protein is selected from one, two, three, four or more of: IL-6, CNOT4, MDA5, IFNAR2, UBE1DC1, GNAZ, CDX2, LOC100859339, IL28RA, ZFPM2, TRIM50, DNASEIL2, PHF21A, GAPDH, BACE2, HSBP1, PCGF5, IL-1RA, DDI2, CAPN13, UBA5, NPR2, IFIH1, LAMP1, EFR3A, ARRDC3, ABI1, SCAF4, GADL1, ZKSCAN7, PLVAP, RPUSD1, CYYR1, UPF3A, ASAP1, NXF1, TOP1MT, RALGAPB, SUCLA2, GORASP2, NSUN6, CELF1, ANGPTL7, SLC26A6, WBSCR27, SIL1, HTT, MYOC, TM9SF2, CEP250, FAM188A, BCAR3, GOLPH3L, HN1, ADCY7, AKAP10, ALX1, CBLN4, CRK, CXORF56, DDX10, EIF2S3, ESF1, GBF1, GCOM1, GTPBP4, HOXB9, IFT43, IMP4, ISY1, KIAA0586, KPNA3, LRRIQ1, LUC7L, MECR, MRPL12, POLR3E, PWP2, RPL7A, SERPINH1, SLC47A2, SMYD2, STAB1, TTK, WNT3, IFNGR1, IFNGR2, IL-10R2, IFNκ, IFNΩ, IL-1RB and XPO1 or the corresponding receptor or agonist thereof.

In an embodiment, the antiviral gene and/or protein is IFNAR1. In an embodiment, the antiviral gene and/or protein is IL-6. In an embodiment, the antiviral gene and/or protein is MDA5. In an embodiment, the antiviral gene and/or protein is CNOT4. In another embodiment, the antiviral gene and/or protein is IFNα. In another embodiment, the antiviral gene and/or protein is IFNβ. In another embodiment, the antiviral gene and/or protein is IFNγ. In another embodiment, the antiviral gene and/or protein is IFNλ. In another embodiment, the antiviral gene and/or protein is IL-1RA. In another embodiment, the antiviral gene and/or protein is IL-1RB.

Further details regarding the antiviral genes and/or proteins that can be targeted is provided below in Table 2.

TABLE 2

Antiviral genes and/or proteins

| Gene | Name | GENE ID | Ref SeqID mRNA | Pathway |
|---|---|---|---|---|
| CDX2 | caudal type homeobox 2 | 374205 | NM_204311 | Nucleic acid synthesis |
| HSBP1 | heat shock factor binding protein 1 | 415813 | NM_001112809 | Embryo development |
| GAPDH | glyceraldehyde-3-phosphate dehydrogenase | 374193 | NM_204305 | Metabolism |
| ARRDC3 | arrestin domain containing 3 | 427107 | XM_424699.3 | Metabolism |
| SCAF4 | SR-related CTD-associated factor 4 | 418492 | NM_001012822.1 | Nucleic acid synthesis |
| RPUSD1 | RNA pseudouridylate synthase domain containing 1 | 771031 | XM_004945221.1 | Nucleic acid synthesis |
| UPF3A | UPF3 regulator of nonsense transcripts homolog A | 418734 | XM_416933.4 | Metabolism |
| TOP1MT | topoisomerase (DNA) I, mitochondrial | 408025 | NM_001001300.1 | Metabolism |
| RALGAPB | Ral GTPase activating protein, beta subunit | 419128 | NM_001030846.1 | Cell signalling |
| SUCLA2 | succinate-CoA ligase, ADP-forming, beta subunit | 418857 | NM_001006271.2 | Embryo development |
| GORASP2 | Golgi reassembly stacking protein 2, 55 kDa | 424156 | NM_001012594.1 | Immune response |
| CELF1 | CUGBP, Elav-like family member 1 | 373923 | NM_001012521.1 | Embryo development |
| SLC26A6 | solute carrier family 26 (anion exchanger), member 6 | 416012 | NM_001252254.1 | Metabolism |
| WBSCR27 | Williams Beuren syndrome chromosome region 27 | 770708 | XM_001234037.3 | Embryo development |
| HTT | huntingtin | 422878 | XM_420822.4 | Metabolism |
| MYOC | myocilin, trabecular meshwork inducible glucocorticoid response | 424391 | XM_422235.4 | Metabolism |
| TM9SF2 | transmembrane 9 superfamily member 2 | 418777 | XM_416972.4 | Metabolism |
| CEP250 | centrosomal protein 250 kDa | 419138 | XM_004946945.1 | Nucleic acid synthesis |
| FAM188A | family with sequence similarity 188, member A | 420526 | XM_418629.4 | Nucleic acid synthesis |
| AKAP10 | A kinase (PRKA) anchor protein 10 | 417612 | XM_415856.4 | Cell signalling |
| ALX1 | ALX homeobox 1 | 427871 | XM_425445.4 | Embryo development |
| CRK | v-crk avian sarcoma virus CT10 oncogene homolog | 417553 | L08168.1 | Immune response |
| GBF1 | Golgi brefeldin A resistant guanine nucleotide exchange factor 1 | 423758 | XM_421632.4 | Cell signalling |
| HOXB9 | homeobox B9 | 771865 | XM_001233690.3 | Metabolism |
| IMP4 | U3 small nucleolar ribonucleoprotein | 100857200 | NM_001277715.1 | Nucleic acid synthesis |
| ISY1 | Splicing factor homolog (*S. cerevisiae*) | 415968 | XM_414311.2 | Nucleic acid synthesis |
| KIAA0586 | Talpid3 | 423540 | NM_001040707.1 | |
| SERPINH1 | serpin peptidase inhibitor, clade H (heat shock protein 47), member 1, (collagen binding protein 1) | 396228 | NM_205291.1 | Metabolism |
| SLC47A2 | solute carrier family 47, member 2 | 417616 | NM_001135679.1 | Metabolism |
| STAB1 | stabilin 1 | 415894 | XM_414246.4 | Embryo development |
| TTK | TTK protein kinase | 421849 | XM_419867.4 | Cell signalling |
| WNT3 | wingless-type MMTV integration site family, member 3 | 374142 | NM_001081696.1 | Cell signalling |
| GNAZ | guanine nucleotide binding protein (G protein), alpha z polypeptide | 770226 | XM_001232444 | Metabolism |
| MECR | mitochondrial trans-2-enoyl-CoA reductase | 419601 | XM_417748.4 | Metabolism |
| BACE2 | beta-site APP-cleaving enzyme 2 (BACE2) | 418526 | XM_416735.4 | Metabolism |
| ZFPM2 | zinc finger protein, FOG family member 2 | 420269 | XM_418380 | Nucleic acid synthesis |
| TRIM50 | tripartite motif containing 50 | 417461 | XM_415709 | Metabolism |
| DDI2 | DNA-damage inducible 1 homolog 2 (*S. cerevisiae*) | 425541 | XM_423293 | Metabolism |

TABLE 2-continued

Antiviral genes and/or proteins

| Gene | Name | GENE ID | Ref SeqID mRNA | Pathway |
|---|---|---|---|---|
| NPR2 | natriuretic peptide receptor B/guanylate cyclase B (atrionatriuretic peptide receptor B) | 100859339 | XM_003642919 | Metabolism |
| CNOT4 | CCR4-NOT transcription complex, subunit 4 | 417936 | NM_001012811 | Nucleic acid synthesis |
| CAPN13 | calpain 13 | 421304 | XM_419369 | Metabolism |
| DNASE1L2 | deoxyribonuclease I-like 2 | 427682 | XM_425256 | Metabolism |
| PHF21A | PHD finger protein 21A | 423199 | NM_001199647 | Nucleic acid synthesis |
| PCGF5 | polycomb group ring finger 5 | 423796 | XM_421668 | Nucleic acid synthesis |
| IFN alpha Receptor (IFNAR1) | interferon (alpha, beta and omega) receptor 1 | 395665 | NM_204859 | Immune response |
| IL-6 | interleukin 6 | 395337 | NM_204628 | Immune response |
| IL-1RA | interleukin 1 receptor, type I | 396481 | NM_205485 | Immune response |
| LAMP1 | lysosomal-associated membrane protein 1 | 396220 | NM_205283.2 | Immune response |
| EFR3A | EFR3 homolog A (*S. cerevisiae*) | 420327 | NC_006089.3 | Embryo development |
| ABI1 | abl-interactor 1 | 420489 | AJ720766.1 | Immune response |
| GADL1 | glutamate decarboxylase-like 1 | 100857134 | XM_003640735.2 | Metabolism |
| PLVAP | plasmalemma vesicle associated protein | 100857417 | XM_004950319.1 | Immune response |
| CYYR1 | cysteine/tyrosine-rich 1 | 770067 | XM_001233378.3 | Cell signalling |
| ASAP1 | ArfGAP with SH3 domain, ankyrin repeat and PH domain 1 | 428385 | XM_425945.4 | Immune response |
| NXF1 | nuclear RNA export factor 1 | 769691 | XM_001232980.3 | Nucleic acid synthesis |
| NSUN6 | NOP2/Sun domain family, member 6 | 428419 | XM_004939249.1 | Nucleic acid synthesis |
| ANGPTL7 | angiopoietin-like 7 | 101750033 | XM_004947467.1 | Embryo development |
| SIL1 | SIL1 nucleotide exchange factor | 416185 | XM_004944772.1 | Embryo development |
| BCAR3 | breast cancer anti-estrogen resistance 3 | 424494 | XM_004936593.1 | Immune response |
| GOLPH3L | Golgi phosphoprotein 3-like | 425072 | XM_004948290.1 | Nucleic acid synthesis |
| HN1 | hematological and neurological expressed 1 | 422119 | NM_001006425.1 | Embryo development |
| ADCY7 | adenylate cyclase 7 | 415732 | XM_414097.4 | Immune response |
| CBLN4 | cerebellin 4 precursor | 769254 | NM_001079487.1 | Metabolism |
| CXORF56 | chromosome 4 open reading frame, human CXorf56 | 428719 | XM_003641123.2 | |
| DDX10 | DEAD (Asp-Glu-Ala-Asp) box polypeptide 10 | 418965 | AJ720478.1 | Metabolism |
| EIF2S3 | Putative eukaryotic translation initiation factor 2 subunit 3-like protein | 418597 | NM_001006260.2 | Metabolism |
| ESF1 | nucleolar pre-rRNA processing protein homolog | 428551 | NM_001031519.1 | Nucleic acid synthesis |
| GCOM1 | GRINL1A complex locus 1 | 415404 | XM_413789.4 | Nucleic acid synthesis |
| GTPBP4 | GTP binding protein 4 | 420458 | NM_001006354.1 | Nucleic acid synthesis |
| KPNA3 | karyopherin alpha 3 | 418870 | CN232780.1 | Cell signalling |
| LRRIQ1 | Leucine-rich repeats and IQ motif containing 1 | 417882 | XM_416125.4 | Embryo development |
| LUC7L | LUC7-like (*S. cerevisiae*) | 416654 | XR_213192.1 | Nucleic acid synthesis |
| MRPL12 | mitochondrial ribosomal protein L12 | 769031 | XM_001232213.3 | Metabolism |
| POLR3E | polymerase (RNA) III (DNA directed) polypeptide E | 416620 | XM_414921.4 | Nucleic acid synthesis |
| PWP2 | PWP2 periodic tryptophan protein homolog (yeast) | 418551 | XM_416757.4 | Nucleic acid synthesis |
| RPL7A | ribosomal protein L7a | 417158 | NM_001004379.1 | Nucleic acid synthesis |
| SMYD2 | SET and MYND domain containing 2 | 421361 | NM_001277571.1 | Nucleic acid synthesis |
| XPO1 | exportin 1 (CRM1 homolog, yeast) | 421192 | NM_001290134.1 | Cell signalling |

TABLE 2-continued

Antiviral genes and/or proteins

| Gene | Name | GENE ID | Ref SeqID mRNA | Pathway |
|---|---|---|---|---|
| ZKSCAN7/ ZNF436 | zinc finger with KRAB and SCAN domains 7 | 416664 | XM_004945381.1 | |
| IFT43 | intraflagellar transport 43 homolog (*Chlamydomonas*) | 771922 | XM_004941812.1 | Embryo development |
| IFNα | IFNA3 interferon | 396398 | NM_205427.1 | Immune response |
| IFNβ | Interferon, beta | 554219 | NM_001024836.1 | Immune response |
| IFNλ (IFNL3) | interleukin 28B (interferon, lambda 3) | 770778 | NM_001128496.1 | Immune response |
| IFNγ | interferon gamma | 396054 | NM_205149.1 | Immune response |
| MDA5/IF1H1 | interferon induced with helicase C domain 1 | 424185 | NM_001193638.1 | Immune response |
| UBE1DC1/ UBA5 | ubiquitin-like modifier activating enzyme 5 | 414879 | NM_001001765.1 | Immune response |
| IFN alpha Receptor (IFNAR2) | interferon (alpha, beta and omega) receptor 2 | 395664 | NM_204858.1 | Immune response |
| IFNGR1 | Interferon Gamma Receptor 1 | 421685 | NM_001130387.1 | Immune response |
| IFNGR2 | Interferon Gamma Receptor 2 (Interferon Gamma Transducer 1) | 418502 | NM_001008676.2 | Immune response |
| IL10R2 | interleukin 10 receptor subunit beta | 395663 | NM_204857.1 | Immune response |
| IL1RB | Interleukin 1 receptor type 2 | 418715 | XM_416914.5 | Immune response |
| IFNκ/ IFNK/IFN Kappa | interferon kappa | 56832 | NM_020124.2 | Immune response |
| IFNΩ/IFN omega | Interferon omega | 3467 | NM_002177.2 | Immune response |
| LOC100859339/ NPR2 | natriuretic peptide receptor B/guanylate cyclase B (atrionatriuretic peptide receptor B) | 100859339 | XM_003642919.2 | Immune response |
| IL28RA/ IFNLR1 | interferon, lambda receptor 1 | 419694 | XM_004947908.1 | Immune response |

In an embodiment, a transgenic egg of the present invention, when inoculated with e.g. a mammalian virus, produces a virus that more closely represents the wild type virus (i.e. is less egg adapted) and as a consequence vaccines derived from the virus induce a higher protective immune response (a more immunogenic virus) than a virus produced in an isogenic egg lacking the same genetic modification. In an embodiment, the protective immune response produced by virus produced by an egg as described herein is increased by at least 5%, or at least 10%, or at least 20%, or at least 30%, or at least 40%, or at least 50%, or at least 60%, or at least 70%, or at least 80%, or at least 90%, or at least 95%, or at least 98%, or at least 99%, or 100% when compared to a virus produced in an isogenic egg lacking the genetic modification. In an embodiment, the genetic modification alters glycosylation patters such as sialyation in the avian egg. In an embodiment, genetic modification increases α-2,6-sialyation in the avian egg (Oh et al., 2008). In an embodiment, genetic modification decreases α-2,3-sialyation in the avian egg. In an embodiment, the genetic modification increases the expression of the ST6 Beta-Galactoside Alpha-2,6-Sialyltransferase 1 (SIAT1 also known as ST6GaII) protein which increases α-2,6-linked sialic acid (α-2,6-sialyation) in the avian egg. Thus, in an embodiment, the present invention allows for the immunogenicity of the virus produced for vaccine production in the avian egg to be increased.

In an embodiment, an avian egg as described herein comprises a genetic modification that increases the amount of virus produced in an avian egg and a genetic modification that increases the quality (immunogenicity) of the virus produced in the avian egg compared to an isogenic egg lacking the same modification. In one embodiment, the egg comprises a genetic modification that increases SIAT1 protein expression in the avian egg compared to an isogenic egg lacking the same modification. In one embodiment, the egg comprises a genetic modification that reduces expression an antiviral gene and/or protein as described herein and a genetic modification that increases SIAT1 protein expression. In an embodiment, SIAT1 is mammalian SIAT1. In an embodiment, SIAT1 is human SIAT1. In an embodiment, SIAT1 is the sialyltransferase described in Gene ID: 6480. In one embodiment, the egg comprises a genetic modification that reduces expression of the IFNAR gene and/or protein and a genetic modification that increases SIAT1 protein expression.

Recombinant Proteins

As used herein, the term "recombinant protein production" refers to production of a recombinant protein in an avian egg. In an embodiment, the recombinant protein is produced in the egg whites. The recombinant protein can be harvested from the allantoic fluid of the egg. In an embodiment, the recombinant protein does not need to be harvested from the egg and can be administered by ingestion of the egg. In an embodiment, the recombinant protein may be an antimicrobial protein, a binding protein, a cytokine or chemokine, a hormone, a blood coagulation factor, an enzyme, an antigen for use in vaccine production. In an embodiment, the recombinant protein is a therapeutic protein.

The term "antimicrobial protein" refers to a protein that provides antimicrobial protection to an avian egg or avian comprising the antimicrobial protein. In an embodiment, the antimicrobial protein protects an egg against contamination reducing wastage during vaccine production. In an embodiment, the antimicrobial protein is a defensin, ovolactoferrin or ovotransferrin. In an embodiment, the antimicrobial protein is ovotransferrin. In an embodiment, the antimicrobial protein is beta-defensin.

In an embodiment, the "binding protein" is an antibody or a fragment thereof. The term "antibody" as used herein includes polyclonal antibodies, monoclonal antibodies, bispecific antibodies, fusion diabodies, triabodies, heteroconjugate antibodies, chimeric antibodies including intact molecules as well as fragments thereof, and other antibody-like molecules. Antibodies include modifications in a variety of forms including, for example, but not limited to, domain antibodies including either the VH or VL domain, a dimer of the heavy chain variable region (VHH, as described for a camelid), a dimer of the light chain variable region (VLL), Fv fragments containing only the light (VL) and heavy chain (VH) variable regions which may be joined directly or through a linker, or Fd fragments containing the heavy chain variable region and the CH1 domain.

A scFv consisting of the variable regions of the heavy and light chains linked together to form a single-chain antibody (Bird et al., 1988; Huston et al., 1988) and oligomers of scFvs such as diabodies and triabodies are also encompassed by the term "antibody". Also encompassed are fragments of antibodies such as Fab, (Fab')2 and FabFc2 fragments which contain the variable regions and parts of the constant regions. Complementarity determining region (CDR)-grafted antibody fragments and oligomers of antibody fragments are also encompassed. The heavy and light chain components of an Fv may be derived from the same antibody or different antibodies thereby producing a chimeric Fv region.

The antibodies may be Fv regions comprising a variable light (VL) and a variable heavy (VH) chain in which the light and heavy chains may be joined directly or through a linker. As used herein a linker refers to a molecule that is covalently linked to the light and heavy chain and provides enough spacing and flexibility between the two chains such that they are able to achieve a conformation in which they are capable of specifically binding the epitope to which they are directed. Protein linkers are particularly preferred as they may be expressed as an intrinsic component of the Ig portion of the fusion polypeptide.

The antibody may be a monoclonal antibody, humanized antibody, chimeric antibody, single chain antibody, diabody, triabody, or tetrabody. In an embodiment, the antibody may be a bi-specific antibody, an engineered antibody, an antibody-drug conjugate or a biosimilar antibody. In an embodiment, the antibody may be Abatacept, Abciximab, Alirocumab, Adalimumab, Afibercept, Alemtuzumab, Basiliximab, Belimumab, Bevacizumab (Avastin), Brentuximab vedotin, Bococizumab, Canakinumab, Cetuximab, Certolizumab pegol, Daclizumab, Daratumumab, Denosumab, Durvalumab, Eculizumab, Efalizumab, Elotuzumab, Etanercept, Evolocumab, Golimumab, Ibritumomab tiuxetan, Infliximab, Ipilimumab, Muromonab-CD3, Natalizumab, Nivolumab, Ocrelizumab, Ofatumumab, Omalizumab, Pembrolizumab, Palivizumab, Panitumumab, Pidilizumab, Ranibizumab, Rituximab, Tocilizumab (or Atlizumab), Tositumomab, Trastuzumab, Tremelimumab Ustekinumab, Vedolizumab, or a modified or biosimilar thereof.

In one embodiment, the "cytokine or chemokine" may be bone morphogenetic protein, erythropoietin, granulocyte colony-stimulating factor, granulocyte macrophage colony-stimulating factor, thrombopoietin, IFNα, IFNβ, IFNλ, TNFα, TNFβ, interleukin 1 receptor antagonist (IL1RA), thymic stromal lymphopoietin or one or more interleukins. In an embodiment, the cytokine is IFNβ. In an embodiment, the cytokine is IL1RA.

In one embodiment, the "hormone" may be epinephrine, melatonin, triiodothyronine, thyroxine, prostaglandin, leukotrienes, prostacyclin, thromboxane, amylin, anti-mullerian hormone, adponectin, adrenocorticotropic hormone, angiotensinogen, angiotensin, atrial-natriuretic peptide, brain natriuretic peptide, calcitonin, cholecystokinin, corticotropin-releasing hormone, cortistatin, encephalin, endothelin, erythropoietin, folcle-stimulating hormone, galanin, glucagon, glucagon-like peptide-1, gonadotropin-releasing hormone, growth hormone-releasing hormone, hepcidin, human chorionc gonadotropin, human placental lactogen, growth hormone, inhibin, insulin, insulin-like groth factor, leptin, luteinizing hormone, melanocyte stimulating hormone, motilin orexin, oxytocin, pancreatic polypeptide, pituitary adenylate cyclase-activating peptide, prolactin, prolactin releasing hormone, relaxin, renin, secretin, somatostatin, thrombopoietin, thyroid-stimulating hormone, thyrotropin-releasing hormone, vasoactive intestinal peptide or a derivative or analogue thereof.

In one embodiment, the "coagulation factor" may be factor I, factor II, factor III, factor IV, factor V, factor VI, factor VII, factor VIII, factor IX, factor X, factor XII, factor XIII, high-molecular-weight kininogen, fibronectin, antithrombin II, heparin cofactor II, protein C, protein S, protein Z, protein Z-related protease inhibitor, plasminogen, alpha 2-antiplasmin, tissue plasminogen activator, urokinase, plasminogen activator inhibitor-1 or plasminogen activator inhibitor 2.

In one embodiment, the "enzyme" may be a protease, lipase, asparaginase, liprotamase, tissue plasminogen activator, collagenase, glutaminase, hyaluronidase, streptokinase, uricase, urokinase or nuclease, such as a programmable nuclease. In an embodiment the recombinant protein is a therapeutic protein i.e. lysosomal acid lipase (LAL) sold as the drug "Kanuma".

Muscle Mass

As used herein, the term "muscle mass" refers to the weight of muscle tissue. An increase in muscle mass can be determined by weighing the total muscle tissue of a bird which hatches from an egg treated as described herein when compared to a bird from the same species of avian, more preferably strain or breed of avian, and even more preferably the same bird, that has not been administered with a nucleic acid as defined herein. Alternatively, specific muscles such as breast and/or leg muscles can be used to identify an increase in muscle mass. Preferably, the methods of the invention increase muscle mass by at about least 1%, 2.5%, 5%, 7.5%, and even more preferably, about 10%. Examples of genes that can be targeted to modify muscle mass as a trait in an avian include myostatin (MSTN), growth differentiation factor-8 (GDF-8), insulin-like growth factor 1 (IGF1), myogenic differentiation 1 (MyoD1), growth hormone (GH), growth hormone releasing factor (GRF), fibroblast growth factor 2 (FGF2), c-ski, interleukin-15 (IL-15) and fibroblast growth factor 5 (FGF5) (U.S. Pat. No. 7,732,571, WO1991000287, WO1996037223, WO2007062000, U.S. Pat. No. 7,732,571).

Nutritional Content

As used herein, the term "nutritional content" refers to the nutritional content of the egg and/or meat produced by an avian. Nutritional content may refer to increasing the content of a vitamin, mineral, amino acid, protein or carbohydrate in the egg and/or meat. Preferably, the methods of the invention increase the concentration of a nutrient in the egg or avian by at about least 0.5%, 1%, 2.5%, 5%, 7.5%, and even more preferably, about 10%.

Fertility

As used herein, the term "fertility" refers to the reproductive capacity of the genetically modified avian as described herein or the offspring thereof. For example increased fertility may include an increased ovulation rate or conception rate.

Allergenicity

Examples of genes that can be targeted to modify "alergenecity" as a trait include ovomucoid (Galdl), ovalbumin, lysozyme and ovotransferrin, livetin, apovitillin, chicken serum albumin and YGP42 and phosvitin (Dhanapale et al., 2015).

Viruses

Viruses which can be produced in avian eggs of the invention include any virus capable of replicating and producing new viral particles in an avian egg. Such viruses include DNA and RNA viruses. In an embodiment, the virus is an animal virus. In an embodiment, the animal virus is a human virus. In an embodiment, the virus is a non-human virus. In an embodiment, the virus is an avian virus.

Examples of viruses for use in the present invention include, but are not limited to, viruses in a family selected from: Orthomyxoviridae, Herpesviridae, Paramyxoviridae, Flaviviridae and Coronaviridae. In an embodiment, the virus is a member of the Orthomyxoviridae family.

The Orthomyxoviridae virus may be, for example, Influenza A virus, Influenza B virus, Influenza C virus, Isavirus, Thogotovirus and/or Quaranjavirus. The influenza virus may be an Influenza A virus. The Influenza A virus may be selected from Influenza A viruses isolated from an animal. In an embodiment, the animal is a human or an avian. In particular, the Influenza A virus may be selected from H1N1, H1N2, H1N3, H1N4, H1N5, H1N6, H1N7, H1N9, H2N1, H2N2, H2N3, H2N4, H2N5, H2N7, H2N8, H2N9, H3N1, H3N2, H3N3, H3N4, H3N5, H3N6, H3N8, H4N1, H4N2, H4N3, H4N4, H4N5, H4N6, H4N8, H4N9, H5N1, H5N2, H5N3, H5N6, H5N7, H5N8, H5N9, H6N1, H6N2, H6N3, H6N4, H6N5, H6N6, H6N7, H6N8, H6N9, H7N1, H7N2, H7N3, H7N4, H7N5, H7N7, H7N8, H7N9, H9N1, H9N2, H9N3, H9N5, H9N6, H9N7, H9N8, H10N1, H10N3, H10N4, H10N6, H10N7, H10N8, H10N9, H11N2, H11N3, H11N6, H11N9, H12N1, H12N4, H12N5, H12N9, H13N2, H13N6, H13N8, H13N9, H14N5, H15N2, H15N8, H15N9 and H16N3. In one embodiment, the Influenza A virus is selected from H1N1, H3N2, H7N7, and/or H5N1.

The Herpesviridae virus may be, for example, a HSV-1, HSV-2, varicella zoster virus, Epstein-barr virus or Cytomegalovirus.

The Paramyxoviridae virus may be, for example, a Paramyxovirinae or Pneumovirinae. In an embodiment, the Paramyxoviridae is Newcastle disease virus.

The Flaviviridae may be, for example, a Flavivirus, Hepacivirus, Pegivirus, Pestivirus. In an embodiment, the Flaviviridae may be the Apoi virus, Aroa virus, Bagaza virus, Banzi virus, Bouboui virus, Bukalasa bat virus, Cacipacore virus, Carey Island virus, Cowbone Ridge virus, Dakar bat virus, Dengue virus, Edge Hill virus, Entebbe bat virus, Gadgets Gully virus, Ilheus virus, Israel turkey meningoencephalomyelitis virus, Japanese encephalitis virus, Jugra virus, Jutiapa virus, Kadam virus, Kedougou virus, Kokobera virus, Koutango virus, Kyasanur Forest disease virus, Langat virus, Louping ill virus, Meaban virus, Modoc virus, Montana myotis leukoencephalitis virus, Murray Valley encephalitis virus, Ntaya virus, Omsk hemorrhagic fever virus, Phnom Penh bat virus, Powassan virus, Rio Bravo virus, Royal Farm virus, Saboya virus, Sal Vieja virus, San Perlita virus, Saumarez Reef virus, Sepik virus, St. Louis encephalitis virus, Tembusu virus, Tick-borne encephalitis virus, Tyuleniy virus, Uganda S virus, Usutu virus, Wesselsbron virus, West Nile virus, Yaounde virus, Yellow fever virus, Yokose virus, Zika virus The Coronaviradae virus may be, for example, a Coronavirinae or a Corovirinae. The Coronavirinae may be a Alphacoronavirus, Betacoronavirus, Deltacoronavirus, or Gammacoronavirus. The Torovirinae may be a Alphacoronavirus or Betacoronavirus. In on embodiment, the Coronaviradae may be the SARS (severe acute respiratory syndrome) coronavirus.

In an embodiment, the virus in selected from: Influenza virus, Canine distemper virus, Measles virus, Reovirus, Eastern equine encephalitis virus, Canine parainfluenza virus, Rabies virus, Fowlpox virus, Western equine encephalitis virus, Mumps virus, Equine encephalomyelitis, Rubella virus, Egg drop syndrome virus, Avian oncolytic viruses, Avian infectious laryngotracheitis Herpesvirus, Newcastle disease virus, Bovine parainfluenza virus, Smallpox virus, Infectious bursal disease, Bovine Ibaraki virus, Recombinant poxvirus, Avian adenovirus type I, II or III, Swine Japanese encephalitis virus, Yellow fever virus, Herpes virus, Sindbis virus, Infections bronchitis virus, Semliki forest virus, Encephalomyelitis virus, Venezuelan EEV virus, Chicken anaemia virus, Marek's disease virus, Parvovirus, Foot and mouth disease virus, Porcine reproductive and respiratory syndrome virus, Classical swine fever virus, Bluetongue virus, Kabane virus, Infectious salmon anaemia virus, Infectious hematopoietic necrosis virus, Viral haemorrhagic septicemia virus and Infectious pancreatic necrosis virus.

Vaccine Production in Eggs

Methods of replicating viruses in avian eggs, and producing vaccines from these eggs, have been around for more than 70 years and thus are well known in the art. For example, conventional methods for producing influenza vaccine compositions have typically involved the growth of the viruses in embryonated chicken eggs. Viruses grown by this method are then used for producing, for example, live attenuated virus, killed whole virus or subunit vaccines compositions. One method for producing influenza vaccine composition is by inoculation of live influenza virus into 10-11 day old embryonated chicken eggs. This inoculated vaccine virus is incubated for a predetermined period of time e.g. 2 or more days to allow for virus replication before harvesting of the virus-rich allantoic fluid (Hoffmann et al., 2002). In one example, the predetermined time is at least 12 hours, or at least 24 hours, or at least 18 hours, or at least 24 hours, or a t least 48 hours, or at least 72 hours, or at least 4 days, or at least 5 days, or at least 6 days, or at least 7 days, or at least 8 days, or at least 9 days, or at least 10 days.

In a typical operation, eggs must be candled, the shells must be sterilized and each egg must be inoculated by injection of a small volume of virus into the allantoic cavity. The injected eggs then are incubated for 48-72 hours at 33°-37° C., candled again, refrigerated overnight and opened to allow harvesting of the allantoic fluid. The harvested fluid can then be clarified by filtration and/or centrifugation before processing for further purification. Requirements For Inactivated Influenza Vaccine, World Health Organization Technical Report Series, 384 (1966). Many commercially available influenza vaccines in the United States have been propagated in embryonated hen eggs. In an embodiment, the egg is a chicken egg and the virus is harvested day 8 to day 11. In an embodiment, the egg is a chicken egg and the virus is harvested about day 10.

Harvesting the Replicated Virus or Particles Thereof from the Egg

The replicated virus or particles thereof (such as split virus particles or subunit virus particles) can be harvested from the egg, preferably the allantoic fluid of the egg by any method known to the skilled person. For example, harvesting of replicated virus or particles thereof can involve one or more of the following steps: clarification, concentration, inactivation, nuclease treatment, separation/purification, polishing and sterile filtration (Wolf et al., 2008; Wolf et al., 2011; Kalbfuss et al., 2006; Josefsberg et al., 2012). In one example, clarification is performed by centrifugation, microfiltration and/or depth filtration. In one example, concentration is performed by centrifugation, ultrafiltration, precipitation, monoliths and/or membrane adsorber. In one example, inactivation is performed by UV, heat or chemical treatment. Chemical forms of inactivation include formalin, binary ethyleneimine and β-propiolactone or any other method known to the skilled person. In an embodiment, the nuclease treatment is treatment with benzonase. In one example, separation/purification is performed by ultracentrifugation (for example density gradient), bead chromatography (for example size exclusion chromatography, ion exchange chromatography or affinity chromatography), and/or membrane adsorber (for example ion exchange chromatography or affinity chromatography). In one example, polishing is performed by ultrafiltration and/or diafiltration. In one example, virus or virus particles can be concentrated by alcohol or polyethylene glycol precipitation. In one example, harvesting the replicated virus or particles thereof comprises the use of a membrane as described in Grein et al. (2013).

In another example, harvesting the replicated virus may include a virus disruption step to produce virus particles of a suitable size for a split vaccine composition or a subunit vaccine composition (Wolf et al., 2008; Josefsberg et al., 2012). Such a step can be any method that produces virus particles of a suitable size for a split vaccine composition or subunit vaccine composition. In one example, the disruption step is detergent solubilisation.

A skilled person would understand that harvested virus (whole attenuated or inactivated) or harvested virus particles (split virus particles or subunit virus particles) can be formulated into vaccine compositions. Such compositions can comprise one or more of: an adjuvant, an excipient, a binder, a preservative, a carrier coupling, a buffering agent, a stabilizing agent, an emulsifying agents, a wetting agent, a non-viral vector and a transfection facilitating compound (Josefsberg et al., 2011; Jones, 2008). A skilled person would further understand that such vaccine compositions can be lyophilized. In one example, the vaccine composition produced is suitable for human use. In one example, the vaccine composition produced is suitable for veterinary use.

EXAMPLES

Example 1—Selectively Hatching Female Chicks

In chicken, and birds in general, the female is the heterogametic sex, carrying one Z and one W chromosome, thus ZW. The male is homogametic, being ZZ, and best evidence indicates that a double dose of the gene DMRT1 on the Z chromosome is key in male development (Smith et al., 2009). This is in contrast to mammalian sex which is defined by XY for the male and XX for the female. Insertion of a marker gene into a suitable location on the Z chromosome (Z*, * indicates a mutation on the Z chromosome) then a breeding pair Z*W (female) crossed with ZZ (male) would yield the following offspring: ZW (f), Z*Z (m), ZZ* (m), ZW (f).

A marker gene on the Z chromosome of a female when crossed to a wild type male will always yield males carrying the marker gene and females free of the marker gene (FIG. 1). The incorporation of this marker into the layer industry breeding structure is shown in FIG. 2. The marker gene, may be for example, a constitutively expressed green fluorescent protein such as GFP or RFP, such that male embryos even at the point of lay when the embryo is only 60,000 mostly undifferentiated cells would be fluorescent and clearly distinguishable from females using a fluorescence detection system.

There are many alternate genes that could also be used to provide other means of detection of the marked Z* chromosome and screening of the males. The power of this technique is to combine the selectable transgene with the null-segregant exclusion generating wild type females yielding eggs for the consumer—with the added value of no-"hatch-and-cull" improved production ethics. The farmer also benefits from reduced incubation, egg handling and easier nutrient recovery from males. Incorporation of a second mutation onto the Z chromosome, for example a mutation in a gene such as an antiviral gene which increases virus production in an avian egg, would facilitate use of a previously discarded material increasing the productivity of the poultry production industry and reducing biological waste in the industry.

Example 2—Genetic Engineering of Avian Species

Methods for germ line transgenesis in avian species have generally been based on two approaches. The first approach involves recombinant lentivirus injected into the blastoderm (stage X) or early stage chick embryo (McGrew et al., 2004) and the second requires ex vivo culture and manipulation of primordial germ cells (PGCs) followed by injection of the cells back into a recipient embryo (Van de Lavoir et al., 2006). Both methods are not ideal for applications in labs that would like to avoid lentivirus methods for biosafety reasons and for example, have requirements to avoid imported biologicals used for PGC culturing due to quarantine compliance regulations specific to Australia.

Therefore an alternative method for producing transgenic birds via direct in vivo transfection of PGCs was developed (Tyack et al., 2013). The results presented in this paper demonstrate a simple procedure for the in vivo transfection of PGCs with miniTol2 transposon plasmids to generate stable germ-line transgenic male chickens capable of passing the transgene onto the next generation (FIG. 3). The method is based on a significant improvement to a previously published method which demonstrated that transfection of PGCs can be achieved by injecting plasmid DNA-liposome complexes into the bloodstream of stage 14 HH embryos (Watanabe et al., 1994).

This previous study showed that although it was possible to introduce exogenous DNA into gonadal germ cells by transfecting circulating PGCs in vivo, it was a very inefficient and unstable process. Furthermore, they were unable to demonstrate that this approach was able to generate transgenic birds. Using lipofection technology this approach with significantly advanced to stably transform PGCs in vivo and successfully and efficiently generate transgenic offspring expressing the enhanced green fluorescence protein (EGFP) gene carried in a transposon. This approach used the miniTol transposon system which is made up of two plasmids; the first plasmid contained the EGFP transgene under the control of the CAGGS promoter and flanked by the Tol2 ITRs (pMiniTol-EGFP); and the second plasmid (pTrans) encoded the Tol2 transposase under the control of the CMV immediate-early promoter for in trans expression of the transposase and subsequent transposition of miniTol-EGFP from plasmid to chromosome in transfected PGCs. pMini-Tol-EGFP and pTrans were combined and formulated with lipofectamine2000 and intravenously injected into stage 14 HH embryos.

Successful transfection was confirmed by the visualisation of EGFP expression in the gonads of 14 day old embryos. Forty percent of the remaining embryos survived to hatch and the male chicks were grown to sexual maturity. Semen was then collected from all roosters and tested using PCR for the presence of the miniTol-EGFP transgene and 45% of the males were found to have transgenic semen. Three males with the highest levels of miniTol DNA in their semen were selected as founder roosters to breed for G1 germline transgenic offspring. The selected roosters were each mated with hens of the same line and a total of 419 G1 chicks were hatched and screened for visual whole-body EGFP expression. A total of 5 out of the 419 chicks were positive for EGFP expression confirming stable integration of miniTol-EGFP into transfected PGCs of the founder roosters and germ line transmission of the transgene to the G1 offspring. Two of the three roosters had germ line transmission of approximately 1.5%. Southern blot analysis of genomic DNA from the 5 positive G1 chicks revealed that a single transposition event had occurred in 4 of the 5 chicks and a double transposition event had occurred in 1 chick.

Example 3—Specific Integration of Transgenes on Z Chromosome

The method described in (Tyack et al., 2013) was used to develop a genetic approach to in ovo sex selection for the layer industry by generating a breeder hen with a single specific miniTol-EGFP insertion on the Z chromosome.

Direct transfection of embryonic primordial germ cells (PGCs) was used to generate over 100 germline transgenic G1 chickens using the Tol 2 transposon. The transgene copy number was analysed in G1 chickens using Southern blot and the number of Tol2 insertions can vary from 1 to 7 copies. The majority of G1 chicks (63%) have just a single transgene insertion. The region of the genome that the insertions have occurred was also analysed (FIG. 4).

Of the insertions 49.4% were in introns, 1.3% were in exons (these are regions that would be actively avoided, unless targeting to disrupt expression of a specific gene linked to a production trait), 24.6% were in repeat regions, 3.9% were in UTRs (untranslated regions) and 20.8% are in unknown regions (i.e. not characterised in the current version of the chicken genome). Chromosomal distribution of the inserts revealed that 12.3% are located in the Z chromosome (FIG. 4). Chromosome 3 is 18.5%; Chromosome 1 is 13.8%; and Chromosome 5 is also 12.3%. All of these chromosomes are the biggest and therefore statistically expected to have the most number of insertions.

From the overall Z chromosome insertion site data 8 locations were identified on the Z Chromosome that are suitable for a marker transgene integration. These locations are shown in Tables 4 and 5. They are in locations that do not impact on the viability of the chicken and have no detrimental impact on Z gene expression and regulation. As an outcome of this analysis further studies were focused on one line of chickens in which the hens specifically carry a single Tol2 EGFP insert within an intron of chicken Talin1 (chTLN1) on the Z chromosome. This study shows that a Z-linked selectable marker can successfully be applied in ovo to identify male embryos and enable their removal from the production system at the earliest stage using transposon technology. These studies have allowed the identification of a number of suitable Z chromosome locations that could be used for development of this application and have shown that it is possible to detect expression of the Z-linked marker gene at any time from point of lay to hatch. The selection marker is a fluorescent protein that is inserted into the Z chromosome of female breeder birds using genetic engineering techniques. This modified chromosome is passed on only to male offspring. All the female offspring by contrast only receive the W chromosome from the female parent and it is therefore impossible for them to carry the fluorescent protein marker. They are not genetically modified and therefore cannot express the fluorescent marker.

TABLE 4

Tol2 chromosomal integration sites: protein coding genes (Direct injection)

| Construct | Insertion position (in bold, transposon inverted terminal repeat sequence) | Insertion site | Chromosome location: hit from | Gene name/ Ensembl ID/EST/mRNA |
|---|---|---|---|---|
| Tol2-Aromatase | CTGCTTTGGTACCAGGCCACCCT SEQ ID: 161 | Intron | chrZ: 8877562 | ENSGALT00000045403 |
| Tol2-antiviral peptide | CTGCAAAATCTCACCGGGGATCA SEQ ID: 162 | Intron | chrZ: 79634878 | Genscan prediction chrZ.1779 |
| | TGGACTTGATGATTCCTGTGCAG SEQ ID: 163 | Intron | chrZ: 59776665 | Genscan prediction chrZ.1406 |
| | CTGGCATAGTTTTCCACTAAACG SEQ ID: 164 | Intron | chrZ: 37870898 | Genscan prediction chrZ.889 |
| | CCCAGGTACCTGGCTGTCAGCAG SEQ ID: 165 | Intron | chrZ: 65499389 | PALM2 (ENSGALT00000025241) |

TABLE 5

Tol2 chromosomal integration sites: RNAi hairpins (Direct injection and microinjection)

| Construct | Insertion position (in bold, transposon inverted terminal repeat sequence) | Insertion site | Chromosome location: hit from | Gene name/ Ensembl ID/EST |
|---|---|---|---|---|
| Busulfan Tol2- Attentuated promoters/ anti-flu hp | CTGACCATAAGAATTAATGTTTA SEQ ID NO: 166 | Intron | chrZ: 66095580 | UGCG (ENSGALT00000025295) |
| | CTGCTACATATGACCTCTCGGTG SEQ ID NO: 167 | Intron | chrZ: 25222900 | MAP1B (ENSGALT00000024188) |
| Direct injection Tol2- Attentuated promoters/ anti-flu hp | TGGGATGGCACACATAGGGGCAG SEQ ID NO: 168 | Intron | chrZ: 1273684 | Genscan prediction chrZ.25 |
| | CTGCATAGAGCTAAGAGTCACAG SEQ ID NO: 169 | Intron | chrZ: 67340009 | Genscan prediction chrZ.1602 |

Integration sites show in Tables 4 and 5 were determined using the BLAT algorithm at the University of California, Santa Cruz (UCSC) Genome Browser (http://genome.uc-se.edu) on the chicken genome (version ICGSC *Gallus_gallus*-4.0/galGal4).

Example 4—Detection of Fluorescence Marker Gene in Embryos

GFP fluorescence was analysed at various stages of embryo development. Fluorescence was detected at day 2.5, 10 and 18 of embryogenesis using a GFP detection light source with filter to detect fluorescence (FIG. 5). This method can be adapted for use with fibre optics and microendoscopy to detect a fluorescent male embryo alternatively. Certain fluorescent proteins may also be detected directly through the shell of the egg.

Example 5—Disruption of Interferon Response by Neutralizing Antibodies Increases Viral Yield In Ovo The ORF of ChIFNα, ChIFNβ, ChIFNγ and ChIFNλ were expressed in Top F'10 *Escherichia coli* (*E. coli*) competent cells using a pQE50 expression system and after induction with IPTG. Recombinant protein was solubilised and purified using Ni-NTA-Agarose. Biological activities of rchIFNs were measured using a virus neutralization assay (Lowenthal et al., 1995). rchIFNs protected cells over a range of concentrations and therefore are biologically active (FIG. 6).

The rchIFNs were used as immunogens to generate rabbit antiserum against the homologous recombinant protein. New Zealand female white rabbits were immunized subcutaneously with the rchIFN protein in *Quilaja saponaria* (Quil A) cocktail adjuvant up to 7 times. Ammonium sulphate was used to enrich the globular serum proteins in the rabbit anti-chIFN antiserum. Enriched antisera were quantified using a Spectrophotometer (NanoDrop® ND-1000, NanoDrop Technologies, USA) prior to 0.2 µm filter sterilization (Sartorius, Germany) of the antibodies for in ovo injection. Reactivity of the sera and polyclonal antibody recognition was tested using and Indirect ELISA analysis. In brief, purified rchIFNs were diluted to 5 µg/mL in coating buffer in 96-well ELISA plates read at 450 nm on a Titertek Multiscan Plus plate reader. The analysis showed a dose-effect reactivity of the serum against the corresponding protein (FIG. 6A).

Next, Hyline brown eggs (Hy-Line, Australia) at embryonic age day 10-11 were inoculated via allantoic fluid with antibody and/or virus. Stocks of influenza virus (provided by CSL Pty Ltd) were diluted to 10-5 in virus diluent containing 1% neomycin/polymyxin. PR8 (H1N1) or H5N1 vaccine virus (NIBRG-14) (CSL, Australia) inoculations of eggs were performed separately. Purified anti-chIFN and anti-chIL-6 antibodies were also diluted in virus diluent solution for inoculation into eggs at either 1000 µg, 200 µg or 20 µg per egg. After inoculation eggs were incubated at 35° C. for 48 h.

The eggs were candled after incubation to check viability prior to being chilled O/N at 4° C. in preparation for harvesting. Allantoic fluid (5 mL) was removed from each egg for further analysis. HA assays were performed on the same day as harvest. Briefly, allantoic fluid samples were serial diluted 1/25 in PBS and added in duplicate to the last row of round bottomed 96 well plates (ICN Biochemicals, USA). 50 µL of 0.5% of washed chicken RBC was added to all wells, gently tapped to mix and left at RT for at least 40 min and HA end point was determined. Experiments in ovo indicated that the anti-chIFN-α antibodies (FIG. 7B) and anti-chIFN-β antibodies (FIG. 7C) at all concentrations did not have a significant effect on the HA titre of either PR8 or NIBRG-14 virus in the eggs. However, the anti-chIFN-λ antibodies (FIG. 8A) were shown to statistically improve the titre of PR8 virus when administered at 200 µg/egg (p=0.04). The H5N1 vaccine virus titre was statistically improved, up to 1.5 fold, when the antibodies were injected at both 1000 µg/egg (p=0.0045) and at 20 µg/egg (p=0.0001). Similarly, anti-chIFN-γ antibodies (FIG. 8B), when inoculated at 1000 µg/egg (p=0.015), were capable of improving the HA titre of the H5N1 vaccine virus. Furthermore, the anti-chIL-6 antibodies (FIG. 8C) also statistically enhanced H5N1 vaccine virus titres in eggs.

Example 6—Disruption of Numerous Genes by siRNA In Vitro Increases Viral Titres In order to identify gene candidates with an antiviral function a set of genes were evaluated by small interference RNA (siRNA) assay. DF-1 cells were transfected with a multiplex (smartpool) of siRNA against each gene prior infection with avian influenza (AI) virus. The results show an increase in viral titres after KD without any apparent toxic effect on the cells (FIG. 9). At least in some instances no apparent affect was observed but this may be due to the siRNA not being administered early enough to produce efficient KD (for example, considering the anti-IL6 antibody data this will most likely explain the IL-6 siRNA data in FIG. 9). For CNOT4, IFNAR or MDA5 the effect of individual smartpool siRNAs on cell viability and gene silencing was assessed (FIG. 10).

Example 7—Down-Regulation of Numerous Genes by shRNA In Ovo Increases Viral Titres For in ovo analysis, siRNA was delivered as complexes with ABA-21/117Q/PF polymer (ABA-21/117Q; polymer without PolyFluor 570 dye labels) at molar ratios of 4:1 of polymer to 2 nmol siRNA in a total of 200 µl. Complexes were formed in aqueous solution in the presence of phosphate-buffered saline (PBS). The required amount of polymer (316 µg), resuspended in water, was added to the tubes and mixed by vortexing. A total of 2 nmol, equivalent to 30 µg of siControl or 24.5 µg of siAntiIFNAR1 was then added to the tubes and the sample vortexed. Complexion was allowed to continue for 1 h at room temperature. Complexes were injected directly into the corioallantoic fluid. After 48 hours virus was injected as previously described and samples were collected 24 hours after virus infection. Results show an increase of virus growth after KD of IFNAR1 (FIG. 11 and FIG. 12).

Example 8—Deletion of the IFNAR1 gene in Chickens Increases Viral Titres In Vitro To probe that permanent deletion of the chicken interferon (alpha, beta and omega) receptor 1, IFNAR1 (Gene ID: 395665) have an effect on viral yield; KO cell lines from the continuous cell line of chicken embryo fibroblasts (DF-1) were generated. Using the RNA-guided Cas9 nuclease from the microbial clustered regularly interspaced short palindromic repeats (CRISPR/Cas9) system, two different single guides RNA (sgRNA) were designed in order to produce a dual double-strand break by duplexing. sgRNA were cloned according to (Ran et al., 2013) and the corresponding constructs were transfected into DF-1 cells using encoding the deletion of around 200 bb removed entirely the transcription start site (TSS) and exon one of the IFNAR1 precursor. Single cells were isolated after sorting using a BD FACS Aria II™ cell sorter. The deletion in each clone was identified after genomic PCR screening to distinguish between wild type and monoallelic and biallelic targeted cell lines.

After transfection around 30% of the alleles presented a deletion of more than 200 bp that was confirmed by cloning and sequencing of the amplicom. Following cell sorting to single clones, cells were screened by gDNA PCR, and monoallelic and biallelic cell lines were isolated. Furthermore, the induced deletion proved to interrupt the expression of the gene at the transcriptional level in a gene-dosage dependent manner where mono-allelic cell lines showed half level of expression compared to wild-type and bi-allelic cell lines showed levels close to zero. This effect lasted even after challenging with the virus or poly(I:C) the latter, a strong inductor of the innate response (FIGS. 13A, B and C).

To evaluate the impact of the deletion on vaccine production the H1N1 strain A/WSN/1933 was used at high and low multiplicity of infection (1 and 0.1 MOI respectively). Using this approach viral yield increases significantly in biallelic cell lines after ten hours of infection, around three times those levels found in the wild-type cell lines when measured in a plaque-forming units (PFU) assay. Virus isolated also showed five times higher TCID50s from biallelic cell lines when compared to the parental cell line (FIG. 13D).

Example 9—Screening and Identification of Antiviral Genes Against Hendra Virus

A number of genes relevant for virus production were identified in an siRNA screen investigating proteins required for Hendra virus (HeV) infection in human HeLa cells. HeLa cells (ATCC CCL-2) were maintained in growth medium (Eagles Modified Eagle Medium; EMEM) supplemented with 10% v/v foetal bovine serum (FBS), 10 mM HEPES, 2 mM L-glutamine and 100 U/ml penicillin, and 100 µg/mL streptomycin (P/S; Life Technologies). HeLa cells (7×104) were reverse-transfected with siRNA pools (GE Life Sciences) using Dharmafect-1 (GE Life Sciences) in Opti-MEM (Life Technologies) overnight, after which media was removed and replaced with transfection media (growth media minus antibiotics) and cells incubated for a further 24 hours. Media was replaced ~6 hours post transfection (h.p.t.) and incubated for a further 18 hours. Cells were then infected with the Hendra Virus (HeV) (Hendra virus/Australia/Horse/1994/Hendra). For the 50% tissue culture infective dose (TCID50), 10-fold dilutions of tissue culture supernatants were made in medium in a 96-well tissue culture. Plates were incubated for 3 days (HeV) at 37° C. and 5% CO2 and scored for cytopathic effect. The infectious titer was calculated by the method of Reed and Muench (1938). Viral replication for silenced genes was compared to a non-targeting siRNA control (siNT). A significant increase in viral replication was observed with silencing of a number of genes (see FIG. 14 and Table 3). Silencing of ADCY7 demonstrated the highest increase in viral titre (see Table 3).

Example 10—Overexpression of Ovotransferrin in Avians and Avian Eggs

Chickens overexpressing *Gallus gallus* ovotransferrin were produced generally using the direct injection methods described in Tyack et al. (2013). Eggs from G1 hens were injected with *Salmonella* Kiambu, a strain of *Salmonella* known to grow in avians eggs. Egg whites were harvested from infected eggs and the growth of *Salmonella* assessed on cell culture plates. As shown in FIG. 15, overexpression of ovotransferrin increases the anti-microbial properties of the egg white compared to controls. Such, modifications may be useful in reducing *Salmonella* infections in breeding populations and eggs produced therefrom which may be used as bioreactors.

TABLE 3

Silencing of select genes increases Hendra Virus replication in HeLa cells

| | TCID50/mL (Hendra virus) | | |
|---|---|---|---|
| gene | AVERAGE | S.D | one-way ANOVA test |
| mock (negative control) | 953524 | 1024787 | N/A |
| siNEG (negative control) | 836250 | 701595 | N/A |

TABLE 3-continued

Silencing of select genes increases Hendra Virus replication in HeLa cells

| | TCID50/mL (Hendra virus) | | |
|---|---|---|---|
| gene | AVERAGE | S.D | one-way ANOVA test |
| PLK (positive control) | 747 | 801 | *** |
| ADCY7 | 53600 | 33069 | ** |
| AKAP10 | 3280 | 1022 | *** |
| ALX1 | 3696 | 4278 | *** |
| CBLN4 | 3730 | 1820 | *** |
| CRK | 110100 | 137444 | ** |
| CXorf56 | 86600 | 26800 | ** |
| DDX10 | 2236 | 1272 | *** |
| EIF2S3 | 1642 | 2015 | *** |
| ESF1 | 8510 | 8755 | ** |
| GBF1 | 10220 | 7996 | * |
| GCOM1 | 11190 | 7652 | * |
| GTPBP4 | 14460 | 8530 | * |
| HOXB9 | 127200 | 128378 | * |
| IFT43 | 43300 | 39147 | * |
| IMP4 | 1696 | 1206 | * |
| ISY1 | 1235 | 1317 | * |
| KIAA0586 | 1642 | 2015 | * |
| KPNA3 | 15250 | 13740 | * |
| LRRIQ1 | 36500 | 12139 | ** |
| LUC7L | 23700 | 10278 | ** |
| MECR | 814 | 900 | ** |
| MRPL12 | 43160 | 41593 | ** |
| POLR3E | 7970 | 9247 | ** |
| PWP2 | 23560 | 17198 | ** |
| RPL7A | 4620 | 3618 | ** |
| SERPINH1 | 16960 | 12057 | ** |
| SLC47A2 | 30300 | 11723 | ** |
| SMYD2 | 4740 | 3700 | ** |
| STAB1 | 11560 | 7150 | ** |
| TTK | 72300 | 96300 | ** |
| WNT3 | 30300 | 11700 | ** |
| XPO1 | 2740 | 1544 | ** |

Example 11—SIAT1 Gene Integration into Chicken Cells Increases the Number of α-2,6 Sialic Acid Residues Embryonated eggs are useful for vaccine production of human influenza virus. However the sialic acid cell receptors used for viral entry and replication differ in conformation between human and chicken. Rather than the α-2,6 sialic acid receptors present in human, chickens exhibit higher numbers of α-2,3 receptors. Inoculated virus adapts to the egg environment, reducing the human immunogenicity and thus the efficacy of the resulting vaccine, when administered to humans. The SIAT1 gene catalyses the production of α-2,6 receptors. It was assessed whether human SIAT1 could be integrated could be integrated into the chicken genome alongside a marker gene by using transposases. Transposase activity is such that stable integrations of the SIAT1 and marker genes could occur across the whole genome. Due to the Z chromosome's relative size, there is a high likelihood for transgene integration at that location, and in such a case this would allow the marker gene to be used for sex-selection of progeny.

DF1 chicken fibroblast cells were transfected using Lipofectamine 2000 with a tol2 transposase plasmid and a transposon plasmid containing a CAG promoter driven cassette, with either eGFP alone, or with eGFP, a T2A ribosomal skip peptide, and SIAT1. Post-transfection (10 days), GFP positive DF1 populations were sorted.

Cells at 80-90% confluence were incubated with biotinylated lectins (Vector Laboratories, MAL II lectin for staining α2,3 residues, SNA lectin for staining α2,6 residues), then incubated with streptavidin-phycoerythrin conjugate, and then fixed in 4% paraformaldehyde for imaging under fluorescence. Cold PBS/1% BSA was used for washing cells between each incubation step.

To analyse cells by FACS, 0.25% trypsin-EDTA was used to gently detach cells, and $1\times10^6$ cells were aliquoted into wells of a 96-well plate. Cells were stained as above, without fixing, and then run through a FACS Aria II cell sorter.

Transfection of DF1 cells with a transposon to integrate a CAG-eGFP cassette resulted in strong and stable expression of eGFP. The same CAG-eGFP (GFP) cassette was then altered to include the coding sequence for human SIAT1, separated from the eGFP sequence by a 2A peptide. DF1 cells transfected with the CAG-eGFP-2A-SIAT1 (GFP-SIAT) cassette expressed eGFP at similar levels to CAG-eGFP transfected cells.

Staining of sialic acid on the surface of eGFP-sorted DF1 cell populations revealed the presence of α-2,3-sialic acid residues on GFP and GFP-SIAT transfected DF1 cells, but the presence of α-2,6 sialic acid residues on GFP-SIAT transfected DF1s only (FIGS. 16A and 16B). Quantitation of α-2,6 residues present on DF1 cells by FACS analysis showed a 3-fold increase in mean fluorescence staining between GFP ($\bar{x}$=1200 rfu) and GFP-SIAT ($\bar{x}$=3800 rfu) transfected cells (FIG. 16C).

Therefore inserting SIAT1 alongside a sex-selection marker gene, sex-selected eggs could be used for vaccine production in a process which avoids egg-adaption.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

This application claims priority from Australian Provisional Application No. 2017902123 entitled "Trait selection in avians" filed on 31 May 2017. The entire contents of that application are hereby incorporated by reference.

All publications discussed and/or referenced herein are incorporated herein in their entirety.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

REFERENCES

Bird et al. (1988) Science, 242:423-426.
Balciunas et al. (2006) PLoS Genet. 10:e169.
Bannister et al. (2007) BMC Biotechnology. 7:79.
Bosselman et al. (1989) Science, 243:533-534.
Chim et al. (1993) Cell, 74:504-514.
Cong et al. (2013) Science 339: 819-823.
Dhanapala et al. (2015) Mol Immunol 66:375-385.
Doran et al. (2016) Analytical Chemistry DOI: 10.1021/acs.analchem.6b01868.
Grein et al. (2013) CHemie Ingenieur Technik 85:1183-1192.
Hoffmann et al. (2002) Vaccine 20:3165-70.
Huston et al. (1988) Proc Natl Acad Sci. USA. 85:5879-5883.
Koga et al. (1996) Nature 383:30.

Jones et al. (1986) Nature 321:522-525.
Josefsberg et al. (2012) Biotech and Bioengineering. 109: 1443-1460.
Kalbfuss et al (2006). Biotech and Bioengineering. 97:73-85.
Kawakami et al. (2000) Proc Natl Acad Sci USA, 97:11403-11408.
Lavitrano et al. (1989) Cell 57: 717-723.
Lodish et al. (2000) Molecular Cell Biology 4th Edition, New York, Section 12.5.
Lowenthal et al. (1995) J Interferon Cytokine Res. 15:939-45.
Makarova et al. (2015) Nature Reviews Microbiology 13:1-15.
Massin et al. (2005) J Virol. 79:13811-13816.
McGrew et al. (2004) EMBO Reports 5, 728-733.
Oh et al. (2008) J Clinical 47(7) 2189-2194.
Porat et al. (2011) British Poultry Science 52, 58-65.
Ran et al. (2013) Nature Protocols. 8:2281-2308.
Reed and Muench (1938) The American Journal of Hygiene 27:493-497.
Schusser et al. (2013) Proc Natl Acad Sci USA 10:110: 20170-20175.
Smith et al. (2009) Nature 461, 267-271.
Thoraval et al. (1995) Transgenic Research 4:369-36.
Van de Levoir (2006) Nature 441, 766-769.
Watanabe et al. (1994) Molecular Reproduction and Development 38, 268-274.
Weaver (2002) Molecular Biology $2^{nd}$ Edition, New York, Section 22.1.
Weissmann et al. (2013) Theriogenology. 80, 199-205.
Wolf et al. (2008) Chem Eng Technol. 31:846-867.
Wolf et al. (2011) Expert Rev Vaccine. 10: 1451-1475.
Zetsche et al. (2015) Cell 163:1-3.
Zhang et al. (2011) Nature Biotechnology 29:149-153.

The invention claimed is:

1. A transgenic chicken egg whose genome comprises a polynucleotide encoding a fluorescent protein and a polynucleotide encoding a ST6 Beta-Galactoside Alpha-2,6-Sialyltransferase 1 (SIAT1) protein integrated into a single Z chromosome, wherein the transgenic chicken egg expresses the fluorescent protein and the SIAT1 protein.

2. The transgenic chicken egg of claim 1, wherein the fluorescent protein is Enhanced green fluorescent protein (EGFP) or Red fluorescent protein (RFP).

3. The transgenic chicken egg of claim 1, which is male.

4. The transgenic chicken egg of claim 1, wherein the polynucleotides are in a single genetic construct.

5. The transgenic chicken egg of claim 1, wherein upon hatching the egg produces a male chicken.

6. A transgenic chicken whose genome comprises a polynucleotide encoding a fluorescent protein and a polynucleotide encoding a ST6 Beta-Galactoside Alpha-2,6-Sialyltransferase 1 (SIAT1) protein integrated into a single Z chromosome, wherein the transgenic chicken expresses the fluorescent protein and the SIAT1 protein.

7. The transgenic chicken of claim 6, which is female.

8. A method for determining whether a chicken egg is male, the method comprising:
   determining whether a chicken egg obtained by crossing the transgenic female chicken of claim 7 and a wild type male chicken expresses the fluorescent protein, wherein the egg is male if it expresses the fluorescent protein.

9. A method of producing a transgenic chicken egg, the method comprising crossing the transgenic female chicken of claim 7 with a male chicken, such that a transgenic chicken egg is obtained whose genome comprises the polynucleotide encoding the fluorescent protein and the polynucleotide encoding the SIAT1 protein integrated into a single Z chromosome, wherein the transgenic chicken egg expresses the fluorescent protein and SIAT1 protein.

10. The transgenic chicken of claim 6, which is male.

11. A method of producing a transgenic chicken, the method comprising crossing the transgenic chicken of claim 6 with another chicken, such that a transgenic chicken offspring is obtained whose genome comprises the polynucleotide encoding the fluorescent protein and the polynucleotide encoding the SIAT1 protein integrated into a single Z chromosome, wherein the transgenic chicken offspring expresses the fluorescent protein and SIAT1 protein.

12. A method of producing a transgenic chicken egg, the method comprising crossing the transgenic chicken of claim 6 with another chicken, such that a transgenic chicken egg is obtained whose genome comprises the polynucleotide encoding the fluorescent protein and the polynucleotide encoding the SIAT1 protein integrated into a single Z chromosome, wherein the transgenic chicken egg expresses the fluorescent and SIAT1 protein.

* * * * *